(12) United States Patent
Koike et al.

(10) Patent No.: US 6,973,010 B1
(45) Date of Patent: Dec. 6, 2005

(54) TIMEPIECE DEVICE

(75) Inventors: Nobuhiro Koike, Nagano-ken (JP);
Mamoru Miyasaka, Shiojiri (JP);
Osamu Takahashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 559 days.

(21) Appl. No.: 09/830,519

(22) PCT Filed: Aug. 23, 2000

(86) PCT No.: PCT/JP00/05649

§ 371 (c)(1),
(2), (4) Date: Jun. 5, 2001

(87) PCT Pub. No.: WO01/16655

PCT Pub. Date: Mar. 8, 2001

(30) Foreign Application Priority Data

Aug. 26, 1999 (JP) .................................. 11-239806

(51) Int. Cl.[7] .......................... H02K 37/00; G04C 3/00
(52) U.S. Cl. ..................... 368/204; 368/155; 310/49 R
(58) Field of Search ..................... 310/112, 40 MM, 310/49 R, 179, 180, 184, 216, 217, 254; 368/203–205, 368/76, 160, 168, 155–157

(56) References Cited

U.S. PATENT DOCUMENTS

| | | | |
|---|---|---|---|
| 3,621,313 A | * | 11/1971 | Walton ...................... 310/49 R |
| 4,679,944 A | | 7/1987 | Sedlak et al. |
| 6,012,838 A | | 1/2000 | Hara et al. |
| 6,437,466 B1 | * | 8/2002 | Taghezout ................ 310/49 R |

FOREIGN PATENT DOCUMENTS

| | | | | |
|---|---|---|---|---|
| EP | 0 905 589 A2 | 3/1999 | | |
| EP | 905587 A1 | * | 3/1999 | .......... G04C 10/00 |
| GB | 1 468 319 | 3/1977 | | |
| GB | 2 015 829 | 9/1979 | | |
| JP | 50-135512 | 10/1975 | | |
| JP | 53-29365 | 8/1976 | | |
| JP | 54-151070 | 11/1979 | | |
| JP | 54-162000 | 11/1979 | | |
| JP | 55-158581 | 12/1980 | | |
| JP | 59-117454 | 7/1984 | | |
| JP | 61-101480 | 6/1986 | | |

(Continued)

OTHER PUBLICATIONS

"SALTO: An Automatic Winding Mechanical Movement Having The Precision of a Quartz Movement" by Jean-Jacques Born, Rudolf Dinger, Pierre-Andre Farine (SHM Research and Development Laboratory, Asulab S.A.), published by Societe Suisse de chronometrie, Journee d'Etude in Oct. 1977, English translation.

(Continued)

*Primary Examiner*—Kamand Cuneo
*Assistant Examiner*—Jeanne-Marguerite Goodwin

(57) ABSTRACT

In a generator 120 in an electronic-controlled mechanical timepiece, the winding core 133b of a coil 134 arranged nearer to the perimeter of a base plate 2 is made shorter than the winding core 123b of a coil 124 arranged more inside. Accordingly, it is possible to make the area of an opening 2c can be made smaller in comparison with the prior art, and make the timepiece more small-sized by making smaller the outer diameter of the base plate 2 as keeping the distance D1 between the corner part of the opening 2c and the perimeter of the base plate 2 to the same degree as the prior art and thereby securing the strength of the base plate 2.

68 Claims, 32 Drawing Sheets

FOREIGN PATENT DOCUMENTS

| | | |
|---|---|---|
| JP | 61-169479 | 10/1986 |
| JP | 61-281991 | 12/1986 |
| JP | 62-74482 | 5/1987 |
| JP | 06-094850 | 4/1994 |
| JP | 09-054173 | 2/1997 |
| JP | 9-230066 | 9/1997 |
| JP | 09-230066 | 9/1997 |
| JP | 10-042532 | 2/1998 |
| JP | 10-136633 | 5/1998 |
| JP | 11-044781 | 2/1999 |
| JP | 11-202061 | 7/1999 |
| JP | 2000-032724 | 1/2000 |
| WO | WO97/19391 | 5/1997 |

OTHER PUBLICATIONS

ETA2836 from a cataloque of ETA S.A. (two pages), no date.

* cited by examiner

F I G. 1
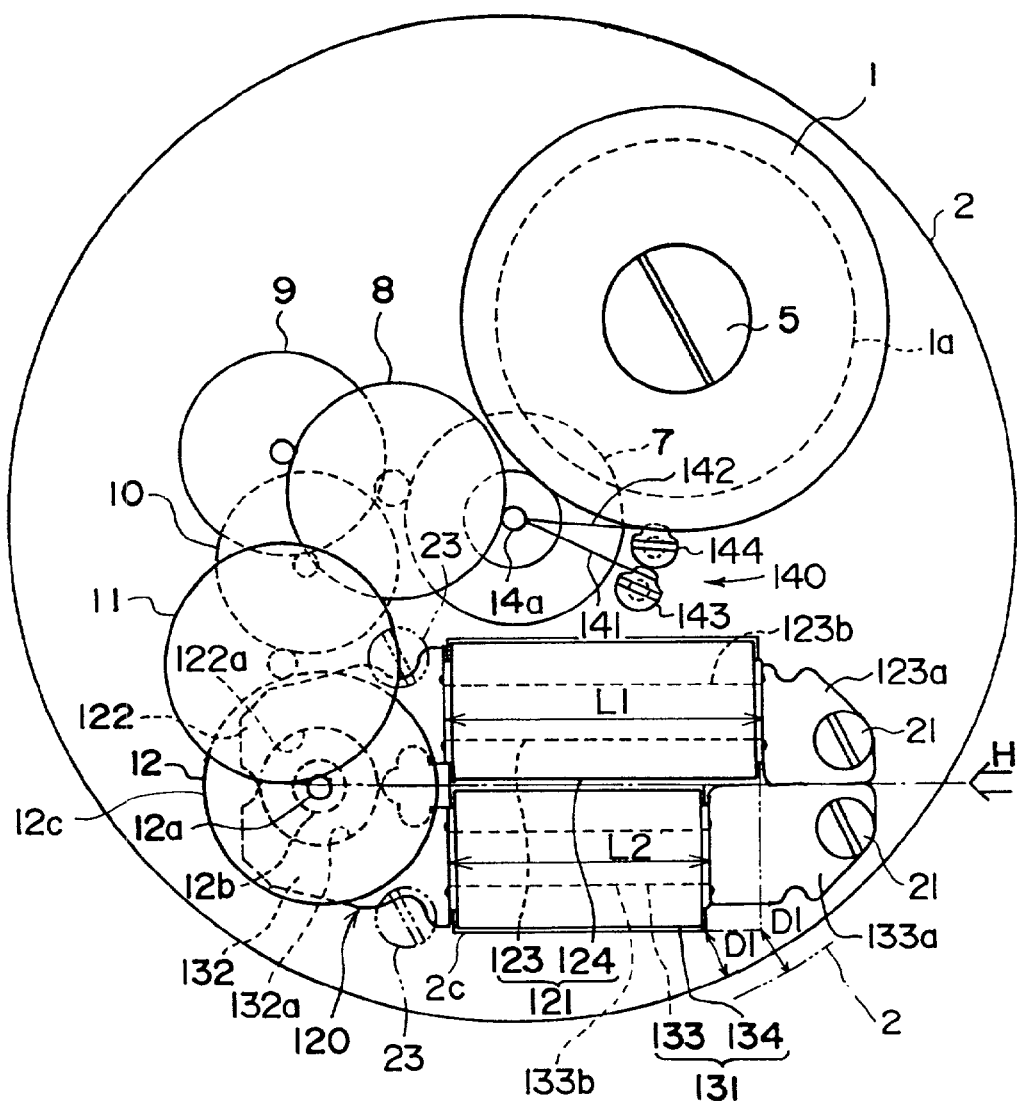

F I G. 9
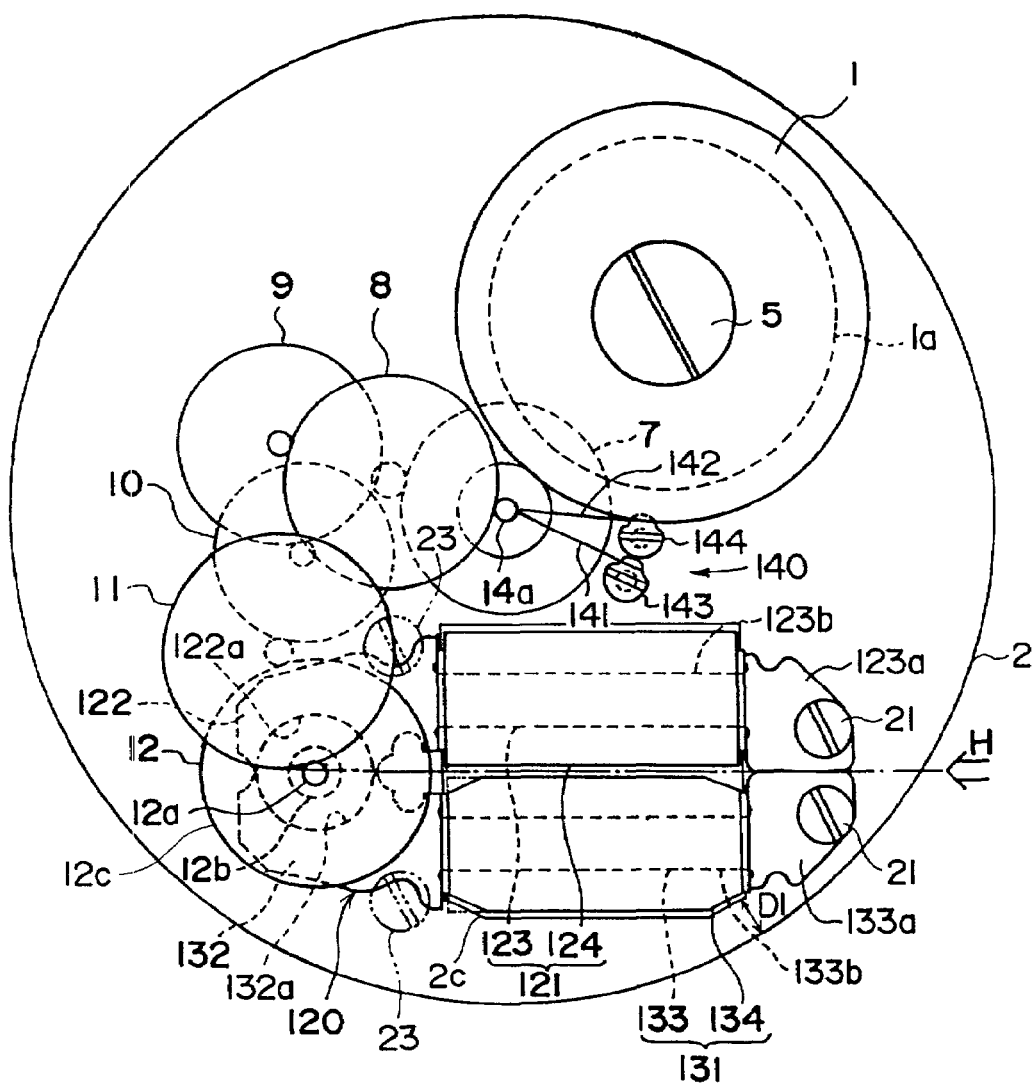

F I G. 19
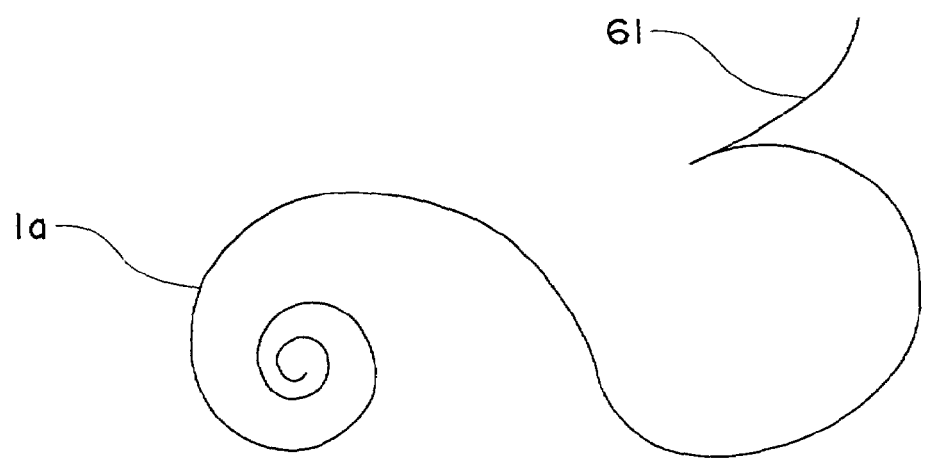

F I G. 21
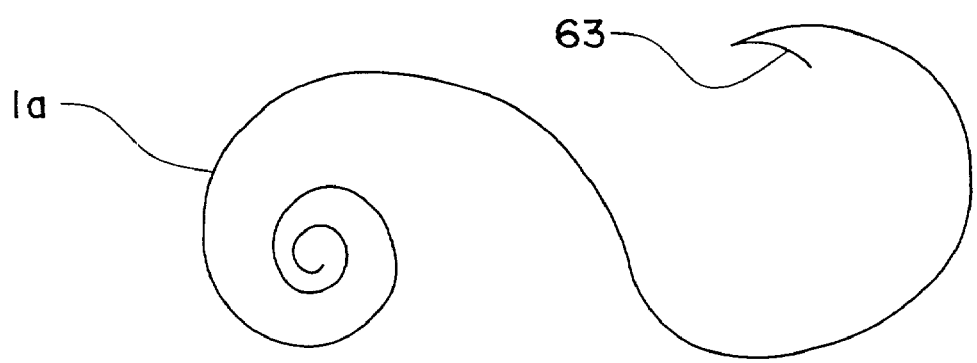

F I G. 31
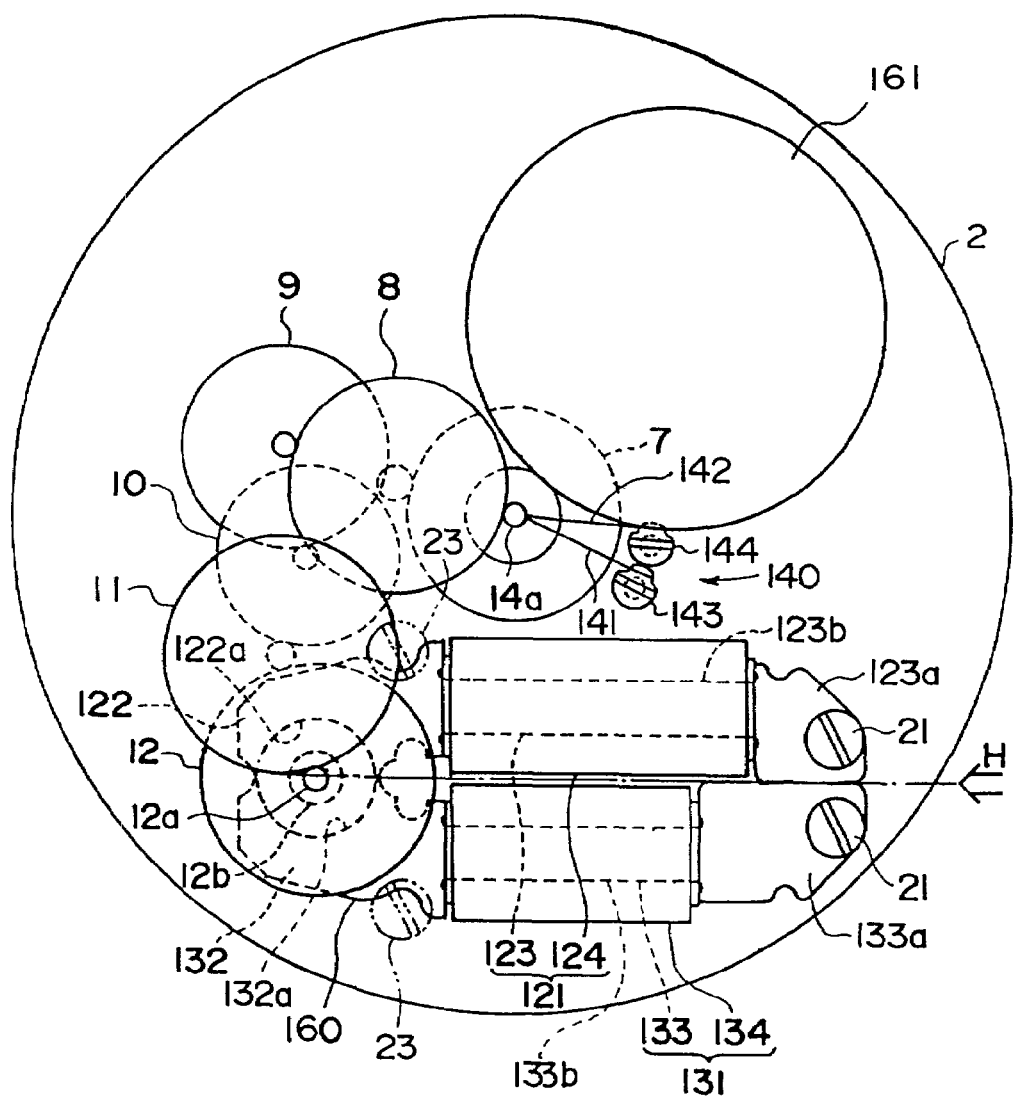

TIMEPIECE DEVICE

TECHNICAL FIELD OF THE INVENTION

The present invention relates to a timepiece, and more particularly to a timepiece provided with an electromagnetic converter for converting mechanical energy into electric energy or converting electric energy into mechanical energy. Specifically, the present invention relates to an improvement of an electronic timepiece provided with a motor, an electronic timepiece provided with a generator and a motor, an electronic-controlled mechanical timepiece provided with a mainspring and a generator, and the like.

BACKGROUND ART

The driving principle of an electronic-controlled mechanical timepiece being mass-produced in recent years is to drive a gear train using a mainspring as an energy source and use a generator coupled to the gear train in place of a mechanical speed regulator consisting of a balance with hair spring and an escape wheel specific to a mechanical timepiece. The generator generates electric power by receiving rotation of the gear train, drives an electronic circuit for control by the electric power generated by this, controls the period of rotation of the generator by a control signal from the electronic circuit, and thereby brakes and regulates the gear train in speed. Therefore, this structure does not need a battery to be a power source for driving an electronic circuit and furthermore, can provide a high accuracy to the same degree as an electronic timepiece of a battery-driving type.

FIG. 33 shows such an electronic-controlled mechanical timepiece.

An electronic-controlled mechanical timepiece is provided with a barrel wheel 1 comprising a mainspring, a barrel gear, a barrel arbor and a barrel case. The mainspring is fixed to the barrel gear at the outer end and fixed to the barrel arbor at the inner end. The barrel arbor is supported by a base plate 2 and a gear train holder, and is fixed to a square-hole wheel 4 by a square-hole screw 5 so as to be turned in one with the square-hole wheel 4. The square-hole wheel 4 is engaged with a pawl so as to turn clockwise but not to turn counterclockwise.

A turning power from the barrel wheel 1 having the mainspring built in it is increased in speed by the gear train consisting of the second wheel and pinion 7, the third wheel and pinion 8, the sweep second wheel and pinion 9, the fifth wheel and pinion 10 and the sixth wheel and pinion 11, and is transferred to a generator 20.

The generator 20 is of a structure similar to a stepping motor for driving a conventional electronic timepiece of a battery-driving type, and comprises a rotor 12 and a pair of coil blocks 15 and 16. The coil blocks 15 and 16 are obtained by connecting members having the same shape with each other in symmetry with respect to a line and are provided with coils having the same volume. This generator 20 feeds the electric power obtained by rotation of the rotor 12 to an electronic circuit provided with a crystal oscillator through an unshown capacitor, and this electronic circuit detects the rotation of the rotor and sends a control signal for controlling the rotation of the rotor according to a reference frequency, and as a result the gear train is turned always at a constant rotation speed according to its braking force.

Thereupon, since the pair of coil blocks 15 and 16 are larger in thickness in comparison with other components, the base plate 2 is provided with an opening 2c for housing the respective coils of the coil blocks 15 and 16 and the timepiece is designed to be thin-shaped by preventing the coils and the base plate 2 from flatly overlapping each other.

When the base plate 2 is provided with the opening 2c, however, there is the possibility that the base plate 2 is reduced in strength at a corner part of the opening 2c close to the perimeter of the base plate 2. Up to now, therefore, a distance for keeping the base plate 2 sufficiently large in strength, namely, distance D1 is set between such a corner of the opening 2c and the perimeter of the base plate 2. Therefore, more reduction in size of an electronic-controlled mechanical timepiece after the present must be promoted as keeping the distance D1.

On the other hand, it is conceivable also to provide a bottomed hollow in place of a through-hole opening 2c in the base plate 2, place the coils in this hollow and eliminate a corner having the distance D1, and thereby make the timepiece small-sized, but in such a case, since it is necessary to make the bottom of the hollow thick enough to surely keep the strength of the base plate 2, there is a problem that the reduction in thickness of a timepiece is hindered.

An object of the present invention is to provide a timepiece capable of being surely made small-sized.

Although such an electronic-controlled mechanical timepiece has a mechanism of winding up its mainspring by hand, a mechanism of automatically winding up the mainspring by means of an oscillating weight is also conceivable, and the improvement of the oscillating weight is also demanded.

Another object of the present invention is to provide a timepiece capable of improving the oscillating weight in performance of turning.

DISCLOSURE OF THE INVENTION

A timepiece according to an aspect of the present invention has an electromagnetic transducer for converting a mechanical energy into an electric energy or for converting an electric energy into a mechanical energy, the electromagnetic transducer comprising a pair of first and second coil, the first coil being disposed on a side of an outer periphery of the timepiece and having a winding core longer than a winding core of the second coil disposed away from the outer periphery of the timepiece.

According to the above aspect of the present invention, since the winding core of a coil arranged nearer to the perimeter of a timepiece is made shorter, the volume of the coil is made smaller and for example in a timepiece, the size of an opening for housing the coils, the opening being provided in a base plate, is made smaller in comparison with the prior art. Accordingly, a timepiece can be reduced in size by making the outer diameter of a base plate smaller as securing the strength of the base plate keeping the distance between the corner part of the opening and the perimeter of the base plate to the same degree as the prior art. And even in case of providing a depressed portion in place of an opening, since the area of the depressed portion is made smaller, the thickness of the bottom of the depressed portion may be small and there is not the possibility that the reduction in thickness of a timepiece is hindered.

At this time, it is preferable that the diameter of a winding wound around the winding core of the first coil is smaller than the diameter of a winding wound around the second coil. Here, "diameter of a winding" means the diameter of a conductor of a winding.

When the winding core is shortened as described above, the number of turns of the winding wound around the winding core is made smaller, but in such an invention since the number of turns is made larger by making the wire diameter smaller, the difference in number of turns between the first coil and the second coil is made smaller and the electromagnetic converter is made difficult to be influenced by an external magnetic field.

And in case of using wire smaller in diameter, it is preferable that a conductivity of the winding with smaller diameter is greater than a conductivity of the winding with greater diameter, so that the electric characteristics of an electromagnetic converter are made stable by reducing the difference in conductor resistance between the respective windings.

Further, instead of making the wire diameter smaller, the number of turns of the first coil may be increased by making the thickness of the coating of a winding wound around the winding core of the first coil thinner than the thickness of a winding wound around the winding core of the second coil.

In such a case, since the conductors of the windings are the same in diameter as each other, good electric characteristics are obtained due to the respective windings made equal in conductor resistance to each other without making the windings different in conductivity from each other.

On the other hand, a timepiece according to another aspect of the present invention has an electromagnetic transducer for converting a mechanical energy into an electric energy or for converting an electric energy into a mechanical energy, the electromagnetic transducer comprising a pair of first and second coil, where a diameter of a winding wound around a winding core of the first coil disposed on a side of an outer periphery of the timepiece is smaller than a diameter of a winding wound around a winding core of the second coil disposed away from the outer periphery of the timepiece.

According to the above aspect of the present invention, since the volume of the first coil is made smaller by the smaller wire diameter than the volume of the second coil by making the respective coils equal in number of turns to each other, the opening for housing the coils is made smaller and therefore the reduction in size of a timepiece is promoted.

Also in this case, it is desirable to stabilize the electric characteristics by making the respective windings different in conductivity of wire from each other.

On the other hand, a timepiece according to further aspect of the present invention has an electromagnetic transducer for converting a mechanical energy into an electric energy or for converting an electric energy into a mechanical energy, the electromagnetic transducer comprising a pair of first and second coil, the first coil being disposed on a side of an outer periphery of the timepiece and having a winding core thinner than a winding core of the second coil disposed away from the outer periphery of the timepiece.

Also in the above aspect of the present invention, since the winding core of the first coil is made thinner, if winding around this winding core by the same number of turns, the wound coil is made smaller in volume and the timepiece is reduced in size.

In this case, it is desirable that the thinner winding core is formed of a material having greater saturation magnetic flux density than the thicker winding core.

In other words, since the winding core of the first coil has greater saturation magnetic flux density, even when the winding core is made thinner, the antimagnetic performance of the whole coils comes to be kept in a good state and is hard to be influenced by an external magnetic field.

And a timepiece of the present invention makes the thickness of the coating of a winding wound around the winding core of the first coil arranged nearer to the perimeter of the timepiece thinner than the thickness of the coating of a winding wound around the winding core of the second coil arranged farther from the perimeter of the timepiece, irrespective of difference in length of the winding cores of the respective coils.

Since the winding core of the first coil of the above arrangement is also made smaller by the smaller wire diameter of a winding by making the respective coils equal in number of turns to each other, the opening for housing the coils is made smaller and in its turn the timepiece is reduced in size.

A timepiece according to still further aspect of the present invention has an electromagnetic transducer for converting a mechanical energy into an electric energy or for converting an electric energy into a mechanical energy, the electromagnetic transducer comprising a pair of first and second coil, where a winding is wound around at least one end of the first coil disposed on a side of an outer periphery of the timepiece to become thinner as getting close to the outer periphery.

According to the above aspect, since a winding is wound so that one end portion is tapered off, for example if a corner portion of the opening for housing the coils is made into a shape following the tapered portion, the area of the opening is made smaller by this portion and therefore it is possible to reduce a timepiece in size by making the outer diameter of a base plate smaller as securing the strength of the base plate by keeping the distance between the corner of the opening and the perimeter of the base plate to the same degree as the prior art.

A timepiece according to still further aspect of the present invention has an electromagnetic transducer for converting a mechanical energy into an electric energy or for converting an electric energy into a mechanical energy, the electromagnetic transducer comprising a pair of first and second coil, where at least the first coil disposed on a side of an outer periphery of the timepiece is configured in line with a configuration of the outer periphery.

In the present invention, an opening for housing coils provided according to the shape of the coils is provided somewhat closely to the middle of the timepiece. Accordingly, the timepiece can be reduced in size by making the outer diameter of the base plate small as securing the strength of the base plate keeping the distance between the corner of the opening and the perimeter of the base plate to the same degree as an existing timepiece.

Although the effect of the above means has been described with respect to a case that an opening for housing coils is provided, since in the present invention an end part of the first coil is positioned nearer to the middle of the timepiece regardless of existence of such an opening, the timepiece can be reduced in size in the same way even in case that no opening is provided.

A timepiece according to still further aspect of the present invention has an electromagnetic transducer for converting a mechanical energy into an electric energy or for converting an electric energy into a mechanical energy, the electromagnetic transducer comprising a pair of first and second coil, where a winding core of the first coil being disposed on a side of an outer periphery of the timepiece is shifted relative to a location of a winding core of the second coil disposed away from the outer periphery of the timepiece to be spaced apart from a bottom of a back cover in cross sectional direction (thickness direction of the back cover).

In the present invention, since a slope like a chamfer is formed near the perimeter of the back cover, the reduction in size of a timepiece can be promoted by it. And it is possible to make the thickness of the timepiece look thinner in design when the whole timepiece is seen from the side.

By the way, in each invention described above, an oscillating weight capable of turning along the perimeter may be provided.

Although each invention described above attempts to reduce a timepiece in size by making the perimeter of the timepiece smaller by the reduction in volume of coils, this invention keeps the size of the perimeter of the timepiece as it is up to now. When doing in such a way since the end part of the coil is made farther from the perimeter of the case, the perimeter (skirt) of an oscillating weight can be made larger utilizing the space between the end of the coil and the perimeter of the case. Therefore, since the center of gravity of the oscillating weight is set nearer to the perimeter, the oscillating weight is increased in moment of inertia and is improved in performance of turning, and thereby the other object can be attained.

It is desirable that the position of the winding core of the first coil is farther in the sectional direction from the oscillating weight (in the direction along the axis of rotation of the oscillating weight) than the position of the winding core of the second coil.

According to the above arrangement, since the first coil is spaced apart from an oscillating weight relative to the second coil, the size of an oscillating weight, particularly the size of the perimeter portion of it can be made larger inside the case and thereby the oscillating weight is increased in moment of inertia and the object can be attained.

In a timepiece having an oscillating weight, it is desirable that a part of a magnetism-conducting portion forming the electromagnetic converter extends to a position where it planarly overlaps the skirt portion provided outer periphery side of the oscillating weight.

In such a case, since the sectional area of a magnetism-conducting portion is enlarged by the extension thereof, the magnetic path in an electromagnetic converter is secured to be larger and thereby the electromagnetic converter is improved in performance.

By the way, a conventional mechanical timepiece driven by using a mechanical energy storage such as a mainspring is sometimes provided with a self-winding portion being a mechanical energy automatic input portion utilizing an oscillating weight in addition to a hand-winding portion being a mechanical energy manual input portion for winding the mainspring. In such a case, up to now, the hand-winding portion and the self-winding portion are generally arranged opposite to each other with a barrel having a mainspring built in it between them so that they do not interfere with each other.

In such an electronic-control mechanical timepiece as described in the section "Background Art", there is a problem that the timepiece is poor in efficiency of space and is difficult to reduce in size.

Specifically, an electronic-control mechanical timepiece has two comparatively large components being a mainspring and a generator. Since they are comparatively large in thickness and in size, they are arranged at positions different flatly from other components in a movement. And a gear train for transferring a rotational force from the mainspring to the generator is placed at a position adjacent to the hand-winding portion of the barrel.

Accordingly, the self-winding portion arranged at the opposite side to the hand-winding portion with the barrel between them results in being disposed closely to the generator. At this time, since the generator is the largest in thickness and size due to having coils wound around it, when the self-winding portion is disposed over the generator, the thickness of the timepiece (movement) results in being large.

On the other hand, since the generator must be shifted in position and be placed at a position different flatly from the self-winding portion in order to reduce the thickness, the movement results in being large in area.

Therefore, in case of assembling both of a hand-winding portion and a self-winding portion into an electronic-control mechanical timepiece, there is a problem that it is difficult to reduce the timepiece in size due to its thick movement or its large flat area. And also in case of providing both a hand-winding portion and a self-winding portion in not only an electronic-control mechanical timepiece but also various timepieces each being provided with a mechanical energy storage such as a mainspring and a generator, there is the same problem.

In order to solve such a problem, it is desirable that the electromagnetic transducer is a power generator for converting the mechanical energy into the electric energy, and has a mechanical energy storage for storing the mechanical energy, a mechanical energy manual input portion for manually inputting the mechanical energy into the mechanical energy storage, and a mechanical energy automatic input portion for automatically inputting the mechanical energy into the mechanical energy storage, the mechanical energy manual input portion and the mechanical energy automatic input portion being provided on one side (first side) of the mechanical energy storage, the power generator being provided on the other side (second side) of the mechanical energy storage opposite to the mechanical energy manual input portion and the mechanical energy automatic input portion sandwiching the mechanical energy storage.

At this time, a mainspring wound in the shape of an eddy or the like can be utilized as a mechanical energy storage.

According to such an invention, since a mechanical energy manual input portion and a mechanical energy automatic input portion are provided at the opposite side to a generator with a mechanical energy storage between them, the generator and the mechanical energy automatic input portion do not overlap each other. Therefore, the increase not only in thickness of a movement caused by overlapping of the generator and the mechanical energy automatic input portion but also in flat size of the movement caused by shifting the generator and the mechanical energy automatic input portion from each other so that they do not overlap flatly each other in order to prevent the increase in thickness does not occur. Thus, the efficiency of space inside a timepiece is improved, the increase in area or thickness, of a movement can be suppressed, and a timepiece can be reduced in size even in case of being provided with a mechanical energy automatic input portion such as a self-winding mechanism or the like.

And since most of the components forming a mechanical energy manual input portion and a mechanical energy automatic input portion are made of iron, there is the possibility that the use of them for a long period generates wear powder caused by the abrasion between the components. Additionally, there is the possibility that when the generator is placed closely to these mechanical energy manual input portion and mechanical energy automatic input portion, the wear powder enters the generator and thereby the generator is stopped.

Thereupon, like this invention, when a mechanical energy manual input portion and a mechanical energy automatic input portion are provided at the opposite side to a generator with a mechanical energy storage between them, the mechanical energy manual input portion and the mechanical energy automatic input portion can be kept apart from the generator by the width of the mechanical energy storage, and thereby it can be almost prevented for the wear powder to enter the generator.

Further since most of the components forming a mechanical energy manual input portion and a mechanical energy automatic input portion are made of iron, when they are disposed closely to the generator there is the possibility that an iron loss is caused by some leakage flux from the generator and the antimagnetic performance is degraded.

Thereupon, like this invention, when a mechanical energy manual input portion and a mechanical energy automatic input portion are provided at the opposite side to a generator with a mechanical energy storage between them, since the mechanical energy manual input portion and the mechanical energy automatic input portion can be kept distant from the generator, the occurrence of iron loss in the mechanical energy manual input portion and the mechanical energy automatic input portion can be suppressed and the antimagnetic performance can be improved.

A winding shaft being also a mechanical energy manual input portion can be moved up and down relative to the main body of a timepiece, there is the possibility that moisture or the like enters the inside of the timepiece.

When moisture or the like enters the generator, the generator may get out of order. Thereupon, when a mechanical energy manual input portion and a mechanical energy automatic input portion are placed near a winding shaft and a generator is placed distantly from the winding shaft with a mechanical energy storage between them, there is little the possibility that moisture or the like enters the generator and the durability of a timepiece can be improved.

In the above arrangement, it is desirable that a mechanical energy transfer means for transferring the mechanical energy stored in a mechanical energy storage to the rotor of a generator is disposed between the mechanical energy manual input portion and the mechanical energy automatic input portion, and the generator.

Hereupon, the mechanical energy transfer means is composed of a gear train, a timing belt and pulleys, a chain and sprocket wheels, and the like.

When composed in such a way, since a mechanical energy transfer means of a gear train and the like is disposed between the mechanical energy manually and automatically inputting portions and the generator, the wear powder being liable to be produced in the mechanical energy manually and automatically inputting portions by a large torque applied to them is hard to enter the generator (particularly the rotor) and does not impair the performance of the generator.

In the timepiece of the present invention, it is desirable that the electromagnetic transducer is a power generator for converting the mechanical energy into the electric energy and has a mechanical energy storage for storing the mechanical energy, the timepiece having a sequential arrangement of a mechanical energy manual input portion for manually inputting the mechanical energy into the mechanical energy storage, a mechanical energy automatic input portion for automatically inputting the mechanical energy into the mechanical energy storage, the mechanical energy storage and the power generator along a circumferential direction of the timepiece from an external manipulation member.

According to the above arrangement, since a mechanical energy storage is disposed between mechanical energy manually and automatically inputting portions and a generator, the generator and the mechanical energy automatic input portion do not overlap each other. Therefore, it is possible to improve the efficiency of space inside a timepiece and suppress the increase in area or thickness of a movement, and reduce the timepiece in size even when it is provided with a mechanical energy automatic input portion such as a self-winding mechanism or the like.

Even when wear powder is produced in a mechanical energy manual input portion and a mechanical energy automatic input portion, the wear powder is almost prevented from entering the inside of a generator and the degradation in performance can be prevented. Additionally, since the occurrence of iron loss in the respective inputting portions caused by leakage flux or the like from the generator can be suppressed, the antimagnetic performance can be also improved.

Since a generator is placed distantly from an external operation member such as a winding crown for operating a mechanical energy manual input portion, there is little the possibility that moisture or the like enters the generator, and the durability of a timepiece can be improved.

In the timepiece of the present invention, an energy storage display for displaying an amount of the mechanical energy stored in the mechanical energy storage, the energy storage display being disposed between the mechanical energy storage and the power generator may preferably be provided.

In this case, when the mechanical energy storage is composed of a mainspring wound in the shape of an eddy, it is preferable that an energy storage display is composed of a residual-spring-energy-indicating mechanism for indicating the residual spring energy of a mainspring.

Such an energy storage display is usually thin in thickness and arranged on a dial. Due to this, an energy storage display can be disposed over a part of a generator, and thereby a space near the dial between the mechanical energy storage and the generator can be effectively utilized.

In case that an energy storage display is a residual-spring-energy-indicating mechanism, the structure of the residual-spring-energy-indicating mechanism is simplified by providing the residual-spring-energy-indicating mechanism near a mainspring being a mechanical energy storage, and from this point also, it is possible to improve the efficiency of space inside the timepiece.

By the way, since a small-sized generator built in such a timepiece is limited in size, an oscillating weight or a mainspring also is limited in size and a driving torque for driving the generator has been small. Accordingly, there has been a problem that when a cogging torque applied to a rotor at the time of starting the rotor to rotate from the state where the rotor of the generator is at a stop is large, a driving torque large enough to overcome the cogging torque and turn the rotor is not obtained and the rotor is difficult to start or is not restarted when the rotor is stopped by a shock applied to the timepiece.

Particularly, since an electronic-control mechanical timepiece rotating the rotor of a generator through a speed increasing gear train from a mainspring is smaller in driving torque in comparison with a generator rotating the rotor by means of an oscillating weight, it has been necessary to more reduce the influence of a cogging torque.

Therefore, conventionally, inner notches have been formed in the stator faces facing the rotor magnet in order to reduce a cogging torque. Specifically, adjustment has been performed so that the whole cogging torque is made zero by adding to each other the cogging torque in case of forming no inner notches and the cogging torque in case of forming inner notches.

On the other hand, a general generator including the above-mentioned generators is provided with a stator and a winding core, and these are formed out of metal members of at least two bodies in order to make easy a wire winding operation for a coil.

In case that they are formed out of two bodies, however, there is a junction between the respective members in a magnetic circuit. Since when there is a junction between the respective members in a magnetic circuit the magnetic resistance varies greatly according to the state of junction, there has been a problem that in assembled individual generators the cogging torque varying according to the magnetic resistance in a magnetic circuit is liable to vary in magnitude.

And when the cogging torque varies, there has been a problem that the cogging torque cannot be completely canceled to be zero even when forming inner notches being equal in size to each other and it is difficult to make the cogging torque small enough.

Since such a generator which cannot sufficiently reduce a cogging torque and is poor in its starting performance is disposed of as a defective in an inspection process, there has been a problem that the yield rate is degraded by it and the cost of production is made higher.

Accordingly, in a timepiece of the present invention, it is desirable that the electromagnetic transducer has a rotor, a stator and the coil wound around the stator, the stator comprising a pair of stator portion adjacent to the rotor and a pair of the winding core with the coil being wound around, one of the stator portions and the other stator portion being integrated through respective winding cores.

In such a case, since a stator including stator portions and winding cores is formed into one body and there is no junction between the respective members, the magnetic resistance does not vary and variation in cogging torques applied to a rotor at the time of starting the rotor to rotate from the state where the rotor of the generator is at a stop can be made small and the value of a cogging torque is made stable.

BRIEF DESCRIPTION OF THE DRAWINGS

FIG. 1 is a plan view showing a first embodiment of the present invention.

FIG. 9 is a plan view showing a fourth embodiment of the present invention.

FIG. 19 is a plan view showing a mainspring in the eighth embodiment.

FIG. 21 is a plan view showing a mainspring in the ninth embodiment.

FIG. 31 is a plan view showing a variant example of the present invention.

BEST MODE FOR CARRYING OUT THE INVENTION

Embodiments of the present invention are described with reference to the drawings in the following. In a first embodiment, the same components as the components described in the prior art are given the same symbols. And in the second or later embodiment, the same components as those of the prior art and the first embodiment are given the same symbols, and the description of them is omitted or simplified.

First Embodiment

Figure 2:
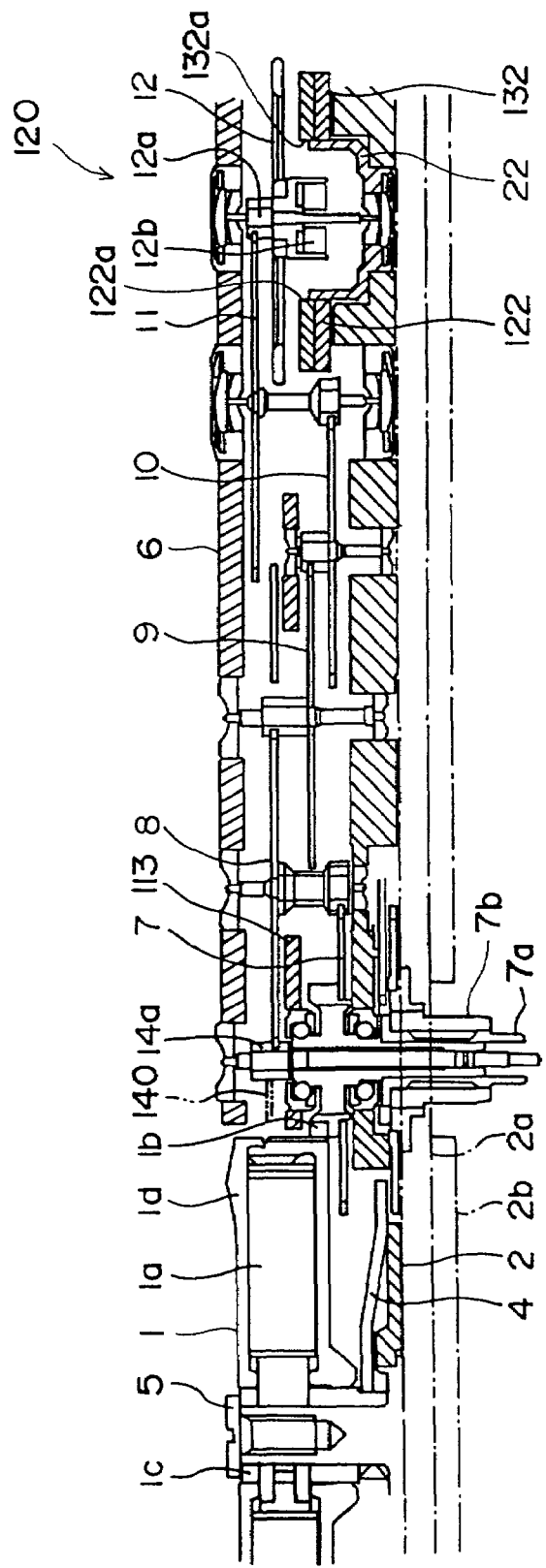
FIG. 2 is a sectional view showing the first embodiment.
Figure 3:
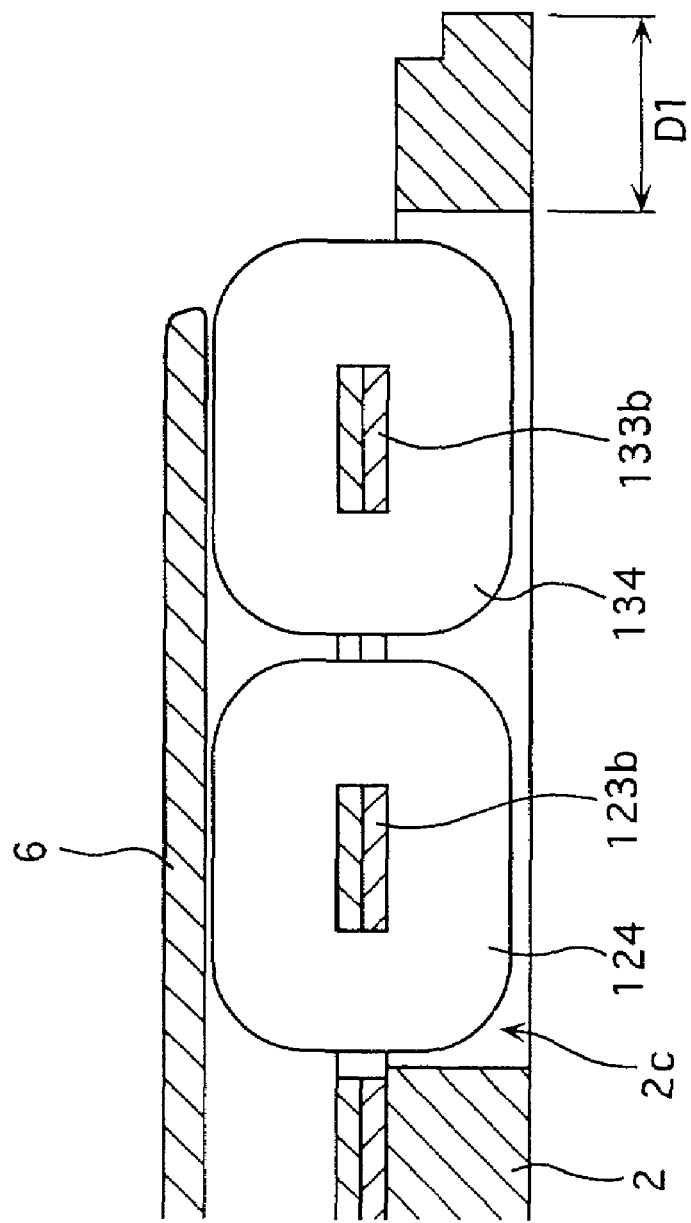
FIG. 3 is a sectional view showing a main part of the first embodiment.

FIG. 1 is a plan view showing an electronic-controlled mechanical timepiece according to the present invention, and FIGS. 2 and 3 are sectional views of it.

An electronic-controlled mechanical timepiece is provided with a barrel wheel 1 comprising a mainspring 1a, a barrel gear 1b, a barrel arbor 1c and a barrel case id. The mainspring 1a is fixed to the barrel gear 1b at the outer end of it and fixed to the barrel arbor 1c at the inner end. The barrel arbor 1c in the shape of a sleeve has a support member fitted onto it, the support member being provided on a base plate 2 being in the shape of a flat disk, and is fixed by a square-hole screw 5 to be turned in one with a square-hole wheel 4. And the base plate 2 has a calendar plate 2a and a disk-shaped dial plate 2b attached to it. Symbol 6 in FIGS. 2 and 3 is a gear train holder.

Hereupon, in this embodiment, a mechanical energy is an elastic force generated by deformation such as flexion of the mainspring 1a when the mainspring 1 is wound up.

The rotation of the barrel gear 1b is increased in speed at 126,000 times through the respective ordered wheels 7 to 11 forming a speed increasing gear train. At this time, the respective ordered wheels 7 to 11 are provided on the respective different axes arranged at such positions that they do not overlap coils 124 and 134 described later and form a path for transferring a torque from the mainspring 1a.

The unshown minute hand for indicating time is fixed on a cannon pinion 7a engaged with the second wheel and pinion 7 and the unshown seconds hand for indicating time is fixed on a seconds-hand pinion shaft 14a. Therefore, in order to turn the second wheel and pinion 7 at 1 rph and the seconds-hand pinion shaft 14a at 1 rpm, it is enough to control a rotor 12 to rotate at 5 rps. At this time the barrel gear 1b is turned at ⅐ rph.

And the seconds-hand pinion shaft 14a being out of the torque transferring path has backlash eliminated by being pressed by a pointer control device 140 provided between the barrel wheel 1 and a coil 124. The pointer control device 140 is composed of a pair of linear control springs 141 and 142 being Teflon-treated or surface-treated with an intermolecular-bond coat and the like, and collets 143 and 144 as fixing members which support the base end side of each of the control springs 141 and 142 and are fixed on a second holder 113.

The electronic-controlled mechanical timepiece is provided with a generator 120 as an electromagnetic converter composed of a rotor 12 and coil blocks 121 and 131. The rotor 12 is provided with a rotor pinion 12a, rotor magnets 12b and a rotor inertia disk 12c. The rotor inertia disk 12c is intended for reducing variation in rotation speed of the rotor 12 against variation in driving torque of the barrel wheel 1.

The coil blocks 121 and 131 have respectively coils 124 and 134 formed by winding around stators (cores or magnetic cores) 123 and 133. The stators 122 and 133 are obtained by forming core stator portions 122 and 132 arranged adjacently to the rotor 12, winding core 123b and 133b on which the coils 124 and 134 are formed, and core magnetism conducting portions 123a and 133a into one body.

The stators 123 and 133, namely, the coils 124 and 134 are arranged in parallel with each other. And such stators 123 and 133 each have a two-layer structure and made of PC material for example.

As shown in FIG. 2, a positioning member 22 is arranged in stator hole parts 122a and 132a of the stators 123 and 134 having the rotor 12 disposed therein. Eccentric pins 23 are arranged in the intermediate parts in the longitudinal direction of the stators 123 and 133, namely, between the core stator portions 122, 132 and the core magnetism conducting portions 123a, 133a. By turning the eccentric pins 23, it is possible to make the core stator portions 122 and 132 of the stators 123 and 133 come into contact with the positioning member 22 and thereby accurately and easily position them, and bring the side faces of the core magnetism conducting portions 123a and 133a fixed by screws 21 into contact with each other.

The core magnetism conducting portions 123a and 133a of the stators 123 and 133 are joined by being brought into contact with each other on their side faces. And the undersides of the core magnetism conducting portions 123a and 133a are brought into contact with an unshown yoke arranged over the core magnetism conducting portions 123a and 133a. By this, in the core magnetism conducting portions 123a and 133a two magnetism conducting paths one of which passes the side face portions of the core magnetism conducting portions 123a and 133a and the other of which passes the undersides of the core magnetism conducting portions 123a and 133a and the yoke are formed, and the stators 123 and 133 form an annular magnetic circuit. The respective coils 124 and 134 have wire wound in the same direction relative to the direction from the core magnetism conducting portions 123a and 133a of the stators 123 and 133 toward the core stator portions 122 and 132.

The ends of the coils 124 and 134 are connected with an unshown coil lead substrate provided on the core magnetism conducting portions 123a and 133a of the stators 123 and 133.

In case of using an electronic-controlled mechanical timepiece composed in such a way, when an external magnetic field H (see FIG. 1) is applied to the coils 124 and 134, since the external magnetic field H is applied to the coils 124 and 134 arranged in parallel with each other in the same direction, the external magnetic field H results in being applied in the directions inverse to each other relative to the winding direction of the coils 124 and 134. Thus, since electromotive forces generated in the coils 124 and 134 by the external magnetic field H act so as to cancel each other, its influence can be reduced.

The most characteristic composition of the present invention is described in the following.

In FIG. 1, the length L2 of the winding core 133b of the coil block 131 being nearer to the perimeter of the base plate 2 out of the pair of coil blocks 121 and 131 is shorter than the length L1 of the winding core 123b of the coil block 121 (L1>L2). Therefore, this embodiment makes the wire diameter of a conductor wound around the winding core 133b smaller than the wire diameter of a conductor wound around the winding core 123b (coatings to cover the conductors are the same in thickness), and thereby forms the coil 124 larger in volume and the coil 134 smaller in volume as keeping the winding cores 124 and 134 equal in number of turns to each other. "Being equal in number of turns" includes not only a case of being completely equal in number of turns but also a case of having an error being negligible as the whole coils, for example, a difference of several hundred turns.

And this embodiment makes the conductivity of a winding forming the coil 134 larger than the conductivity of a winding forming the coil 124, and thereby reduces the difference in conductor resistance between the respective windings when they are different in wire diameter.

As shown in FIG. 3, the lower parts in FIG. 3 of such coils 124 and 134 are put in an opening 2c provided in the base plate 2 and thereby a timepiece is made thinner by preventing the base plate 2 and the coils 124, 134 from flatly overlapping each other. The flat shape of the opening 2c is stepped at its right side in FIG. 1 according to the position of arrangement of the coils 124 and 134. Therefore, the distance D1 between the nearest corner of the opening 2c to the perimeter of the base plate 2 and the perimeter of the base plate 2 is the same as the distance D1 in case of the prior art in which an opening 2c in the shape of a rectangle (shown by an alternate long and two short dashes line), and thereby the strength of this corner part of the base plate 2 is secured.

Figure 4:
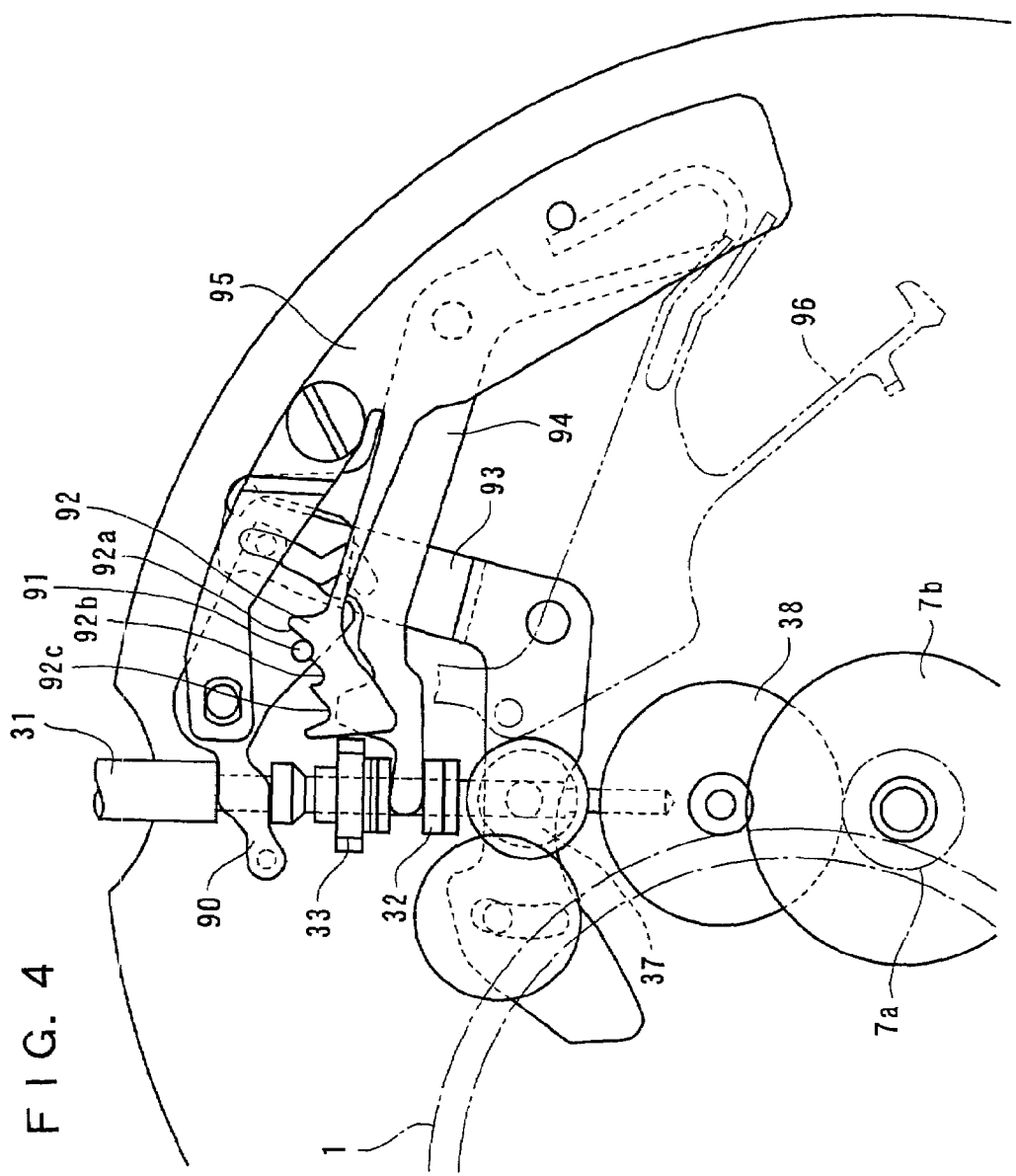
FIG. 4 is a plan view showing a main part of the first embodiment.

Next, the switchover operation of such a timepiece is described with reference to FIG. 4 also. FIG. 4 is a plan view of the timepiece in case of being seen from the opposite side to FIG. 1.

An electronic-controlled mechanical timepiece is composed so as to wind up the mainspring 1*a* by turning the square-hole wheel 4 (FIG. 2) through a crown wheel 33, a circular-hole wheel (not illustrated) and the like by operating a winding shaft 31 joined to an unshown crown at the time of an ordinary operation in which a pin 91 of a duck-shaped member 90 is in the zero position 92*a* of a click spring 92.

And when the pin 91 is set on the first position 92*b* by pulling the winding shaft 31, since a intermediate lever 93 is not moved and only a latch 94 is moved and a clutch wheel 32 is engaged with a intermediate wheel 37, a calendar can be corrected through a calendar correction transfer wheel (not illustrated).

The hand correcting operation for correcting the minute hand and the hour hand is performed by moving the winding shaft 31 in the axial direction by pulling the crown, setting the pin 91 on the second position 92*c*, moving and engaging the clutch wheel 32 with the intermediate wheel 37 by means of the action of the duck-shaped member 90, a latch holder 95 and the latch 94, and moving and engaging the intermediate wheel 37 with a minute wheel 38, and turning the cannon pinion 7*a* and the hour-wheel 7*b*, as shown in FIG. 2 also.

The electronic-controlled mechanical timepiece is provided with a reset lever 96. This reset lever 96 is a starting member which is operated by movement of the duck-shaped member 90 when the crown pulled out is pushed back and which gives a turning force directly to the rotor 12 to turn.

This embodiment as described above brings the following effects.

(1) Since in the generator 120 the winding core 133*b* for the coil 134 arranged nearer to the perimeter of the base plate 2 is shorter than the winding core 123*b* for the coil 124 arranged more inside and the area of the opening 2*c* is smaller in comparison with the prior art, this embodiment can make a timepiece more small-sized by making the base plate 2 smaller in diameter as securing the strength of the base plate 2 through keeping the distance D1 between the corner part of the opening 2*c* and the perimeter of the base plate 2 equal to that of the prior art.

(2) Since the diameter of wire wound around the winding core 133*b* for the coil 134 is smaller than the diameter of wire wound around the winding core 123*b* for the coil 124, the number of turns of the former can be made more. Due to this, although the width of the winding on the winding core 133*b* in the coil 134 is smaller, the coil 134 can have the same number of turns as the coil 124 and it is possible to make the timepiece be difficult to be influenced by an external magnetic field by reducing the difference in number of turns between the coils 124 and 134.

(3) Since the conductivity of a winding of the coil 134 being smaller in wire diameter is larger than the conductivity of a winding of the coil 124 being larger in wire diameter, it is possible to make small the difference in conductor resistance between the respective windings and keep stable the electric characteristics as the generator 120.

(4) Since the strength of the base plate 2 is sufficiently secured by keeping the distance D1, it is possible to improve the shock resistance of a timepiece when it is dropped and thereby improve the reliability of it.

Second Embodiment

Figure 5:
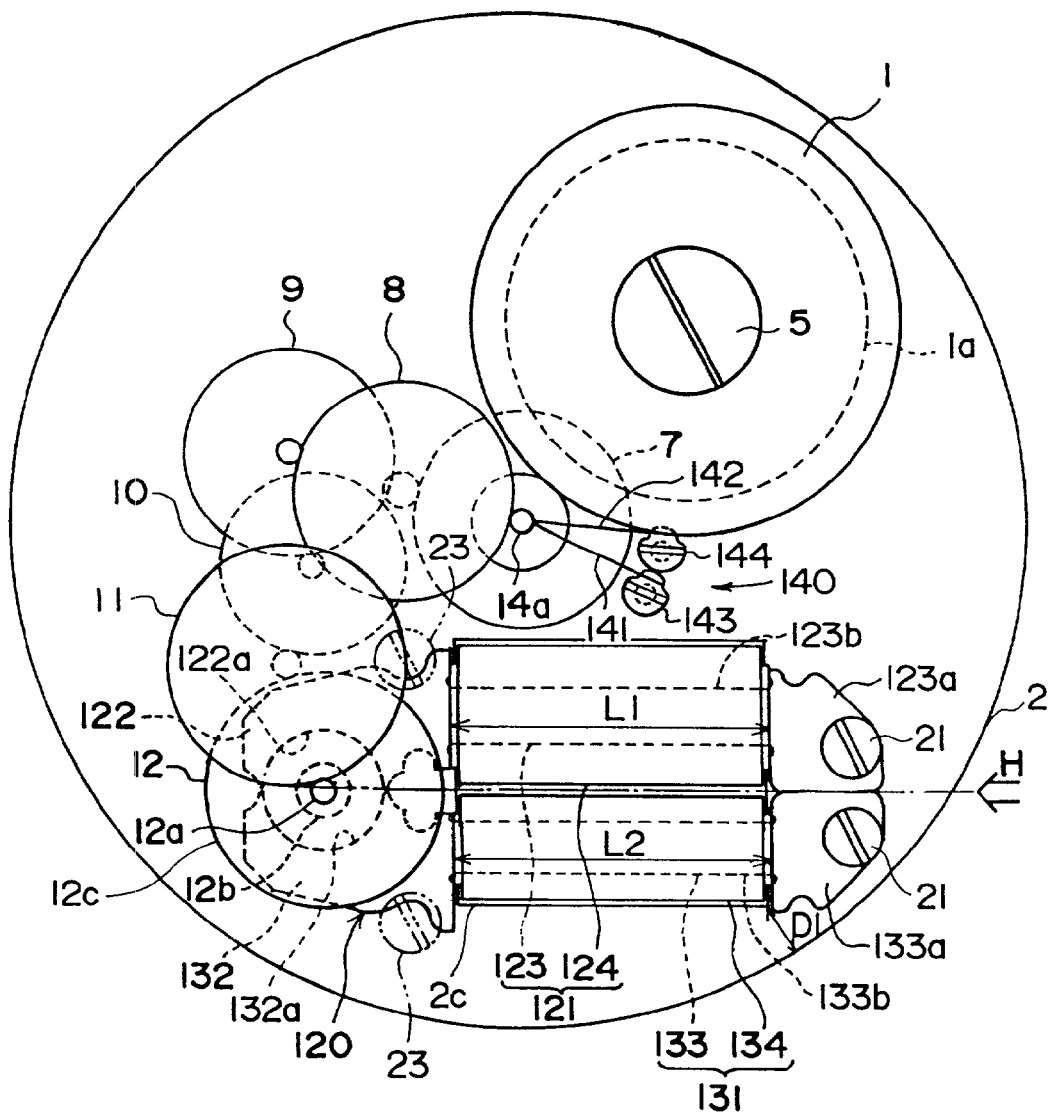
FIG. 5 is a plan view showing a second embodiment of the present invention.
Figure 6:
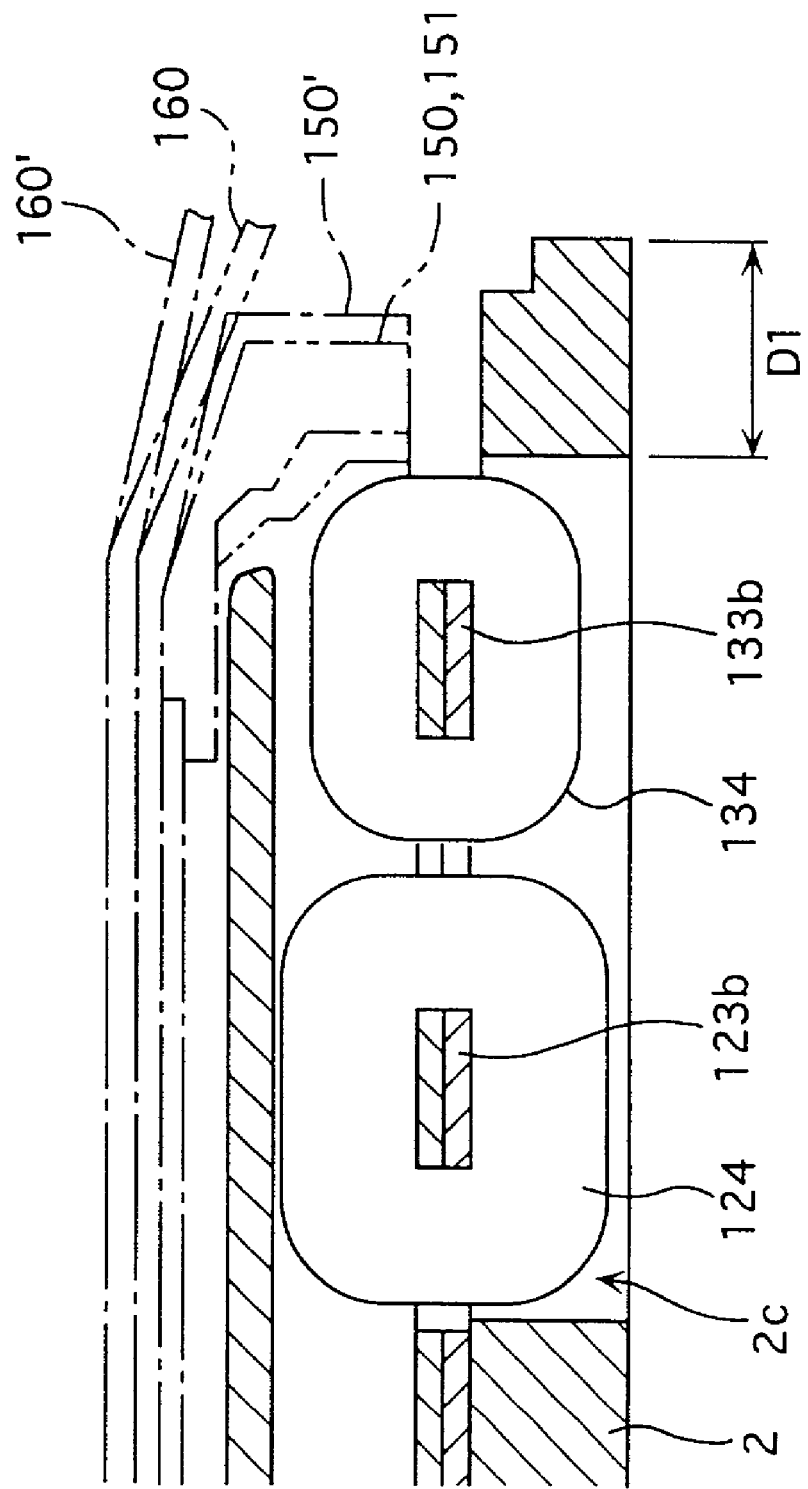
FIG. 6 is a sectional view showing the second embodiment.

A second embodiment of the present invention is described with reference to FIGS. 5 and 6.

In an electronic-controlled mechanical timepiece of this embodiment, the lengths L1 and L2 of the winding cores 123*b* and 133*b* are the same as each other (L1=L2), but a winding wound around the winding core 133*b* is smaller in wire diameter than a winding wound around the winding core 123*b*. The respective windings are the same as each other in number of turns. And the conductivity of the wire smaller in diameter is larger than the conductivity of the wire larger in diameter.

This embodiment brings the following effects.

(5) Since a winding wound around the winding core 133*b* is smaller in wire diameter than a winding wound around the winding core 123*b*, this embodiment having the same number of turns in the coils 124 and 134 can make the coil 134 smaller in volume by its smaller wire diameter and can make the opening 2*c* smaller in area. Although this embodiment is different in composition from the first embodiment, therefore, this embodiment can provide the effect (1) described above in the same way. And it can provide also the effects (3) and (4) described above in the same way.

Third Embodiment

Figure 7:
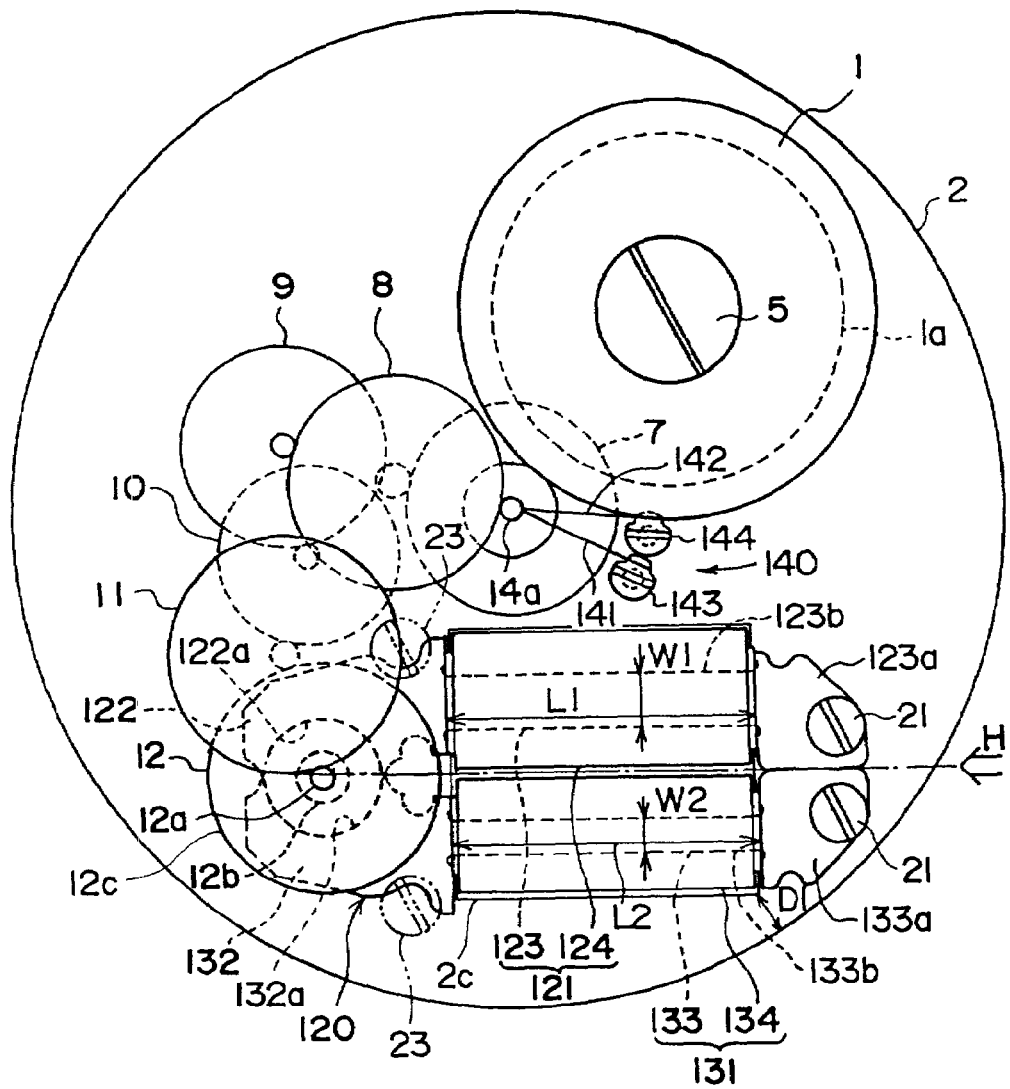
FIG. 7 is a plan view showing a third embodiment of the present invention.
Figure 8:
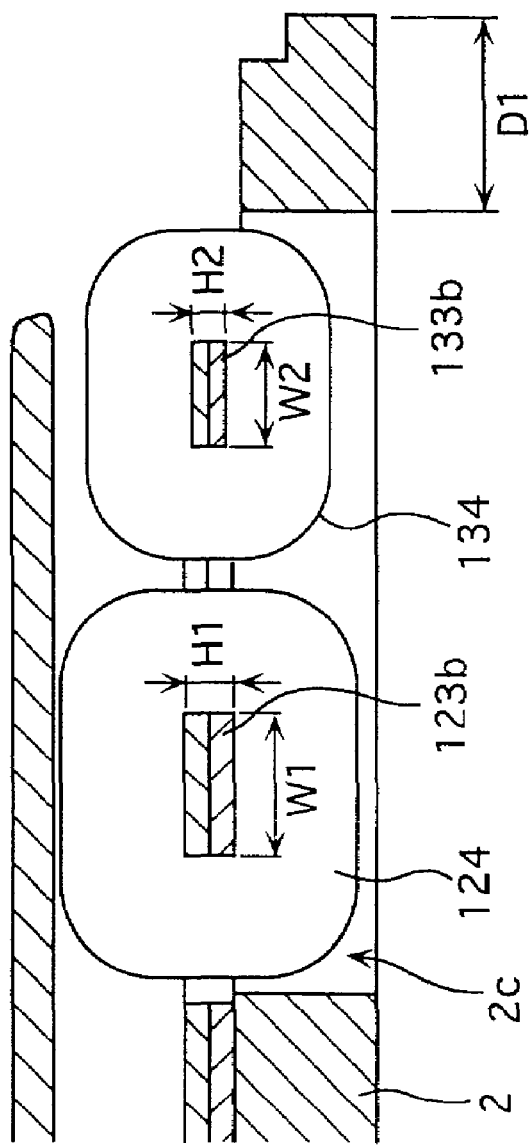
FIG. 8 is a sectional view showing the third embodiment.

A third embodiment of the present invention is described with reference to FIGS. 7 and 8.

In an electronic-controlled mechanical timepiece of this embodiment, the lengths L1 and L2 of the winding cores 123*b* and 133*b* are the same as each other (L1=L2), but the width W2 and thickness H2 of the winding core 133*b* are smaller than the width W1 and thickness H1 of the winding core 123*b* (W1>W2, H1>H2) and the winding core 133*b* is made thinner. And the winding core 123*b* is made of a PC material, whereas the winding core 133*b* is made of a PB material being larger in saturation magnetic flux density. This embodiment brings the following effects.

(6) Since the winding core 133*b* is made thinner than the winding core 123*b*, this embodiment; having the coils 124 and 134 being equal in number of turns and in wire diameter can make the coil 134 smaller in volume by its thinner winding core 133*b* and can make the opening 2*c* smaller in area. Although this embodiment is different in composition from the above-mentioned embodiments, therefore, this embodiment also can provide the effect (1) described above in the same way. And it can provide also the effect (4) described above in the same way.

(7) Since the winding core 133*b* is larger in saturation magnetic flux density than the winding core 123*b*, even when the winding core 133*b* is made thinner, this embodiment can keep well the antimagnetic performance of the coils 124 and 134 as a whole, and can make the timepiece be difficult to be influenced by an external magnetic field.

In this embodiment, both the widths W1, W2 and the thickness H1, H2 of the winding cores 123*b* and 133*b* are different from each other, but even when only the widths W1 and W2 are different, the effect (6) described above can be obtained nearly in the same way. Since it can be expected to be slightly thinned by making the thickness H1 and H2 also different from each other, however, the composition of this embodiment is preferable.

Fourth Embodiment

FIG. 9 shows a fourth embodiment of the present invention.

In an electronic-controlled mechanical timepiece of this embodiment, both end parts of the coil 134 are tapered off. Such a taper is formed positively by gradually concentrating the turns of wire onto the winding core 133b toward the middle part of the coil 134 and is different from a slight taper necessarily formed at an end part of a coil. And corner parts of the opening 2c are formed into a shape adapted to the tapered part of the coil 134, and the distance D1 between the corner part of the opening 2c and the perimeter of the base plate 2 is sufficiently secured.

This embodiment brings the following effects.

(8) Since the end parts of the coil 134 are tapered off, the opening 2c can be made smaller in area by forming the corner parts of the opening 2c into a shape following the tapered shape. Although this embodiment is different in composition from the above-mentioned embodiments, therefore, this embodiment also can provide the effect (1) described above in the same way. And it can provide also the effect (4) described above in the same way.

In this embodiment, both end parts of the coil 134 are tapered off, but only the right end part in FIG. 9 may be tapered off, and even in such a case, the effect (8) can be obtained.

And the tapered part of the coil 134 as described above may be formed by winding around the winding core 133b of the coil 134, the winding core 133b itself being tapered off at an end part of it.

Fifth Embodiment

Figure 10:
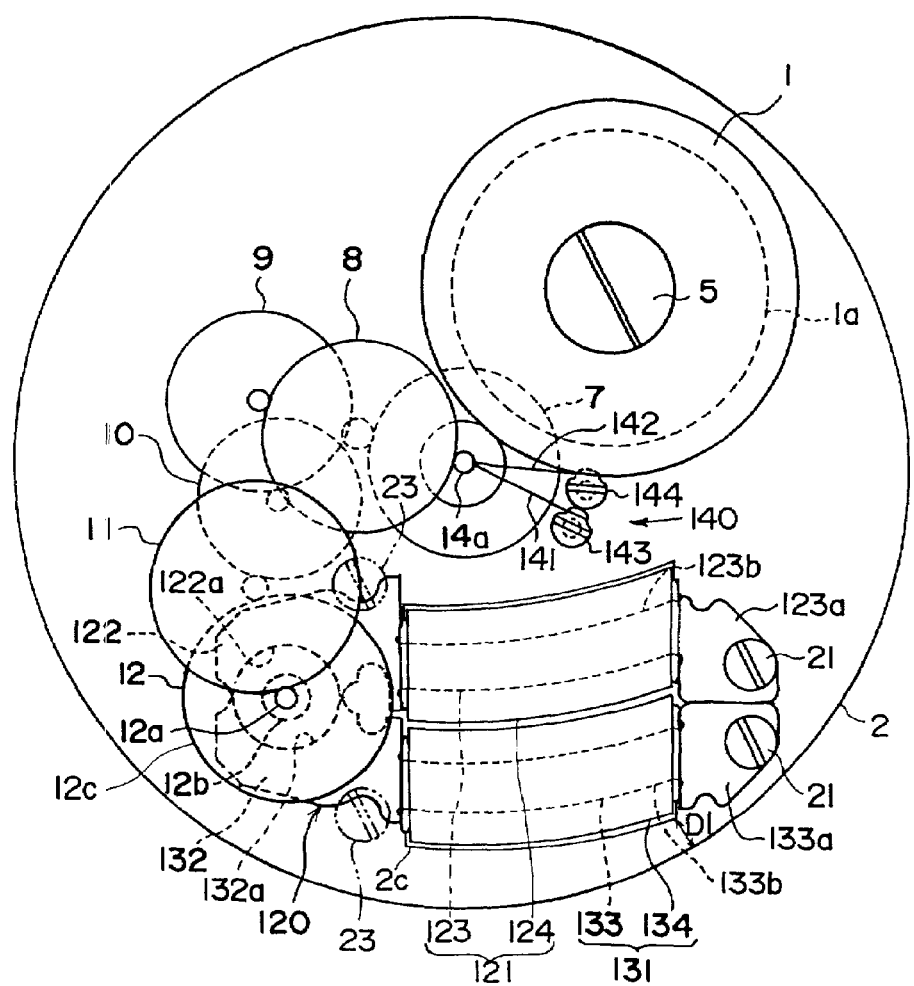
FIG. 10 is a plan view showing a fifth embodiment of the present invention.

FIG. 10 shows a fifth embodiment of the present invention.

In an electronic-controlled mechanical timepiece of this embodiment, the coil 124 and 134 are formed into a shape curved in parallel with the perimeter of the base plate 2. "Being parallel with the perimeter" includes also a case of being slightly deviated from being parallel in addition to a case of being completely parallel with each other. Such curved coils 124 and 134 can be implemented by winding around the curved winding cores 123b and 133b.

This embodiment brings the following effects.

(9) Since the coils 124 and 134 are curved in parallel with the perimeter of the base plate 2, the opening 2c provided according to the shape of the coil 134 can be provided somewhat nearer to the middle of the timepiece. Although this embodiment is different in composition from the above-mentioned embodiments, therefore, this embodiment also can provide the effect (1) described above in the same way. And it can provide also the effect (4) in the same way.

Sixth Embodiment

Figure 11:
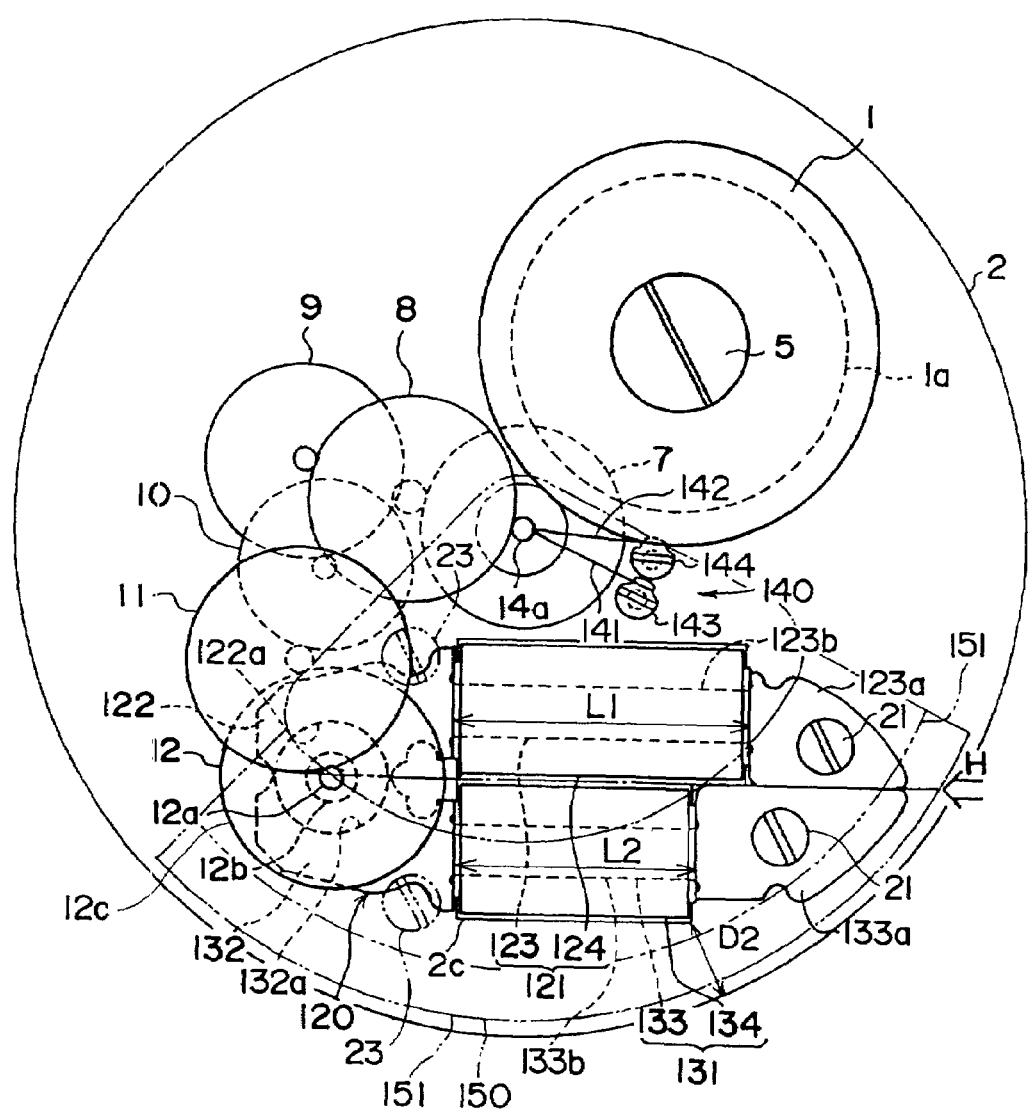
FIG. 11 is a plan view showing a sixth embodiment of the present invention.
Figure 12:
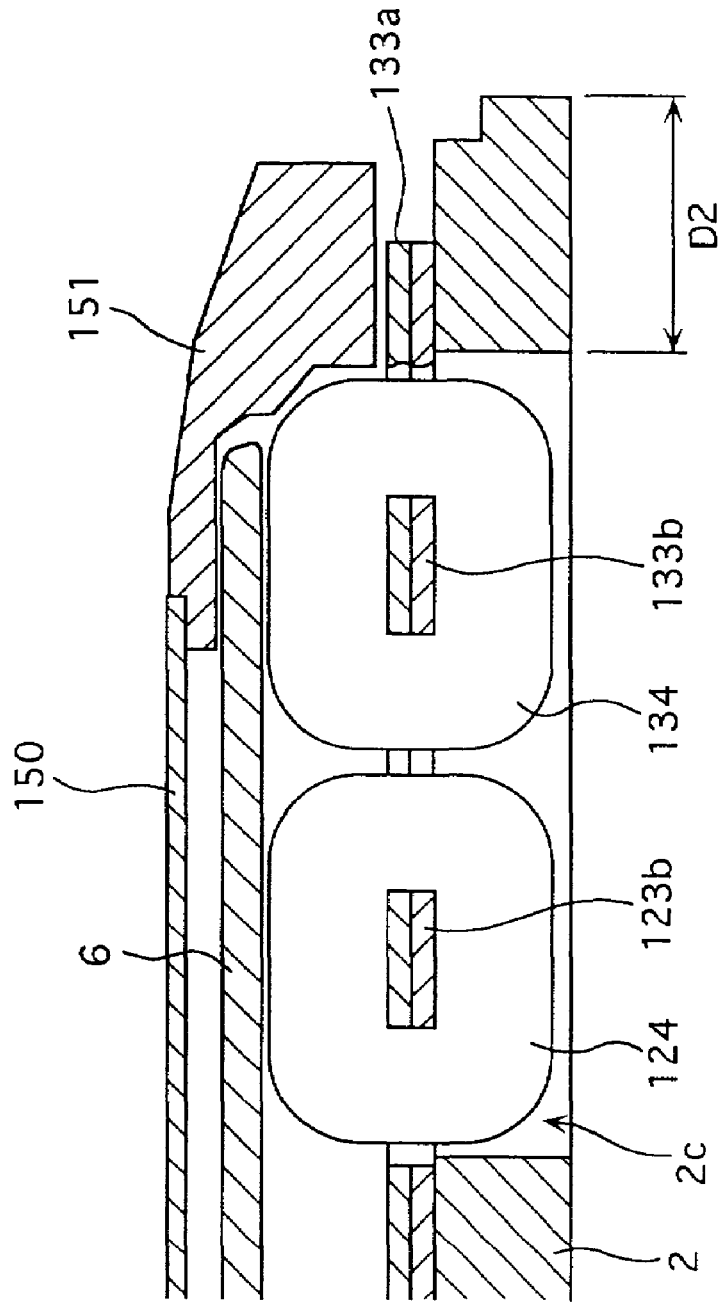
FIG. 12 is a sectional view showing a main part of the sixth embodiment.

A sixth embodiment of the present invention is described with reference to FIGS. 11 and 12.

An electronic-controlled mechanical timepiece of this embodiment is provided with a self-winding mechanism having a fan-shaped oscillating weight 150. It is the same as the first embodiment in other composition. That is to say, the length L2 of the winding core 133b for the coil 134 being nearer to the perimeter is smaller than the length L1 of the winding core 123b of the coil 124 being farther from the perimeter (L1>L2).

Figure 33:
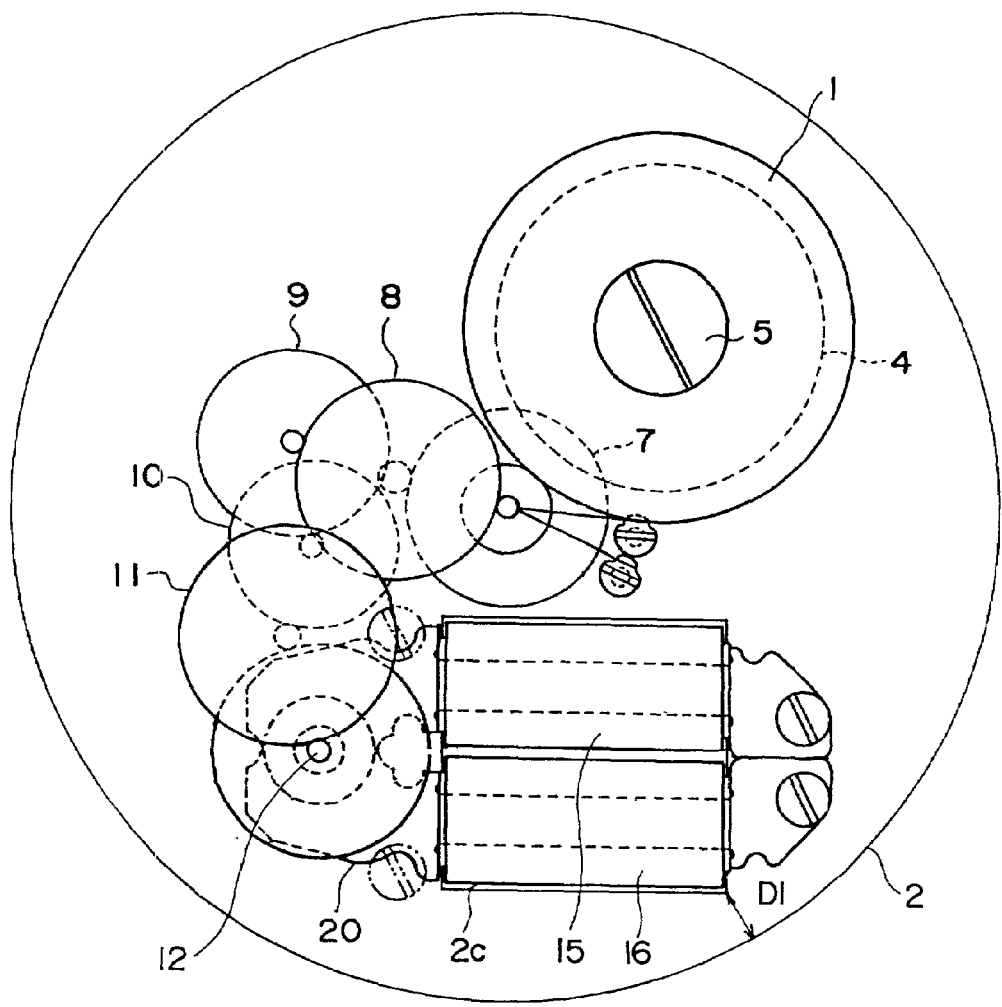
FIG. 33 is a plan view showing the prior art of the present invention.

The size of the base plate 2 is made the same as the prior art described in FIG. 33. Therefore, the distance D2 between the corner part of the opening 2c and the base plate 2 is larger than the distance D1 in the prior art (D1>D2).

A skirt portion 151 facing the perimeter of the base plate 2 is provided at the outer perimeter side of the oscillating weight 150. The core magnetism conducting portions 123a and 133a of the coil blocks 121 and 131 extend into a gap between the skirt portion 151 and the base plate 2, and parts of the core magnetism conducting portions 123a and 33a overlap flatly the skirt portion 151.

This embodiment brings the following effects.

(10) Since the distance D2 between the corner part of the opening 2c and the perimeter of the base plate 2 can be made larger by using a generator 120 having the same composition of the first embodiment, particularly the size of the skirt portion 151 of the oscillating weight 150 can be made larger by that. Thanks to this, the center of gravity of the oscillating weight 150 can be positioned nearer to the perimeter and the rotational performance can be improved.

(11) Since the distance D2 is large, the strength of this part of the base plate 2 can be made stronger and the reliability can be greatly improved by more improving the shock resistance.

(12) Thanks to making it possible to make the skirt portion 151 of the oscillating weight 150 larger toward the perimeter, since the rotational performance of the oscillating weight 150 can be sufficiently improved even when the gap between the skirt portion 151 and the base plate 2 is made somewhat large, it is possible to extend the core magnetism conducting portion 123a and 133a of the coil blocks 121 and 131 utilizing this gap. Thanks to this, it is possible to secure a larger magnetic path by making the core magnetism conducting portions 123a and 133a larger in sectional area and in area of contact with each other, and improve the generator 120 in performance. This effect can be obtained in the same way even in case of extending only one layer of each of the core magnetism conducting portions 123a and 133a composed of two layers.

(13) And thanks to a fact that the core magnetism conducting portions 123a and 133a are large, a terminal processing for connecting the end parts of the coil windings and the pattern of a substrate on the core magnetism conducting portions 123a and 33a can be easily performed and further the degree of freedom of the layout design of the substrate can be increased.

Seventh Embodiment

Figure 13:
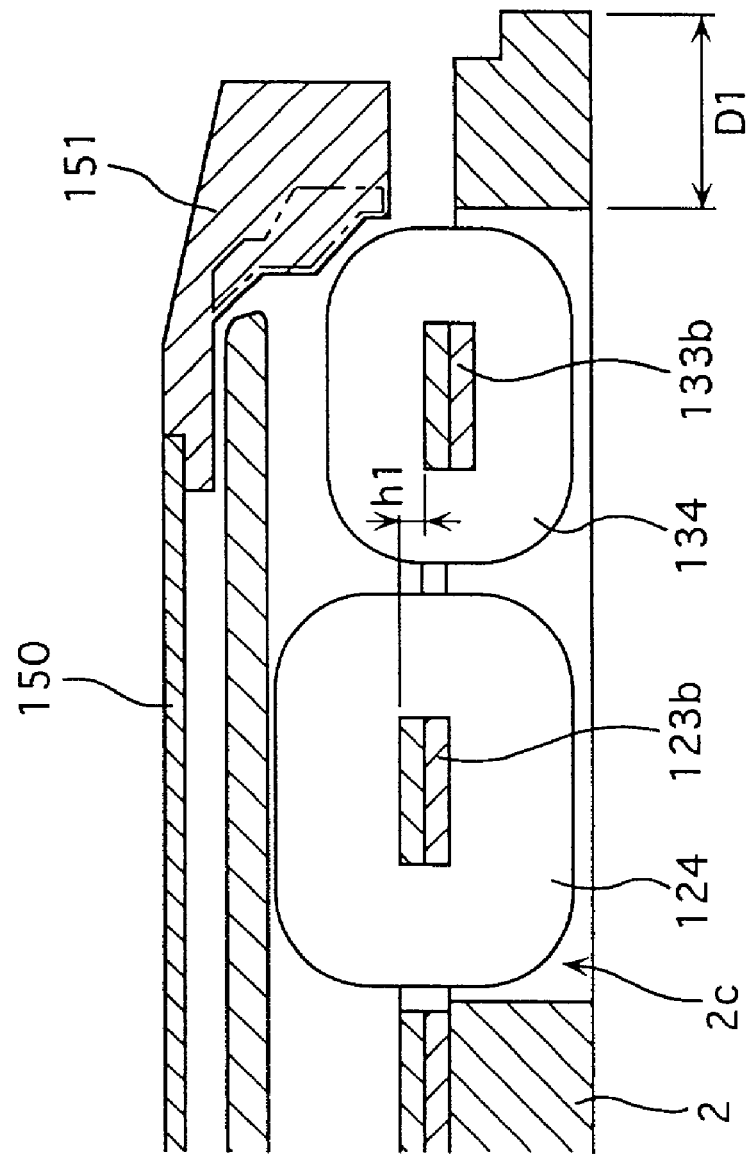
FIG. 13 is a sectional view showing a main part of the seventh embodiment of the present invention.

A seventh embodiment of the present invention is described with reference to FIG. 13.

An electronic-controlled mechanical timepiece of this embodiment is provided with a self-winding mechanism having a fan-shaped oscillating weight 150 in the same way as the sixth embodiment. And in the generator 120, the winding core 133b is disposed at a position distant downward by a height of h1 from the oscillating weight 150 in FIG. 13. Such a structure can be implemented by bending the winding core 133b relative to the core magnetism conducting portion 133a (FIG. 4). The generator 120 is the same as the second embodiment in other composition.

Such a composition provides the following effect additionally to the effects of the second embodiment.

(14) Since in this embodiment the winding core 133b is more distant from the oscillating weight 150 than the winding core 123b, the skirt portion 151 of the oscillating weight 150 can be made larger inside by the portion surrounded by an alternate long and short dash line to that extent, and the rotational performance of the oscillating weight 150 can be improved.

Eighth Embodiment

Figure 14:
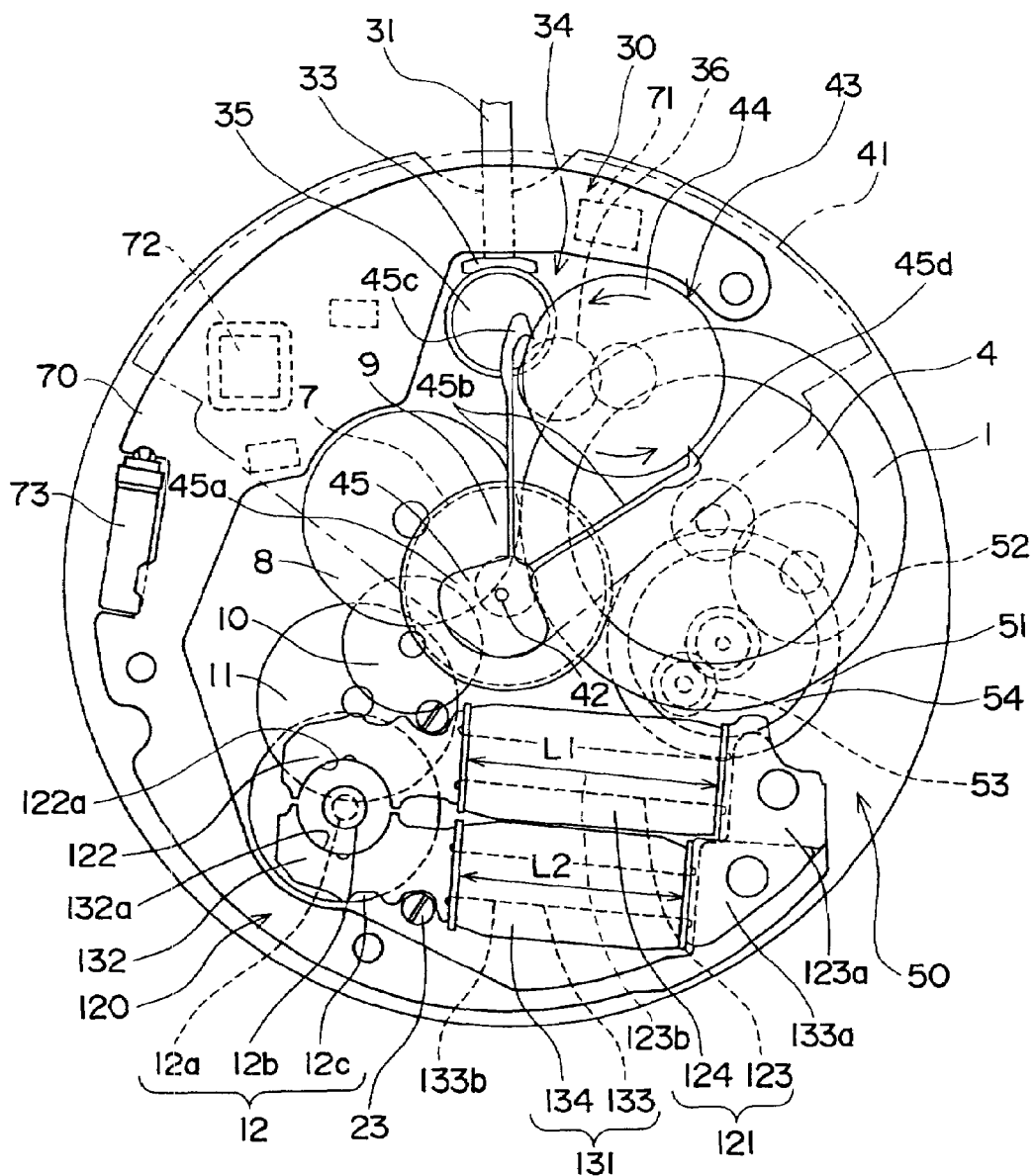
FIG. 14 is a plan view showing an eighth embodiment of the present invention.

FIG. 14 is a plan view showing a main part of an electronic-controlled mechanical timepiece being a timepiece according to an eighth embodiment of the present invention, and FIGS. 15, 16, 17 and 18 are sectional views of it.

The electronic-controlled mechanical timepiece is provided with a mainspring 1a wound in the shape of an eddy being a mechanical energy storage, a generator 120 for converting mechanical energy stored in this mainspring 1a into electric energy, a hand-winding portion 30 being a mechanical energy manual input portion for manually inputting mechanical energy into the mainspring 1a, and a self-winding portion 40 being a mechanical energy automatic input portion for automatically inputting mechanical energy into the mainspring 1a.

The mainspring 1a is built in a barrel wheel 1 composed of a barrel gear 1b, a barrel arbor 1c and a barrel case id, and the inner end of the mainspring 1a is fixed to the barrel arbor 1c and the outer end of it is slipped on the barrel gear 1b when its spring torque exceeds a certain value. The rotation of the barrel gear 1b is increased in speed through a gear train composed of the second wheel and pinion 7, the third wheel and pinion 8, the sweep second wheel and pinion 9, the fifth wheel and pinion 10 and the sixth wheel and pinion 11, and is transferred to the rotor 12 of a generator 120. This gear train is axially supported by a base plate 2, a second holder 113 and a gear train holder 6.

This embodiment uses the pinion of the sweep second wheel and pinion 9 as the seconds-hand pinion shaft, and thanks to a fact that the sweep second wheel and pinion 9 is provided in a path for transferring a torque from the mainspring 1a, its backlash is eliminated and this embodiment does not need a pointer control device 140 used in the above-mentioned embodiments.

On the other hand, the same generator 120 as that of the first embodiment is used, and the length L2 of the winding core 133b is shorter than the length L1 of the winding core 123b (L1>L2) and the wire diameter of a winding conductor wound around the winding core 133b is smaller than the wire diameter of a winding conductor wound around the winding core 123b. And the conductivity of the winding forming the coil 134 is larger than the conductivity of the winding forming the coil 124.

The generator 120 is composed of the rotor 12 and coil blocks 121 and 131, and is arranged at the downside being the other side (a second side) of the barrel wheel 1 in FIG. 14.

Figure 16:
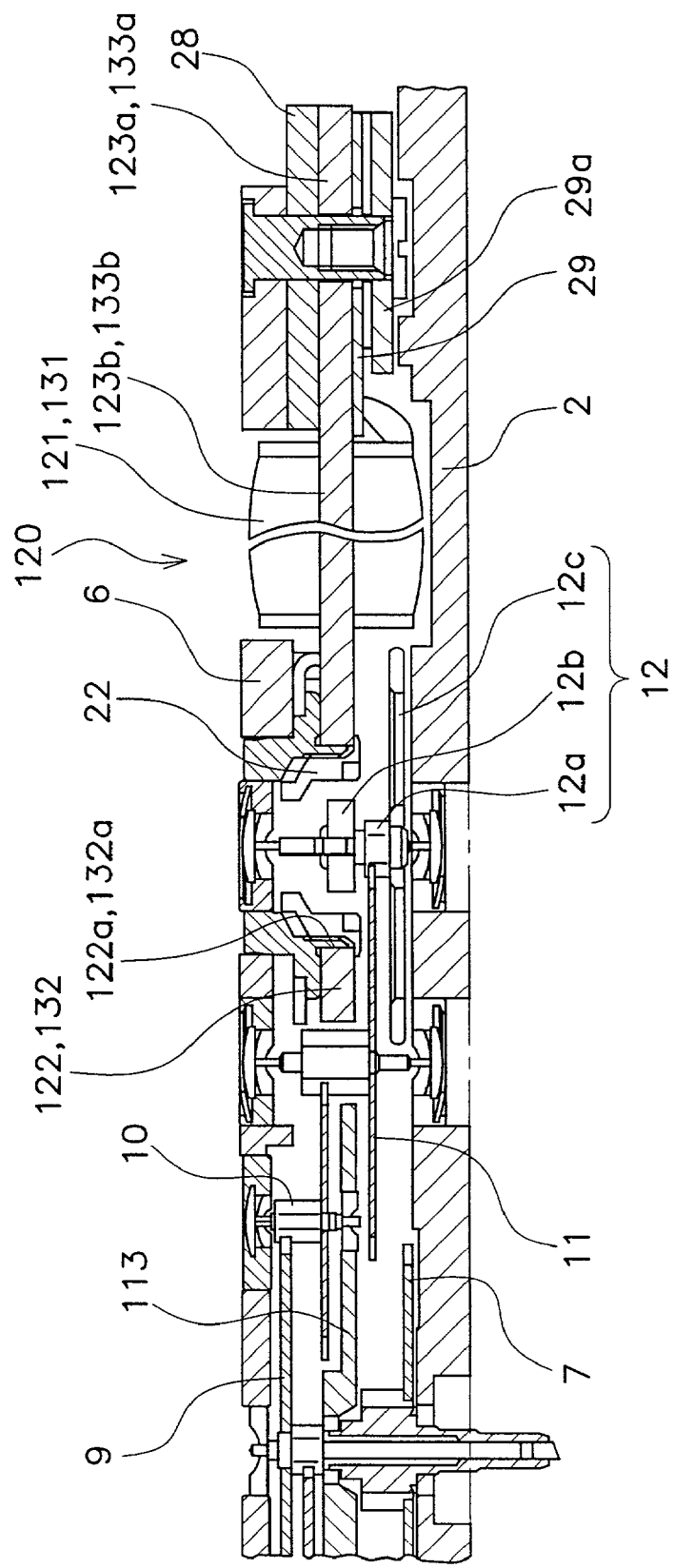
FIG. 16 is a sectional view showing a main part of the eighth embodiment.

Symbol 28 in FIG. 16 showing the generator 120 is a yoke disposed over one surface (the upper side in FIG. 16) of the core magnetism conducting portions 123a and 133a, and symbol 29 is a coil lead substrate which is provided on the other surface (the underside in FIG. 16) of the core magnetism conducting portions 123a and 133a and which has the ends of the coils 124 and 134 connected to it. The coil lead substrate 29, the stators 123 and 133 of the coil blocks 121 and 131, and the yoke 28 are held and fixed between the gear train holder 6 and a circuit holding plate 29a screwed on the gear train holder 6.

An alternating electric power from the generator 120 is stepped up in voltage and rectified through a rectifying circuit of step-up rectification, full-wave rectification, half-wave rectification, transistor rectification or the like, and then is supplied to a power supply circuit composed of a capacitor 71 and the like. The rectifying circuit and power supply circuit are formed into a circuit block 70 which is in the shape of a crescent parallel with the perimeter of the timepiece and one end of which is connected to the coil lead substrate by the circuit holding plate 29a. Although the description of a composition using such a circuit block 70 has been omitted up to now, it is used also in an electronic-controlled mechanical timepiece of the embodiments, and is used also in an electronic-controlled mechanical timepiece of embodiments described later. And by means of electric power from the power supply circuit in the circuit block 70, the electronic-controlled mechanical timepiece of this embodiment controls an electric current to flow in the coils of the generator 120 by driving an IC 72 and a crystal oscillator 73, and accurately drives the pointers (time information indicator) fixed on the gear train as performing a short-braking operation.

The circuits block 70 is made of an FPC (Flexible Printed Circuit) and is held between a circuits holding seat 76 provided on the base plate 2 and a circuit holder 74, and an insulating plate 75 is interposed between the circuit holder 74 and the circuit block 70.

In this case, thanks to a fact that the circuit block 70 is in the shape of a crescent, the circuit block 70 is arranged so as not to flatly overlap the coil blocks 121 and 131 of the generator and such movable components as the rotor 12, other wheels and the like, and is housed efficiently in a narrow and small arrangement space between these movable components and the perimeter of the timepiece. And in the circuit block 70, the portion held between the circuit holding seat 76 and the circuit holder 74 and the portion connected to the coil lead substrate 29 are vertically different from each other in position of arrangement in a vertical sectional view of it, but the flexibility of the FPC makes it possible to cope well with such a positional difference.

Figure 17:
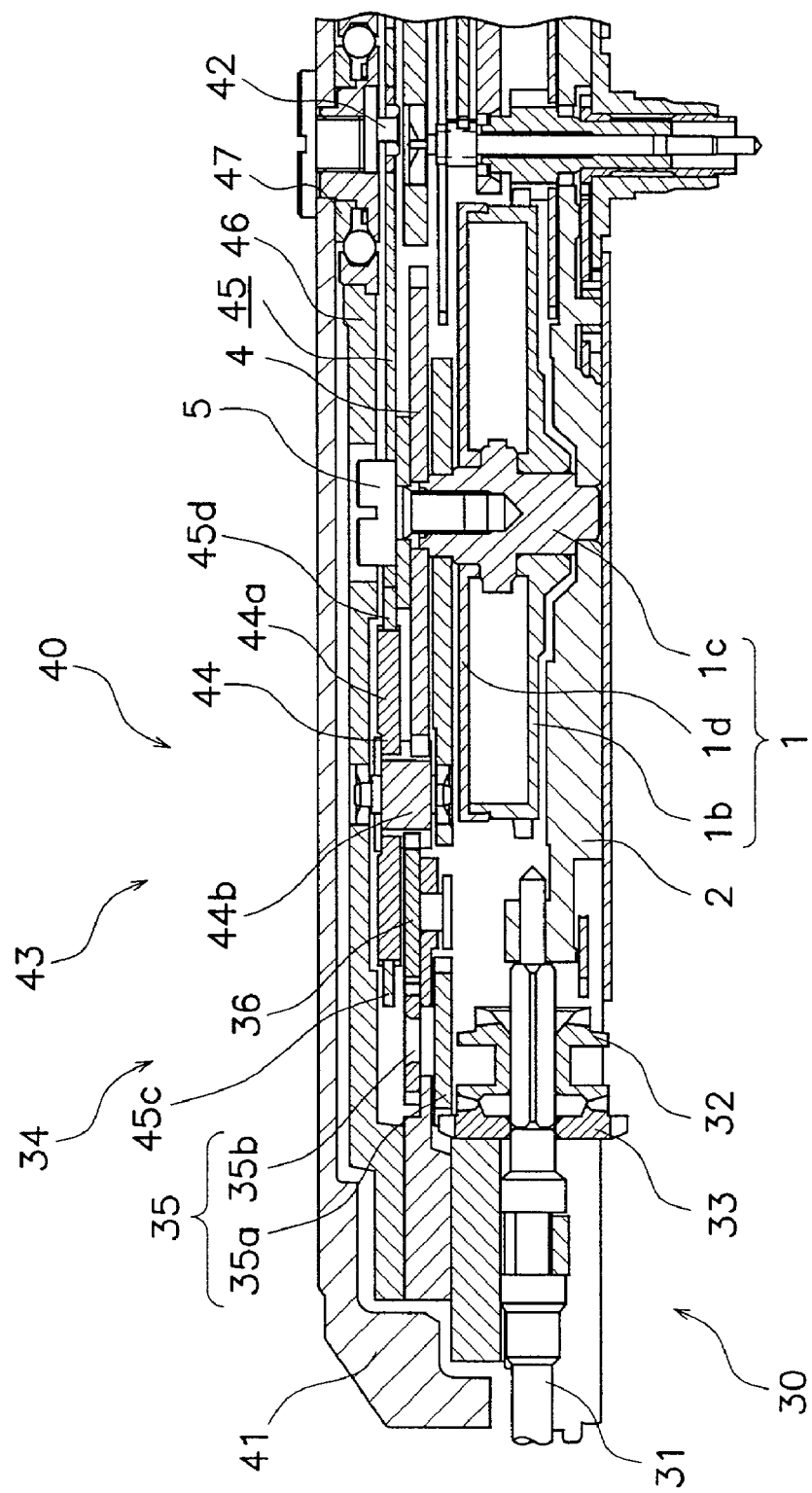
FIG. 17 is a sectional view showing a main part of the eighth embodiment.
Figure 18:
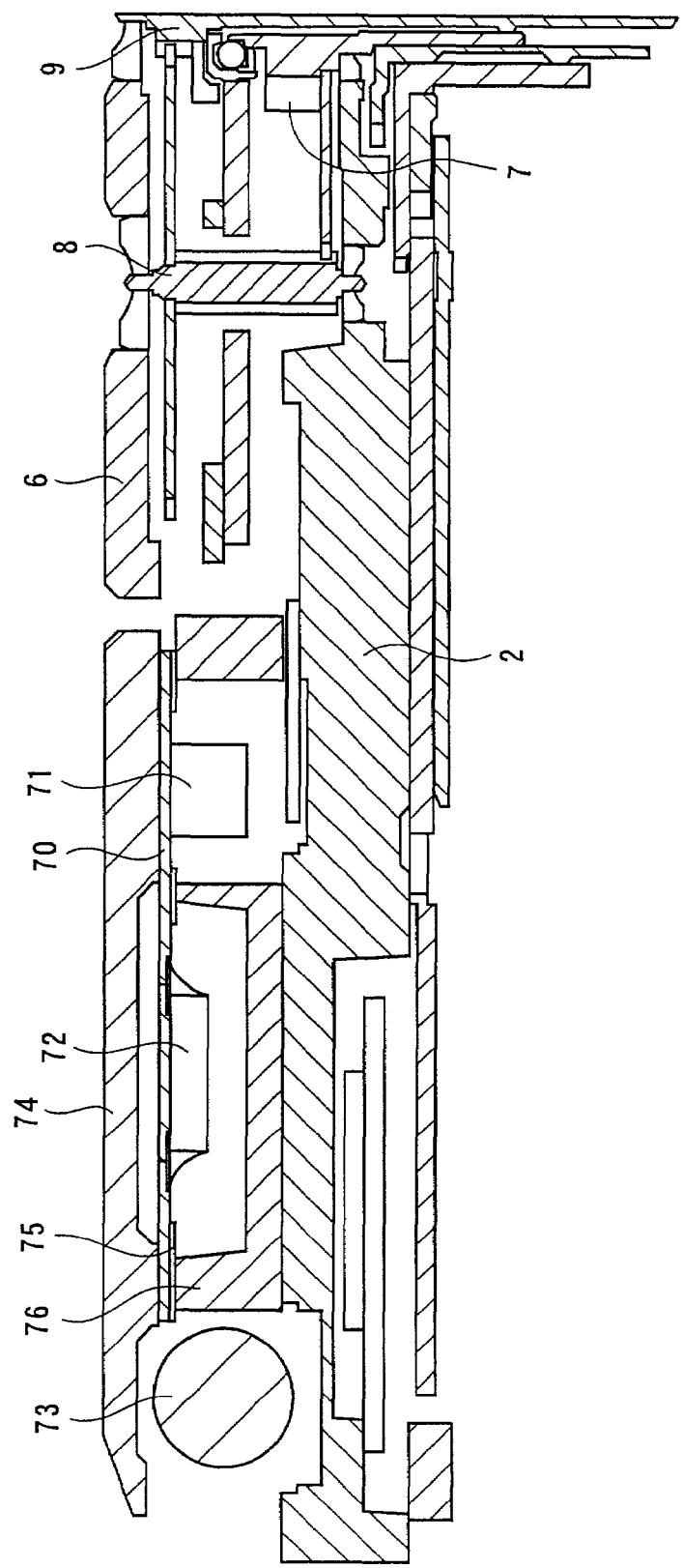
FIG. 18 is a sectional view showing a main part of the eighth embodiment.

As shown in FIGS. 14 and 17, the hand-winding portion 30 is provided with a winding shaft 31 connected to an unshown crown and a hand-winding gear train 34 composed of a clutch wheel 32, a crown wheel 33, a circular-hole wheel 35 and a circular-hole transfer wheel 36, and is arranged at one side (first side) being the opposite side to the generator 120 with the barrel wheel 1 having the mainspring 1a built in it between them.

The clutch wheel 32 is fitted onto the near end part of the winding shaft 31. The crown wheel 33 is fitted onto the middle part of the winding shaft 31 and is engaged with an end edge of the clutch wheel 32.

The circular-hole wheel 35 is arranged perpendicularly to the crown wheel 33, and is composed of a circular-hole gear 35a engaged with the perimeter of the winding gear 33 and a circular-hole pinion 35b engaged with the circular-hole transfer wheel 36.

The circular-hole transfer wheel 36 is engaged with the circular-hole pinion 35b at one edge of it and engaged with the square-hole wheel 4 through a transfer wheel 44 at the other edge.

Therefore, when the crown is turned, the square-hole wheel 4 is turned through the winding shaft 31, the clutch wheel 32, the crown wheel 33, a circular-hole wheel 35, the circular-hole transfer wheel 36 and the transfer wheel 44, and thereby the mainspring 1a can be wound up.

The self-winding portion 40 is provided with an oscillating weight 41, a self-winding gear train 43 having the transfer wheel 44, and a self-winding lever 45, and is arranged adjacently to the hand-winding portion 30 and at one side (first side) being the opposite side to the generator 120 with the barrel wheel 1 having the mainspring 1a built in it between them.

Due to this, as shown in FIG. 14, the hand-winding portion 30, the self-winding portion 40, the mainspring 1a (barrel wheel 1) and the generator (electricity generating portion) 120 are arranged in this order from the external operation member (crown) along the circular perimeter of the electronic-controlled mechanical timepiece around the center part (axis of the pointers) of the electronic-controlled mechanical timepiece.

The oscillating weight 41 is formed into the shape of a fan and is arranged so that its circular arc part is parallel with the inner peripheral edge of the timepiece, and is axially supported by a ball bearing 47 so as to freely turn relative to a transfer holder 46.

The transfer wheel 44 is composed of a transfer gear 44a having ratchet teeth engaged with the tips of a self-winding lever 45, and a pinion 44b engaged with the circular-hole transfer wheel 36 and the square-hole wheel 4.

The self-winding lever 45 is composed of a turning portion 45a fitted onto an eccentric pin 42 provided on the ball bearing 47 turning together with the oscillating weight 41, two arms 45b extending from this turning portion 45a to the transfer wheel 44, and a pulling pawl 45c and a pushing pawl 45d each being provided at the tip of each arm 45b and being engaged with the transfer gear 44a.

When the oscillating weight 41 is turned, therefore, the arms 45b of the self-winding lever 45 coupled to the oscillating weight 41 through the eccentric pin 42 are reciprocally moved, and the transfer gear 44a can be turned in a fixed direction by the pulling pawl 45c and the pushing pawl 45d utilizing this movement. In whichever direction the oscillating weight 41 is turned to the right or left, the transfer wheel is always turned in a fixed direction.

And by turning the transfer wheel 44, the square-hole wheel 4 is turned and the mainspring 1 is automatically wound up.

Hereupon, the transfer wheel 44 being in the self-winding gear train 43 is utilized also when winding up the mainspring 1a by means of the hand-winding portion 30. In other words, the hand-winding gear train 34 of the hand-winding portion 30 inputs mechanical energy into the mainspring 1a through the transfer wheel 44. In short, the hand-winding portion 30 winds up the mainspring 1a by commonly using the self-winding gear train 43 of the self-winding portion 40.

As shown in FIG. 19, such a mainspring 1a being wound up by the self-winding portion 40 is provided with a slipping attachment 61 being an overwinding prevention mechanism for preventing the overwinding of the mainspring 1a.

This slipping attachment 61 has a length of about one round on the inner circumferential wall of the barrel wheel 1, is made of a thicker plate spring than the mainspring 1a, is attached to the last end of the mainspring 1a, and presses the most outer portion of the mainspring 1a against the inner circumferential wall. And when attempting to further wind up the mainspring 1a completely wound up, namely, applying a torque larger than a specified rotational torque to the mainspring 1a, the rotational torque surpasses the force with which the slipping attachment 61 presses the mainspring 1a against the inner circumferential wall and makes the mainspring 1a slip and thereby the overwinding of the mainspring 1a is prevented.

Returning to FIGS. 14 to 17, a residual-spring-energy-indicating mechanism (a power reserve indication mechanism or a winding mark mechanism) 50 being an energy storage display for indicating the mechanical energy stored in the mainspring 1a, namely, the residual spring energy of the mainspring 1a on a dial plate is provided between the barrel wheel 1 and the generator 120.

The residual-spring-energy-indicating mechanism 50 is provided with a first indication transfer wheel 51, an indication intermediate wheel 52, a second indication transfer wheel 53, a third indication transfer wheel 54 and an indication wheel 55.

The first indication transfer wheel 51 is engaged with a barrel arbor pinion 101 fixed to the barrel arbor 1c, and a pinion 51a of the first indication transfer wheel 51 is rotatably fitted onto the shaft of the indication wheel 55.

The indication intermediate wheel 52 is engaged with a barrel pinion 102 fixed to the barrel gear 1b, and the third indication transfer wheel 54 is engaged with a pinion 52a of the indication intermediate wheel 52.

The second indication transfer wheel 53 is rotatably axially supported at the eccentric position of the third indication transfer wheel 54. This second indication transfer wheel 53 is engaged with the pinion 51a of the first indication transfer wheel 51 and the indication gear 55a of the indication wheel.

And the indication wheel 55 has a indication sleeve 56 fitted onto it. This indication sleeve 56 is engaged with the end part of the indication wheel 55 at the dial plate side by friction and turns as one body with the indication wheel 55. This indication sleeve 56 is provided with a pointer 57 for indicating the residual spring energy of the mainspring 1a. Such a residual-spring-energy-indicating mechanism 50 is composed of a so-called planetary gear train using the indication wheel 55 as the sun gear and using the second indication transfer wheel 53 provided on the third indication transfer wheel 54 as a planetary gear.

When the square-hole wheel 4 is turned by an operation of winding up the mainspring 1a, its torque is transferred from the barrel arbor pinion 101 to the first indication transfer wheel 51. Hereupon, since the barrel gear 1b is at a stop when the mainspring is wound up, the indication intermediate wheel 52 and the third indication transfer wheel 54 are in a fixed state. Due to this, the second indication transfer wheel 53 engaged with the pinion 51a of the first indication transfer wheel 51 rotates only at the current position, and its rotation is transferred to the indication wheel 55 through the indication gear 55a, and as a result the indication sleeve 56 and the pointer 57 turn in the positive direction.

On the other hand, when the mainspring winds down, since the square-hole wheel 4 is at a stop, the barrel arbor pinion 101 and the first indication transfer wheel 51 are at a stop. And when the barrel gear 1b is turned, its torque is transferred from the barrel pinion 102 to the indication intermediation wheel 52 and the third indication transfer wheel 54. And then, since the first indication transfer wheel 51 is fixed, the second indication transfer wheel 53 revolves around the pinion 51a as rotating, and its turning movement is transferred from the indication gear 51a to the indication wheel 55 and the indication sleeve 56 is turned. At this time, since the indication sleeve 56 is turned in the inverse direction to the direction when winding up, the pointer 57 is also turned in the inverse direction to the direction when winding up.

Thus, the residual spring energy of the mainspring 1a is indicated by the pointer 57, and the residual duration of operation of the timepiece is made visual.

Figure 15:
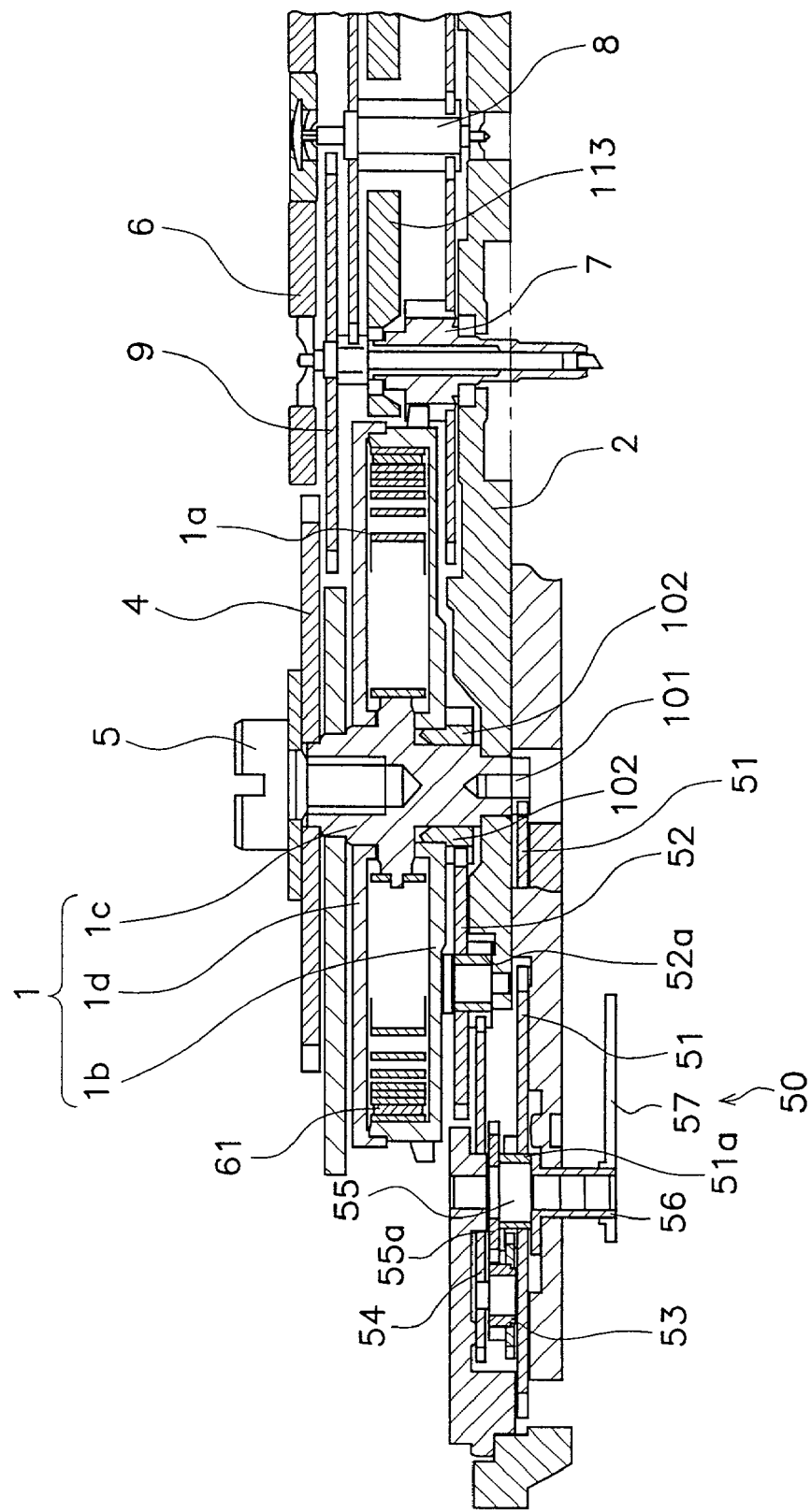
FIG. 15 is a sectional view showing a main part of the eighth embodiment.

Since this residual-spring-energy-indicating mechanism 50 is thin in thickness as shown in FIGS. 14 and 15, it is placed flatly over a part of the generator, namely, at the dial plate side between the barrel wheel 1 and the generator 120.

According to the eighth embodiment as described above, it is possible to obtain the same effects as the first embodiment by using the same generator 120 as the first embodiment, and furthermore obtain the following effects.

(15) Since the hand-winding portion 30 and the self-winding portion 40 are provided at the opposite side to the generator 120 with the mainspring 1*a* between them, it is not necessary to arrange the generator 120 and the self-winding portion 40 so that they overlap each other in the thickness direction of a timepiece. Thanks to this, it can be prevented that the movement is made thick by making the generator 120 and the self-winding portion 40 overlap each other and that the movement is increased in flat size by arranging the generator 120 distantly from the barrel wheel 1 so as not to overlap the self-winding portion 40. Thanks to this, it is possible to improve the efficiency of space inside the timepiece, suppress the increase in area and thickness of the movement and make the timepiece small-sized even in case that it is provided with a hand-winding portion 30 and a self-winding portion 40.

(16) Since the hand-winding portion 30 and self-winding portion 40 are provided at the opposite side to the generator 120 with the mainspring 1*a* between them, the hand-winding portion 30 and self-winding portion 40 can be kept apart by a space of the barrel wheel 1 from the generator 120. Thanks to this, it can be almost prevented that wear powder enters the generator 120 even if the wear powder is produced in the hand-winding portion 30 or the self-winding portion 40 having many steel components due to the use for a long period. Therefore, it is possible to more reduce the probability of occurrence of a trouble and lighten the work of maintenance also.

(17) And since the hand-winding portion 30 and the self-winding portion 40 can be arranged distantly from the generator 120, it is possible to reduce a leakage flux to the hand-winding portion 30 and the self-winding portion 40 and suppress occurrence of iron loss and the like. Therefore it is possible to improve the antimagnetic performance of a timepiece.

(18) Since the hand-winding portion 30 and the self-winding portion 40 are arranged near the winding shaft 31 forming the hand-winding portion 30 and the generator 120 is arranged far from the winding shaft 31 with the mainspring 1*a* between them, there is hardly the possibility that moisture and the like enter the generator 120 and the durability of a timepiece can be improved.

(19) Since the residual-spring-energy-indicating mechanism 50 which is thin in thickness and can be arranged so as to overlap a part of the generator 120 is provided between the mainspring 1*a* and the generator 120, a space at the dial plate side between the mainspring 1*a* and the generator 120 can be effectively utilized.

And since the residual-spring-energy-indicating mechanism 50 may be comparatively small in strength, it can be formed out of a non-magnetic material such as brass or the like. Thanks to this, it is possible to prevent degradation in antimagnetic performance or occurrence of a trouble caused by wear powder.

(20) Since the hand-winding gear train 34 is composed so as to input mechanical energy, into the mainspring 1*a* through the self-winding gear train 43, the number of components of a timepiece can be reduced by using the self-winding gear train 43 commonly in the respective winding portions 30 and 40 in comparison with a case of providing the hand-winding gear train 34 and the self-winding gear train 43 independently of each other. Thanks to this, it is possible to perform an efficient layout design, reduce the number of components, more easily make a timepiece small-sized and reduce the cost of it also.

For example, when a layout in which the circular-hole wheel 35 to be engaged with the crown wheel 33 is made to be engaged directly with the square-hole wheel 4 is made, it is necessary to arrange the transfer wheel 44 nearer to the perimeter of the timepiece in order to avoid the circular-hole wheel 35 and it is not possible to make large the skirt portion (the outer edge portion of the oscillating weight) of the oscillating weight 41, and therefore the rotation starting performance of the oscillating weight 41 is degraded. On the other hand, when the circular-hole wheel 35 is arranged more inside (nearer to the center of the movement) without moving the transfer wheel 44 in position, the crown wheel 33 and the clutch wheel 32 also must be moved more inside, and it is difficult to make a layout for a calendar correction mechanism and the like. On the contrary, since the circular-hole wheel 35 is not directly engaged with the square-hole wheel 4 but is engaged with the square-hole wheel 4 through the transfer wheel 44 of the self-winding gear train 43, a layout for the respective wheels can be made easily and it is possible to make a layout having a high efficiency of space and make a timepiece small-sized.

(21) Since this embodiment adopts a self-winding portion 40 of a pawl lever type being the least in number of wheels, it is possible to reduce the space for arrangement of the respective winding portions 30 and 40 and make the timepiece more small-sized.

(22) Since the circular-hole wheel 35 of a hand-winding portion 30 is composed of two gears of the circular-hole gear 35*a* and circular-hole pinion 35*b*, it is possible to easily wind up even a mainspring 1*a* having a large torque by means of the hand-winding portion 30.

That is to say, an electronic-controlled mechanical timepiece like this embodiment uses a mainspring 1*a* being strong in torque in order to turn a rotor 12 stably at a high torque and make the duration of operation long for the efficiency of electric power generation when converting a rotational torque by the mainspring 1*a* into electric power. Due to this, since the crown torque in a hand-winding operation is liable to be high and, if a self-winding portion 40 is provided, the load of a self-winding gear train 43 is added to the crown torque, the crown torque is raised by about 40% or more in comparison with a conventional spring timepiece. Up to now, a crown torque has been 30 to 40 gfcm, and is limited to about 70 gfcm even if a large crown is used. Due to this, it is difficult to wind up the mainspring 1*a* by means of a hand-winding gear train 34 composed only of a crown wheel 33, a circular-hole wheel 35 and a square-hole wheel 4. On the other hand, like this embodiment, if the speed reduction ratio of a hand-winding gear train 34 is made larger by providing a circular-hole gear 35*a*, a circular-hole pinion 35*b* and a circular-hole transfer wheel 36 (for example, a conventional spring timepiece has a speed reduction ratio of 3 to 4 but this embodiment can make a speed reduction ratio of 6 or more), it is possible to obtain a hand-winding portion 30 capable of easily winding up the mainspring 1*a*.

(23) Since a mainspring 1*a* is provided with a slipping attachment 61 for preventing the mainspring 1*a* from being excessively wound up by a self-winding portion 40, it is possible to easily prevent the overwinding of the mainspring 1*a* and prevent breakdown of the mainspring 1*a* caused by the overwinding.

Ninth Embodiment

Figure 20:
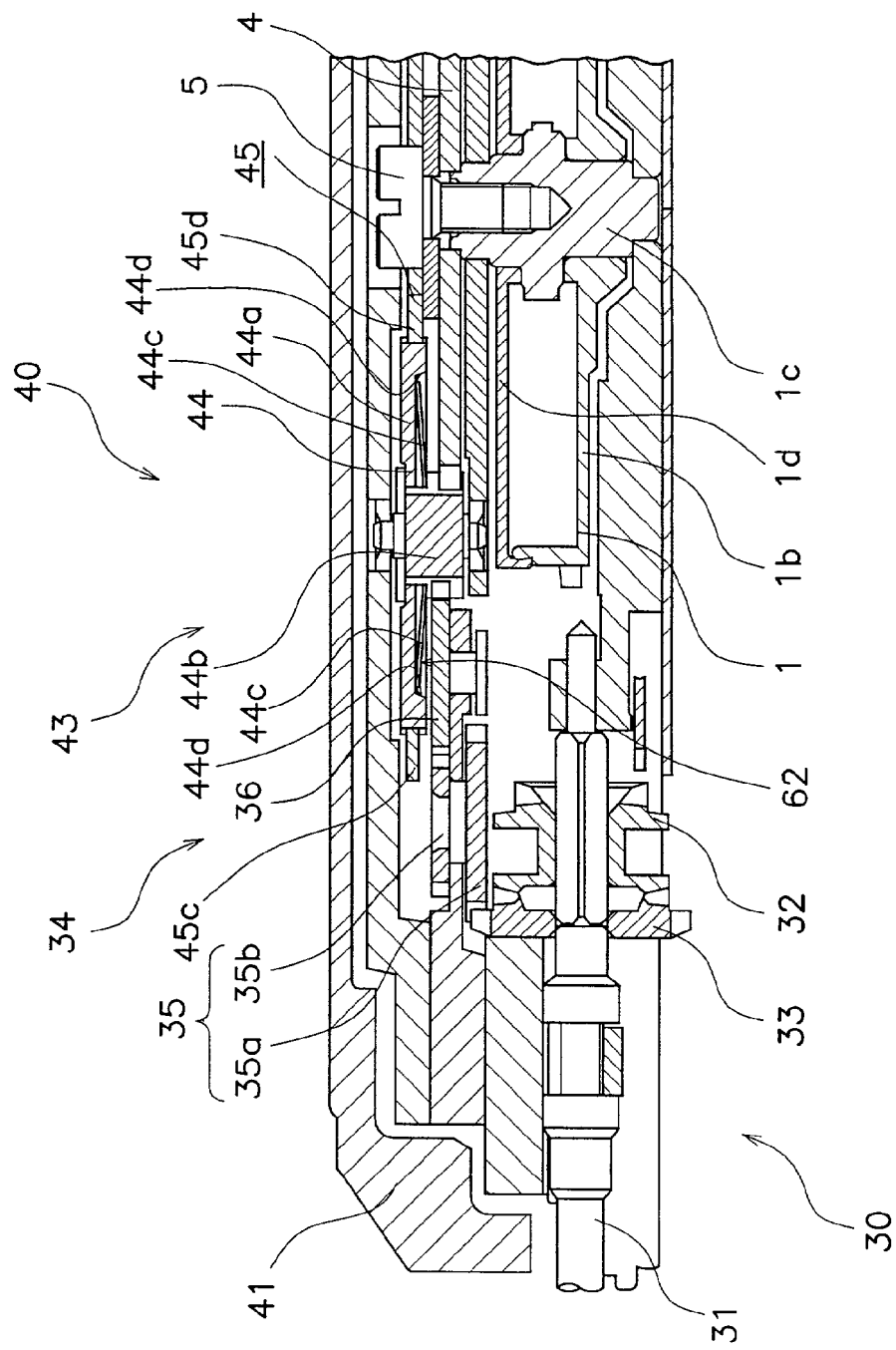
FIG. 20 is a sectional view showing a ninth embodiment of the present invention.

FIG. 20 is a sectional view showing a main part of an electronic-controlled mechanical timepiece being a timepiece according to a ninth embodiment of the present invention. This ninth embodiment is obtained by providing a slipping mechanism 62 being an overwinding prevention mechanism for preventing the overwinding of a mainspring 1a on the transfer wheel 44 of the eighth embodiment.

The slipping mechanism 62 separates a transfer gear 44a and a pinion 44b forming a transfer wheel 44 from each other and arranges a spring member 44c between the pinion 44b and the transfer gear 44a, and thereby makes the transfer gear 44a and the pinion 44b slip relative to each other when applying a torque larger than a specified torque to the transfer wheel 44.

In more detail, a depressed portion 44d scooped out from the end face of the pinion 44b toward the outer edge of the transfer gear 44a is formed on the inside face of the transfer gear 44a. A spring member 44c of a coned disc spring or the like is arranged in this depressed portion 44d, and both ends of the spring member are respectively in contact with the transfer gear 44a and the pinion 44b, and the transfer gear 44a is pressed by this spring member 44c against a flange turned as one body with the pinion 44b.

Due to this, while the self-winding portion 40 winds up the mainspring 1a, the transfer gear 44a and the pinion 44b are turned by an energizing force of the spring member 44c as one body with each other. On the other hand, when a torque larger than a specified rotational torque is applied to the transfer wheel 44 like when attempting to further wind up the mainspring 1a in a completely wound state, a slippage occurs between the transfer gear 44a and the pinion 44b and thereby the torque is not transferred to the square-hole wheel 4. Thus, the overwinding of the mainspring 1a is prevented.

Figure 22:
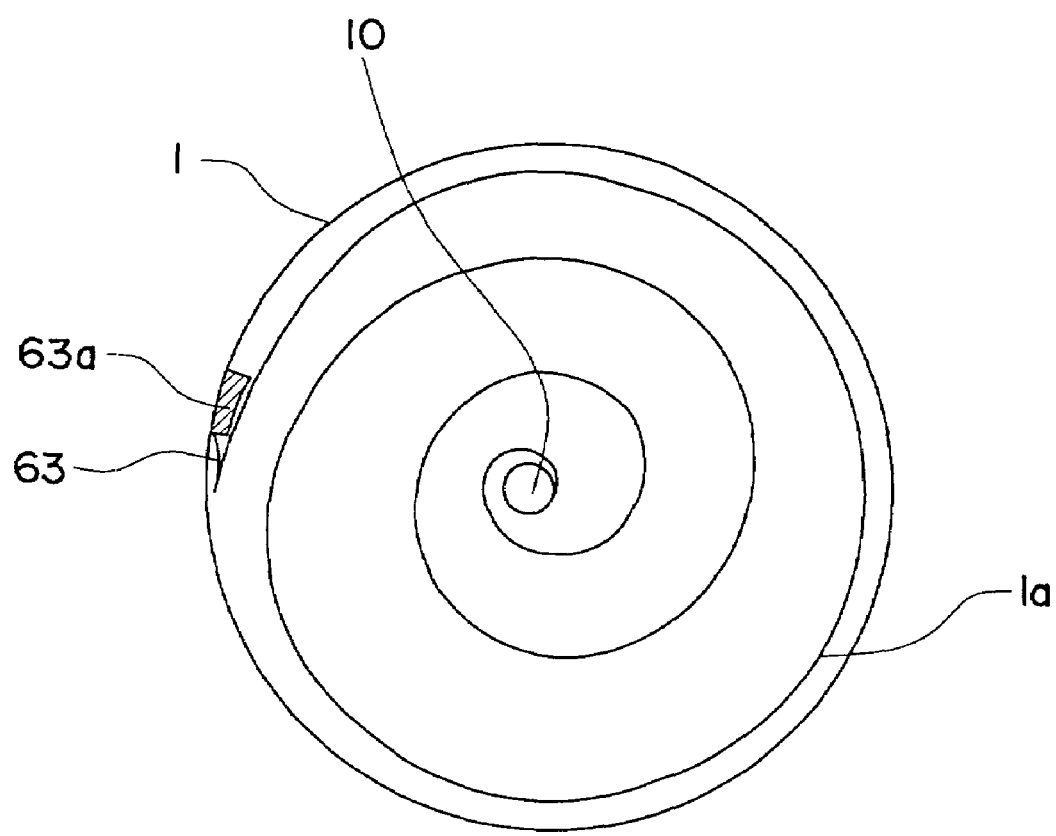
FIG. 22 is a schematic plan view showing a barrel wheel in the ninth embodiment.

In such a way, by providing a slipping mechanism 62 for preventing the overwinding of the mainspring 1a on the transfer wheel 44, it is possible to eliminate the necessity that the mainspring 1a is provided with a large-scaled slipping attachment 61 like the first embodiment. In other words, as shown in FIGS. 21 and 22, a simple structure in which a hook 63 formed by folding back is formed at the last end part of the mainspring 1a and this hook 63 is engaged with a projection 63a formed on the inner circumferential wall of the barrel wheel 1 is enough.

Since a torque is transferred to the square-hole wheel 4 from the circular-hole transfer wheel 36 of the hand-winding gear train 34 through the pinion 44b in case of winding up the mainspring 1a by means of the hand-winding portion 30, the mainspring 1a is wound up in the same way as a conventional hand-winding timepiece.

According the ninth embodiment as described above, it is possible to attain the objects of the present invention by the same composition as the first embodiment and provide the same effects as the effects (15) to (22) of the eighth embodiment and further bring the following effects.

(24) Since the self-winding portion 40 is provided with a slipping mechanism 62, a conventional slipping attachment 61 is made unnecessary and in case of using a barrel wheel 1 having the same size, the effective length of the mainspring 1a can be made longer. Due to this, it is possible to make longer the duration of operation of the timepiece. For example, this embodiment has been able to make the duration of operation longer by about 5 hours in comparison with the first embodiment. And in case that it is not necessary to make the duration of operation longer, it is possible to make the barrel wheel 1 smaller and make a timepiece more small-sized.

(25) Since a slipping mechanism 62 is provided on a gear (transfer wheel 44) one stage before the mainspring 1a, it is possible to reduce a stop torque, for example, to about ⅕ in comparison with a case of providing the slipping mechanism 62 in the mainspring 1a part, adopt a simple spring structure such as a coned disc spring and easily manufacture a timepiece being excellent in durability.

(26) In case of winding up a timepiece by hand, since an operator can perceive a torque applied to a mainspring 1a like a conventional hand-winding timepiece, overwinding does not occur. Up to now, in case of winding up a self-winding timepiece by hand, since when the mainspring is completely wound up the mainspring is slipped by a slipping attachment, there has been a problem that an operator cannot know when the spring winding is to be stopped and continues excessively winding, but in this embodiment since an operator can perceive a torque applied to the mainspring 1a like a hand-winding timepiece, it is possible also to solve a problem of continuing excessively winding.

Tenth Embodiment

Figure 23:
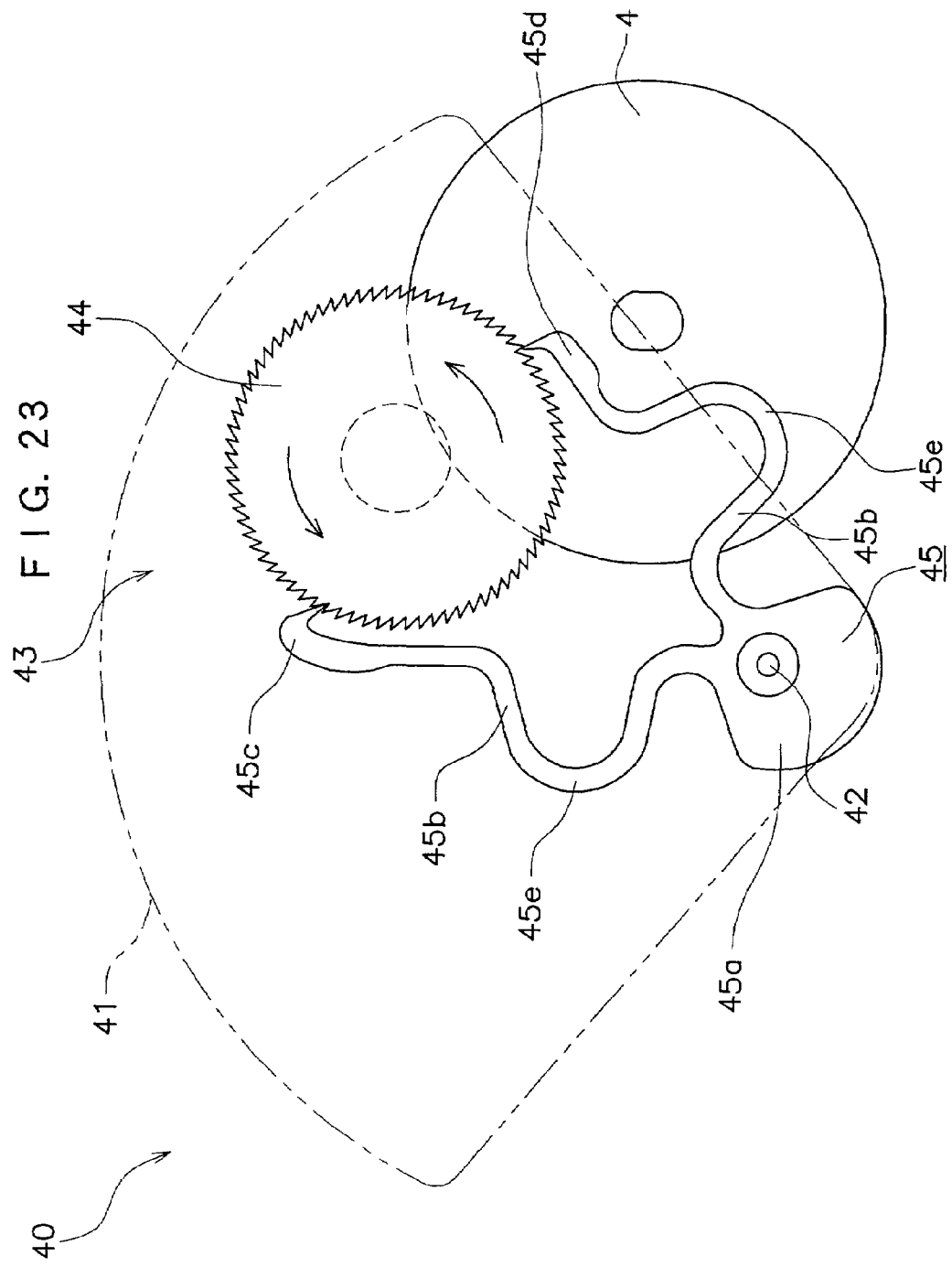
FIG. 23 is a plan view showing a tenth embodiment of the present invention.

FIG. 23 is a sectional view showing a main part of an electronic-controlled mechanical timepiece according to a tenth embodiment of the present invention. The tenth embodiment is obtained by providing an overwinding prevention mechanism for preventing the overwinding of a mainspring 1a in the self-winding lever 45 of the eighth embodiment.

In more detail, a curved portion 45e being a deforming portion is formed in each arm 45b of a self-winding lever 45. This curved portion acts as an overwinding prevention mechanism.

That is to say, in case of attempting to further wind up the mainspring 1a in a completely wound state, even if attempting to apply a torque larger than a specified torque to a pawl 45c or 45d of the self-winding lever 45 in order to turn the transfer wheel 44, since a torque larger than a specified torque is not applied to the pawl 45c or 45d due to deformation of the curved portion 45e and in its turn the transfer wheel is not turned. Thus the overwinding of the mainspring 1a is prevented.

According the tenth embodiment as described above, the following effect is obtained in addition to the effects of the eighth embodiment.

(27) Since curved portions 45e to be an overwinding prevention mechanism are provided in the self-winding lever 45, the overwinding of the mainspring 1a can be prevented easily and surely by the curved portions 45e. Particularly, since a slipping attachment 61 and a slipping mechanism 62 utilize friction, it is necessary to maintain and manage a state of friction but this embodiment utilizes deformation of the self-winding lever 45 and its friction is small, and therefore it is possible to realize an operation being stable for a long period by a simple and space-saving structure and also reduce a timepiece in cost.

Eleventh Embodiment

Figure 24:
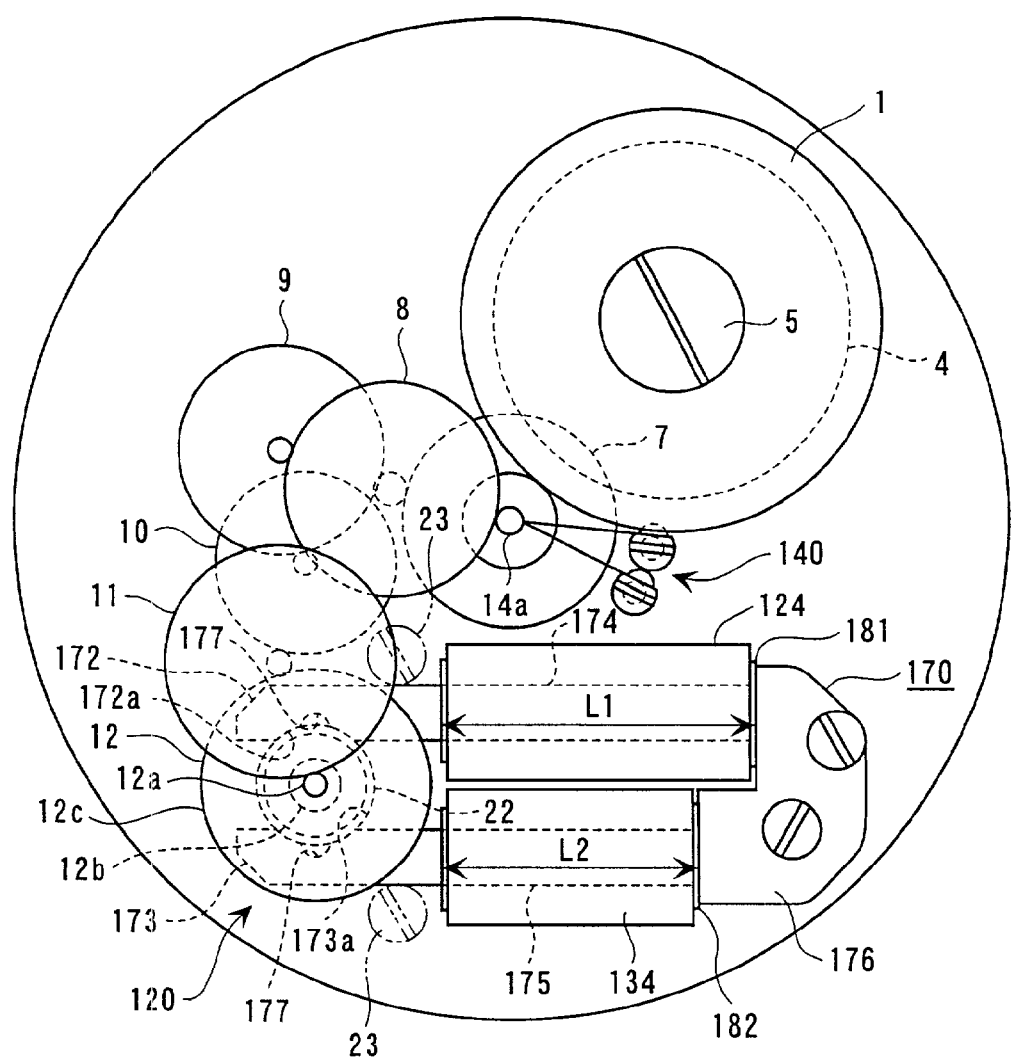
FIG. 24 is a plan view showing an eleventh embodiment of the present invention.
Figure 25:
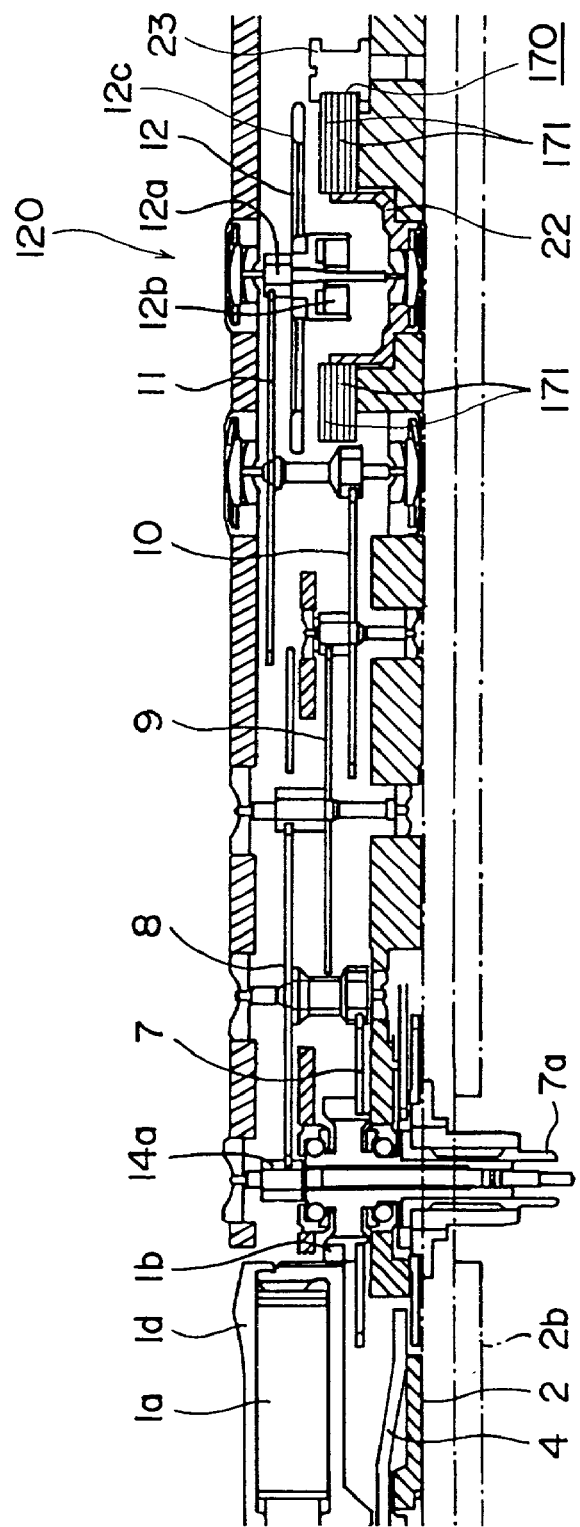
FIG. 25 is a sectional view showing the eleventh embodiment.
Figure 26:
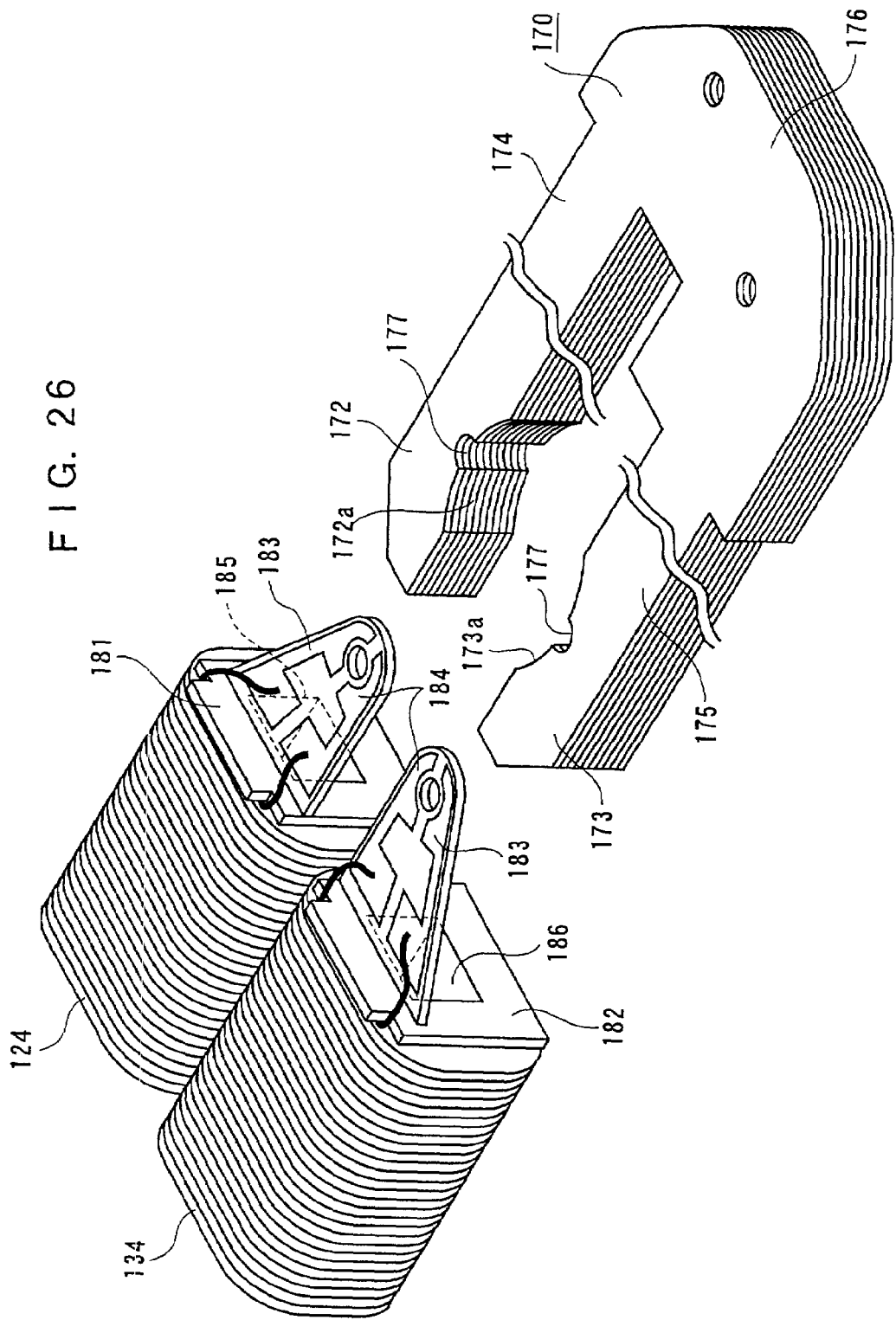
FIG. 26 is an exploded perspective view showing a main part of a generator of the eleventh embodiment.

FIG. 24 is a plan view showing a main part of an electronic-controlled mechanical timepiece according to an eleventh embodiment of the present invention, and FIG. 25 is a sectional view of it and FIG. 26 is a perspective view of it.

Figure 27:
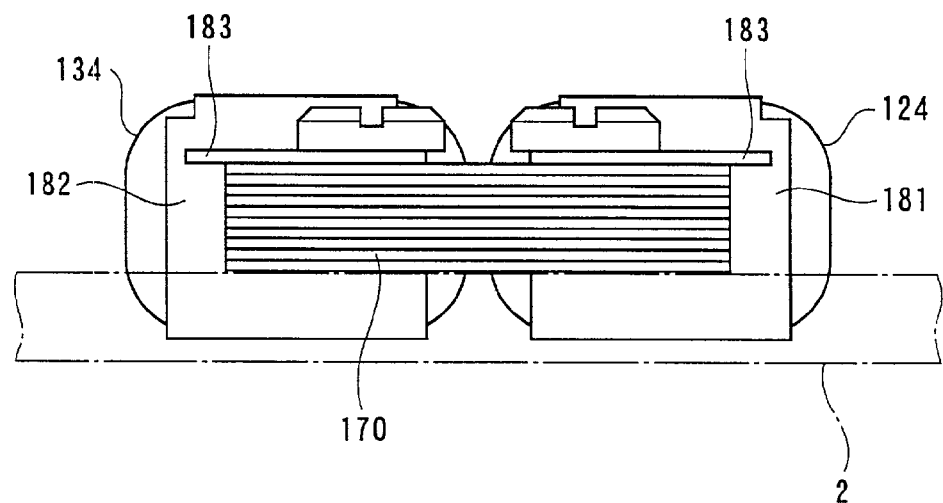
FIG. 27 is a sectional view showing a main part of the generator.
Figure 28:
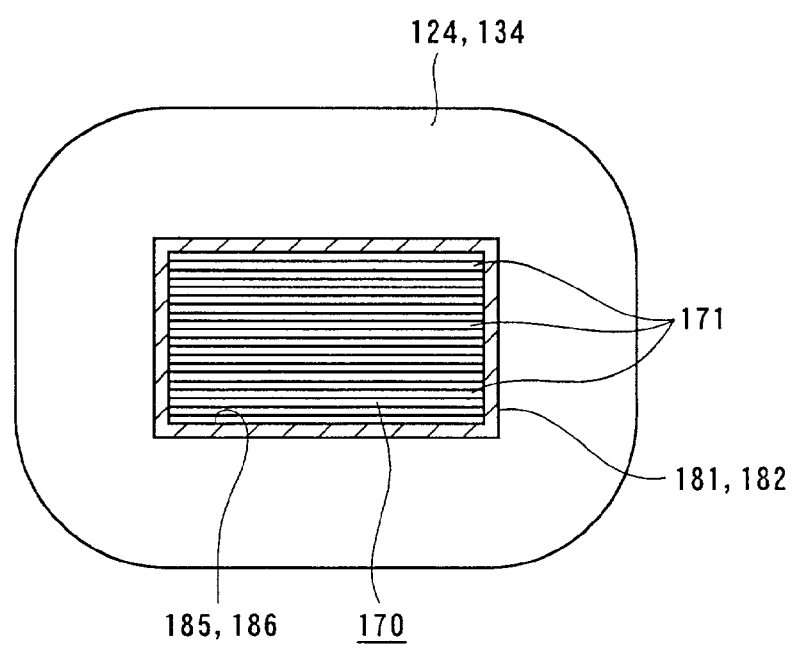
FIG. 28 is a sectional view showing a winding core portion of the generator.

An electronic-controlled mechanical timepiece of this embodiment is provided with a generator 120 composed of a rotor 12 and a stator 170, and as shown in FIGS. 26 to 28 also, the stator 170 formed by stacking a plurality of U-shaped flat thin plates 171 made of an amorphous material. Specifically, as shown by a sectional view of the stator 170 in FIG. 28, the stator 170 is formed by stacking twenty thin plates 171. Hereupon, although an amorphous material is not limited in particular, a Co-based amorphous metal having cobalt as the principal ingredient, an Fe-based amorphous metal having iron as the principal ingredient, and the like can be utilized. Particularly, a Co-based amorphous metal being small in iron loss at a low frequency of about 10 Hz is suitable for an electronic-controlled mechanical timepiece in this embodiment.

This stator 170 is provided with a pair of core stator portions 172 and 173 which are arranged opposite to the rotor 12, a pair of winding cores 174 and 175 to have coils 124 and 134 respectively fitted onto them, and a connector 176 for connecting these winding cores 174 and 175 with each other, and is made into a flat and nearly U-shaped form.

Stator hole parts 172a and 173a each being a depression in the shape of a circular arc are formed in the inner circumferential walls of the core stator portions 172 and 173, and an inner notch 177 is formed in each of the stator hole parts 172a and 173a.

In the winding cores 174 and 175, like the first embodiment, the length L2 of the outer winding core 175 is shorter than the length L1 of the winding core 174 (L1>L2), and the wire diameter of a conductor of the winding wound around this winding core 175 is smaller than the wire diameter of a conductor of the winding of the winding core 174.

As shown in FIG. 26, coils 124 and 134 to be arranged on the winding cores 174 and 175 are wound around bobbins 181 and 182. The bobbins 181 and 182 each are formed into a nearly square-shaped pipe, and the coils 124 and 134 are respectively wound around them. And the bobbins 181 and 182 have coil lead substrates 183 projecting from them provided on them, and the ends of the coils 124 and 134 are respectively connected with circuits 184 on the coil lead substrates 183. And the conductivity of a winding forming the coil 134 is larger than the conductivity of a winding forming the coil 124.

The central holes 185 and 186 of the bobbins 181 and 182 nearly coincide in sectional shape and size with the winding cores 174 and 175, and the bobbins 181 and 182 are arranged respectively on the winding cores 174 and 175 by inserting the winding cores 174 and 175 into these holes 185 and 186. And in a state where the bobbins 181 and 182 are arranged on the winding cores 174 and 175, the respective coil lead substrates 183 are screwed onto a base plate 2 and the like through holes of the stator 170. At this time, the respective coil lead substrates 183 are electrically connected to each other and the respective coils 124 and 134 wound around the respective bobbins 181 and 182 are connected in series with each other.

Hereupon, the one stator portion 172 and winding core 174 are arranged in parallel with the other stator portion 173 and winding core 175. Due to this, the coils 124 and 134 arranged respectively on the winding cores 174 and 175 are arranged in parallel with each other. And in the same way as the first embodiment, the coils 124 and 134 are equal in number of turns to each other and are wound in the same direction as each other in a state where they are arranged respectively on the winding cores 174 and 175.

Thanks to this, when an external magnetic field is applied to the coils 124 and 134, since the external magnetic field is applied to the coils 124 and 134 in the same direction, the external magnetic field results in being applied in the inverse direction to each other with respect to the winding directions of the coils 124 and 134. Due to this, since the electromotive forces produced by the external magnetic field in the coils 124 and 134 act so as to cancel each other, its influence can be reduced.

And the rotor 12 is arranged so that its central axis is arranged on the boundary line along between the coils 124 and 134, and the core stator portions 172, 173 and the winding cores 174, 175 are arranged in symmetry with respect to the boundary line.

At this time, as shown in FIG. 25, a nearly ring-shaped positioning member 22 is arranged between the core stator portions 172 and 173, more specifically the stator hole parts 172a and 173a where the rotor 12 of the stator 170 is to be arranged. And eccentric pins 23 are disposed outside the respective core stator portions 172 and 173 of the stator 170. By turning the eccentric pins 23, it is possible to press and bring the respective core stator portions 172 and 173 of the stator 170 into contact with the positioning member 22, and accurately and easily perform the positioning thereof.

In the stator 170, an annular magnetic circuit starting at a rotor magnet 12b, passing through one core stator portion 172 (173), the winding core 174 (175), the connector 176, the other winding core 175 (174) and the other core stator portion 173 (172), and returning to the rotor magnet 12b is formed. At this time the stator 170 is formed by stacking the thin plates 171, and a magnetic flux is difficult to flow between the thin plates 171 under the influence of a diamagnetic field but a sufficient magnetic flux flows in the U-shaped thin plates and thereby a magnetic circuit is formed. In short, a magnetic circuit is formed in each thin plate and the stator 170 has a plurality of magnetic circuits bundled as a whole.

This embodiment as described above can attain the objects of the present invention by the same composition as the first embodiment and additionally provides the following effects.

(28) Since a stator 170 of one body having no junction in the course of its magnetic circuit is used, no variation in magnetic resistance occurs in the magnetic circuit and a cogging torque applied to the rotor 12 can be kept stable at a specified value in a state where no inner notches are formed. Thanks to this, it is possible to form the inner notches 177 so as to completely cancel the cogging torque and thereby to reduce the cogging torque to nearly zero.

(29) Since the cogging torque can be surely made very small, even a small-sized generator 120 being small in driving torque can improve the starting performance of the rotor 12. And since the rate of occurrence of defectives being degraded in starting performance can be reduced and the yield rate can be improved, the cost of production can be reduced.

And since the cogging torque can be surely reduced, it is possible to immediately restart a timepiece even when it is stopped by shock, make smaller an inertia disk 12c to prevent the rotor 12 from stopping and improve the shock resistance. And the diameter of the bearing of the rotor 12 can be made smaller by reduction in size of the inertia disk 12c, and a friction loss can be reduced. Thanks to this, since the rotor 12 is turned by the mechanical energy from the mainspring 1a, even an electronic-controlled mechanical timepiece 100 having a generator 120 being small in driving torque can make its duration of operation longer by reducing the loss of mechanical energy.

(30) Since this embodiment winds the coils 124 and 134 respectively around the bobbins 181 and 182, inserts these bobbins 181 and 182 onto the stator 170 to arrange the coils 124 and 134, the coils 124 and 134 can be easily arranged even in the U-shaped stator 170. Due to this, it is possible to prevent the winding workability of the coils 124 and 134 from degrading and improve the efficiency of production.

(31) Since the winding cores 174 and 175 are provided respectively with the coils 124 and 134 being two coils, it is possible to make shorter the magnetic circuit in comparison with a case of being provided with one coil and thereby make their iron loss smaller.

Furthermore, since the inertia disk 12c can be made smaller, the inertia disk 12c can be placed nearer to the coils 124 and 134 in comparison with the prior art, and thereby the iron loss can be further reduced by shortening the magnetic circuit.

(32) Since the coils 124 and 134 are equal in number of turns to each other, are connected in series with each other and are arranged in parallel with each other, it is possible to cancel the influence by an external magnetic field occurring outside the generator 120 and thereby make small the influence of the external magnetic field.

(33) Since a positioning member 22 capable of being pressed against the inner circumferential wall of the stator hole parts 172a and 173a of the core stator portions 172 and 173, and eccentric pins 23 for pressing the core stator portions 172 and 173 against the positioning member 22 are provided, it is possible to make small the quantity of eccentricity of the rotor 12 and the stator 170, and easily locate the stator 170 at a specified position.

(34) Since the quantity of eccentricity between the rotor 12 and the stator hole parts 172a and 173a can be made small by the positioning member 22 and the eccentric pins 23, variation in permeance can be reduce and variation in quantity of magnetic flux flowing can be also suppressed, and thereby the cogging torque caused by the eccentricity can be surely made small.

(35) Since the stator 170 is formed by stacking the thin plates made of an amorphous material, it is possible to reduce the iron loss of it and form a low-loss generator 120.

Twelfth Embodiment

Figure 29:
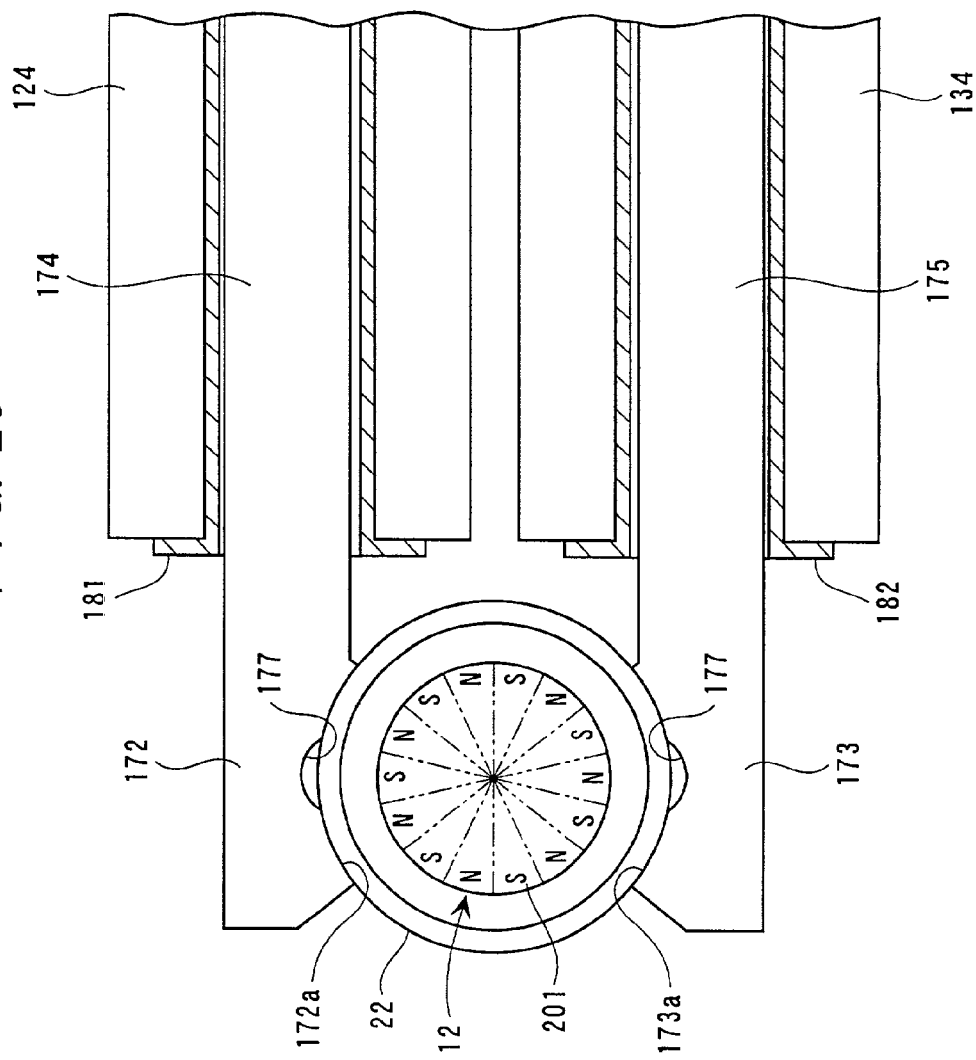
FIG. 29 is a plan view showing a twelfth embodiment of the present invention.

FIG. 29 shows a generator 200 of a twelfth embodiment of the present invention. The generator 200 of this embodiment is used as a generator of an electronic-controlled mechanical timepiece in the same way as the above-mentioned embodiments, and uses a multipolar magnet 201 as its rotor magnet. This embodiment uses a 14-pole multipolar magnet 201, but may use a multipolar magnet 201 having 10 poles, 18 poles or the like, and a multipolar magnet 201 having at least 4 or more poles will do. In this case, a multipolar magnet 201 having 10, 14 or 18 poles is practical in case that it is assembled into a stator 170 comprising core stators 172 and 173 symmetrical to each other.

And the inner diameter of stator hole parts 172a and 173a, namely, the core stator portions 172 and 173 is made slightly smaller than the outer diameter of a ring-shaped positioning member 22, and when the core stator portions 172 and 173 are fitted onto the positioning member 22, the core stator portions 172 and 173 are slightly bent so as to be pressed against the positioning member 22 by the elastic force.

In case of using such a generator 200 having a multipolar magnet 201 also, since a stator 170 of one body is used it is possible to reduce variation in magnetic resistance, and since the cogging torque applied to the rotor magnet is kept stable at a specified value it is possible to make a cogging torque be almost zero by forming inner notches adaptively to the cogging torque, and as the result the same effects as the effects (28) to (35) of the eleventh embodiment can be obtained.

(36) Further, since a multipolar magnet 201 is used, in case of generating the same electromotive force as a two-pole magnet, since it is possible to make small the quantity of magnetic flux flowing in the stator 170 and thereby reduce a cogging torque, it is possible to improve the starting performance even in case of forming no inner notches 177. That is to say, since the electromotive force of the generator 200 is proportional to "(the number of turns of the coils 124 and 134)×(the quantity of magnetic flux change per a unit time)" and the quantity of magnetic flux change per a unit time is increased by increasing the number of poles, it is possible to obtain an electromotive force of the same degree even if reducing the quantity of magnetic flux. Since the quantity of magnetic flux can be reduced due to this, a cogging torque can be reduced.

(37) Moreover, an electronic-controlled mechanical timepiece regulates the rotational speed of a rotor 12 by feed-back-controlling the rotor 12 through detecting its output waveform. Therefore, the rotation of the rotor 12 can be more accurately controlled if the frequency of variation in waveform per rotation of the rotor 12 is increased by using a multipolar magnet.

(38) Since it is possible to position the core stator portions 172 and 173 only by fitting the core stator portions 172 and 173 onto the positioning member 22 and make the eccentric pins 23 unnecessary, it is possible to reduce the number of components and also improve the workability of assembling.

Thirteenth Embodiment

Figure 30:
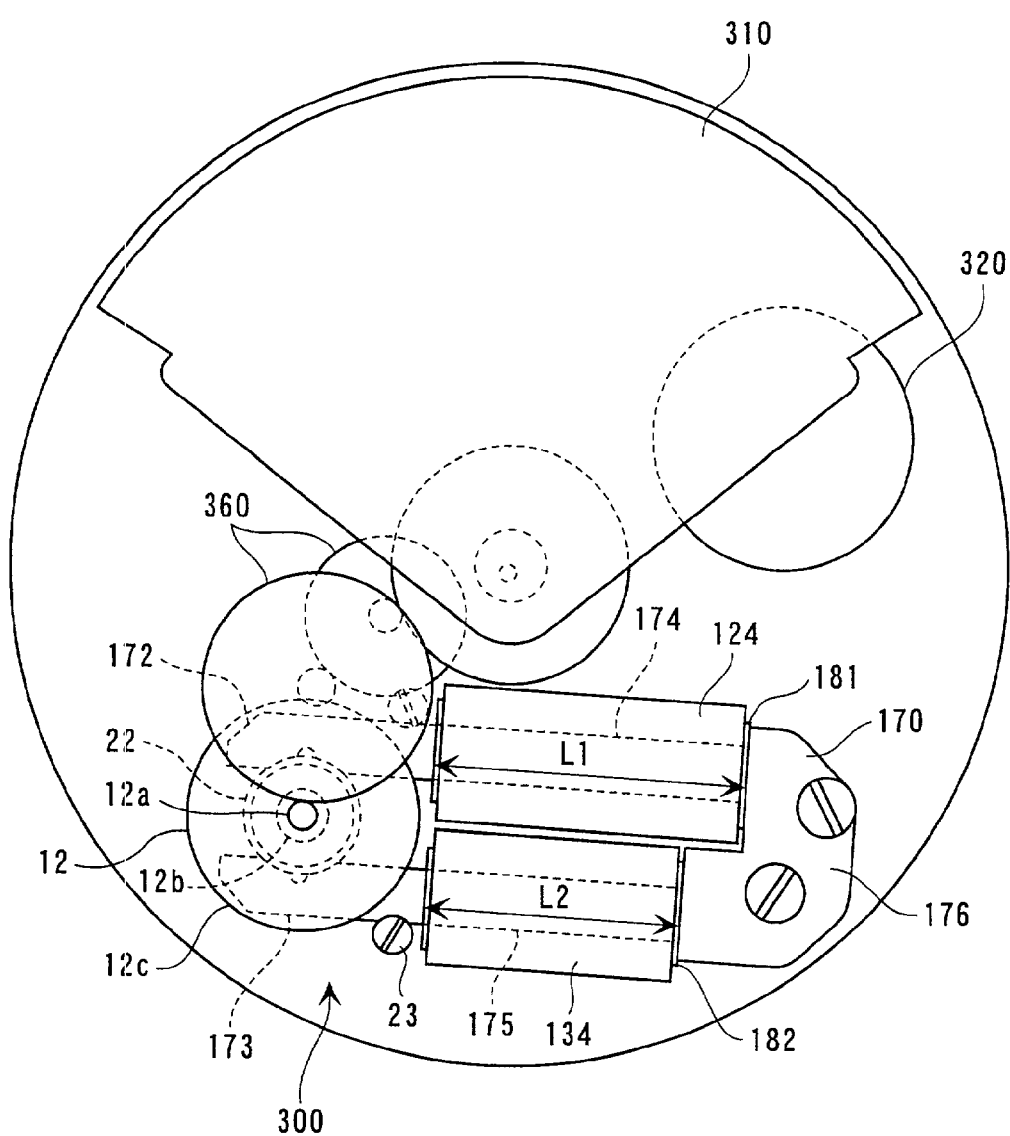
FIG. 30 is a plan view showing a thirteenth embodiment of the present invention.

FIG. 30 shows a generator 300 of a thirteenth embodiment of the present invention. This generator 300 is different from the other embodiments in that the rotor 12 is turned by an oscillating weight 310 in this embodiment while the rotor 12 is turned by the mainspring 1a in the other embodiments. That is to say, a generator 300 is incorporated into a pointer-type electronic timepiece 301, and is composed of an oscillating weight 310 being eccentric in weight to be turned by movement of an arm having the timepiece on it, a rotor 12 turned by receiving kinetic energy from this oscillating weight 310, a stator 170, and coils 124 and 134 wound around this stator 170 so as to generate electricity when moving the arm having the pointer-type electronic timepiece 301. The oscillating weight 310 and the rotor 12 are mechanically connected with each other through an electricity generation gear train 360 for increasing in speed and transferring the turning action of the oscillating weight 310 to the rotor 12.

And the pointer-type electronic timepiece 301 stores the electric power generated by the generator 300 into a secondary battery 320 and operates the pointers by driving an unshown stepping motor with this electric power.

The stator 170 and the coils 124 and 134 of the generator 300 may be basically the same as those of the first embodiment, but since a driving torque by the oscillating weight 310 is larger in comparison with the mainspring 1a, it is preferable that in comparison with the generator 120 the generator 300 uses a larger magnet to increase the magnetic flux, reduces the resistance of the coils 124 and 134 by using thicker wire in order to reduce the resistance loss of a large generated electric current, and uses an amorphous material having its main ingredient of Fe being high in saturation magnetic flux density as a material for the stator 170.

This embodiment as described above can bring the same effects as the effects (28) to (35) of the eleventh embodiment thanks to a fact that the stator 170 is a one-body stator. Further, in the generator 300 also, the rotor magnet 12*b* may be formed out of a multipolar magnet and in such a case, the effects (36) and (37) can be obtained.

The present invention is not limited to the embodiments, but includes other compositions capable of attaining the objects of the present invention and also includes variants and the like as shown in the following.

For example, the coil 134 of the first embodiment obtains a large number of turns by using a winding (conductor) being small in diameter to make small the whole diameter of the wire including its coating, but it is acceptable to obtain a large number of turns by using a winding coated with a thinner coating to make smaller the whole diameter of the wire.

And it may be applied to the second embodiment and the like to make smaller the diameter of a winding by making its coating thinner. In such a case also, by making the respective coils equal in number of turns to each other, it is possible to make the outer coil smaller in volume by its smaller winding diameter and make smaller an opening for housing the coil and, in its turn, make the timepiece more small-sized.

In the first to seventh embodiments, an opening 2*c* is provided as a space for housing the respective coils, but a base plate having no corner having a distance D1 or D2 due to providing a bottomed hollow in place of such an opening 2*c* may be formed. According to the present invention, even in such a case, since the hollow can be made small, it is possible to promote the reduction in thickness of a timepiece as securing the strength of the base plate 2.

The third embodiment uses a PC material as a material for the winding core 123*b* and uses a PB material being larger in saturation magnetic flux density as a material for the winding core 133*b*, but for example, it is acceptable also to use a PB material for only one layer out of two layers forming the winding core 133*b*, and in such a case also, it is possible to make the winding core 133*b* large in saturation magnetic flux density.

And materials being different in saturation magnetic flux density are not limited to PC and PB materials but may be other materials.

However, the case that the respective winding cores are equal in saturation magnetic flux density to each other is also included in an aspect of the invention.

The sixth embodiment uses a generator 120 having a similar composition to the first embodiment but, without limiting to this, may combine the generator 120 of the second to fifth embodiments with an oscillating weight 150, and in such a case also, it is possible to obtain the effects (10) and (11) in the same way. And in case of providing an oscillating weight in a timepiece in which the outer coil is smaller in sectional area like the seventh embodiment for example, it is possible to obtain the following effect in addition to the effect (14). That is to say, as shown by an alternate long and short dash line and an alternate long and two short dashes line in FIG. 6, since the skirt portion 151 of the oscillating weight 150 can be brought more inside than a conventional oscillating weight 150', it is possible to make larger the inclination of a slope formed in the peripheral edge part of the back cover 152 than the inclination of a conventional back cover 152' as keeping the volume of the skirt portion 151 to the same degree as the prior art and thereby make the timepiece look thinner in appearance.

In the seventh embodiment, the section of the whole coil 134 is smaller in area than the coil 124, but in the coils 124 and 134 having the same size in sectional shape as shown in the sixth embodiment, the whole coil 134 is shifted down by bringing the winding core 133*b* more downward than the winding core 123*b* and thereby the skirt portion of the oscillating weight may be made larger inside.

Further, to shift the winding core 133*b* relative to the winding core 123*b* may be applied also to a generator having coils being equal in sectional size and in length to each other like a generator of a conventional structure, and such a case is also included in an aspect of the invention and can provide the effect (14) in the same way.

And also in a timepiece provided with no oscillating weight in particular, the whole coil 134 may be shifted nearer to the base plate 2 by shifting the winding core 133*b* more downward than the winding core 123*b*, namely, so as to be more distant from the back cover 152 (FIG. 6), and in such a case also, there is an effect that it is possible to make a timepiece more small-sized by forming a slope having an inclination in the peripheral edge part of the back cover and make the timepiece look thinner in appearance by making the slope larger.

And such at timepiece is included in an aspect of the invention.

The base plate 2 in the embodiments is of a flat circular shape, but the external shape of the base plate 2 may be optionally determined in consideration of the design of a timepiece. And another aspect of the invention, it is enough that coils are provided in parallel with the perimeter of a base plate of an optional shape.

And an overwinding prevention mechanism is not limited to the eighth embodiment and the like. For example, the overwinding of a mainspring 1*a* may be prevented by making an oscillating weight 41 and a ball bearing 47 slip relative to each other at a torque larger than a certain torque. And the overwinding of the mainspring 1*a* may be prevented by making two members into which the square-hole wheel 4 is separated slip relative to each other. Further, the overwinding of the mainspring 1*a* may be prevented by providing an eccentric pin 42 on the spring member instead of the oscillating weight 41, and preventing the mainspring 1*a* from being wound up by setting the elastic force of this spring member so that the quantity of eccentricity of the eccentric pin 42 becomes zero when this pin 42 receives a larger force than a certain value from the self-winding lever 45. And the overwinding of the mainspring 1*a* may be prevented by providing a spring portion around the hole stone of the self-winding lever 45 engaged with the eccentric pin 42 and preventing the mainspring 1*a* from being wound up by making the spring portion deform to make the distance of operation of the self-winding lever 45 be zero when receiving a larger force than a certain value. In short, it is enough that the overwinding prevention mechanism is a mechanism which prevents the mainspring 1*a* from being excessively wound up, and its shape, structure and the like may be properly selected at the time of implementation.

And the hand-winding gear train 34 inputs mechanical energy into the mainspring 1*a* through the self-winding gear train 43 but is not limited to this, and for example it is acceptable also to provide a hand-winding gear train 34 and a self-winding gear train 43 independently of each other and make each gear train input mechanical energy into the mainspring 1*a*. To make the hand-winding gear train 34 input mechanical energy into the mainspring 1*a* through the self-winding gear train 43 is preferable in that it is possible to commonly use the self-winding gear train 43 in the respective winding portions 30 and 40, reduce the number of components and thereby more easily make a timepiece small-sized and properly make the layout.

Further, an energy storage display is not limited to the residual-spring-energy-indicating mechanism 50 but, for example, may be a spring torque indicating mechanism for indicating the torque value of the mainspring 1a, and it is enough that a structure or method for indicating it is properly determined at the time of implementation. And an energy storage display is not limited to a mechanism using a planetary gear train and a pointer but for example, it is enough to obtain energy holdings by detecting the energy of braking by means of an IC or the like for performing the rotational control of the generator 2 and display the energy holdings on a proper display such as a liquid crystal, voice or the like.

Furthermore, an energy storage display (residual-spring-energy-indicating mechanism 50) may not necessarily be provided. Since the residual-spring-energy-indicating mechanism 50 is arranged between the barrel wheel 1 and the generator 120 independently of the winding portions 30 and 40, in such a case also, it is enough to simply detach the residual-spring-energy-indicating mechanism 50 and it is not necessary to adjust the arrangement and the like of other components. Thanks to this, even in case that the specification of a timepiece is changed by whether or not there is a residual-spring-energy-indicating mechanism 50, it is possible to use commonly the other components such as a hand-winding portion 30, a self-winding portion 40, a generator 120 and the like, and therefore make the production easy and reduce the cost.

Similarly, even in case of manufacturing a timepiece being provided with no self-winding portion 40 in specification, since it is enough to remove a self-winding lever 45 and an oscillating weight 41 and the other components can be commonly used, the production is made easy and the cost can be reduced.

Moreover, a mechanical energy storage is not limited to a mainspring 1a but may use a rubber member, a spring, a weight or the like, and may be properly selected according to an object to which the present invention is applied.

And a mechanical energy manual input portion is not limited to the hand-winding portion 30 of the embodiments but may be properly selected according to the kind of a mechanical energy storage.

Still further, a mechanical energy automatic input portion is not limited to the self-winding portion 40 using a self-winding lever 45 but may be of a full-gear type, and a mechanism which automatically inputs mechanical energy into a mechanical energy storage such as a mainspring or the like will do.

And a mechanical energy transfer device for transferring the mechanical energy from a mechanical energy storage such a mainspring or the like to a generator 120 is not limited to a gear train like the embodiments but may utilize a friction wheel, a belt (timing belt and the like) and pulleys, a chain and sprocket wheels, a rack and pinion, a cam and the like, and may be properly selected according to the kind of a device to which the present invention is applied.

And as a time information display device, it is acceptable also to use an indicator in the shape of a disk, circular ring or circular arc in addition to a pointer. Further, a time information display device of a digital display type using a liquid crystal panel and the like may be used.

And a stator is not limited to a symmetrical stator in which the core stator portions 172, 173 and the winding cores 174, 175 are respectively arranged in parallel with each other and in symmetry with respect to the boundary line passing the rotational center of the rotor 12 like the embodiments, and it is enough that its concrete shape and structure are properly determined at the time of implementation.

And a material for the stator 170 in the eleventh embodiment and the like is not limited to a amorphous material but may be a material capable of forming a magnetic circuit. For example, since a Co-based amorphous material and a permalloy C of 78% Ni are close to each other in property, and an Fe-based amorphous material and a permalloy C of 45% Ni are close to each other in property, these permalloy materials are sufficiently substitutable although they are somewhat large in iron loss. Therefore, a permalloy material other than amorphous materials may be used.

The coils 124 and 134 are not limited to coils wound around the bobbins 181 and 182 but may be wound directly around the winding cores 174 and 175. Further, the inner notches 177 may not necessarily be formed. That is to say, if the cogging torque is not kept stable, a driving torque from the mainspring 1a or the oscillating weight 310 must be set rather large and a problem of degrading in the duration of operation occurs. On the other hand, if the magnetic resistance is kept constant and the cogging torque is kept stable at a specified value, it is possible to start the rotor 12 without fail only by setting the cogging torque slightly larger than the driving torque from the mainspring or the oscillating weight 310, and form a generator being good in starting performance and make the duration of operation long even without forming inner notches.

And according to the present invention, since the cogging torque can be reduced, the inertia disk 12c may be small in diameter or small in moment of inertia and further may be not used.

Figure 32:
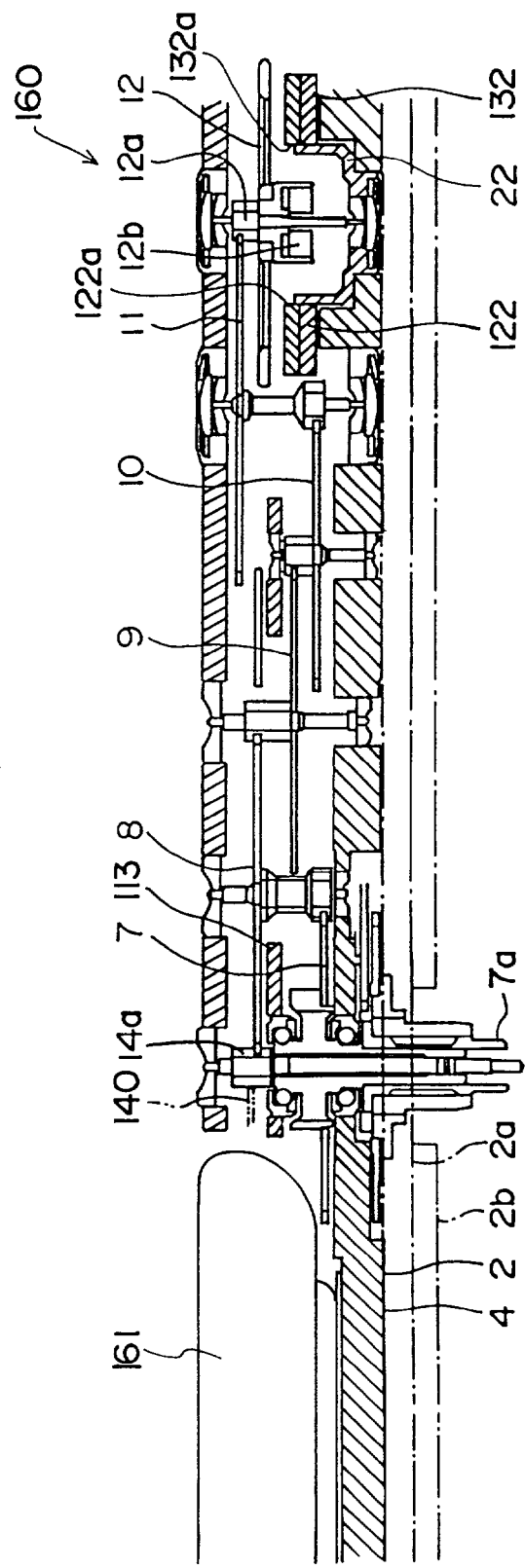
FIG. 32 is a longitudinal sectional view showing the variant example.

As an electromagnetic converter of the present invention, a generator 120 provided in an electronic-controlled mechanical timepiece has been shown but an electromagnetic converter of the present invention may be a stepping motor 160 driven by a battery 161 to be used in an electronic timepiece as shown in FIGS. 31 and 32.

And a timepiece of the present invention is not limited to an electronic-controlled mechanical timepiece but may be various kinds of timepieces such as a wrist watch, a clock, a wall clock and the like, for example, driving a stepping motor by means of the electric power generated by a generator 120.

Moreover, the present invention can be applied also to a timepiece and the like being provided with the mainspring 1a or generator 120 as an auxiliary power source in addition to a battery.

Since such a timepiece of the present invention can be used even without a battery or the like, it can be used also as an outdoor timepiece or a timepiece in disaster.

INDUSTRIAL AVAILABILITY

As described above, according to the present invention, since the winding core of a coil arranged nearer to the perimeter of a base plate is made smaller than the winding core of a coil arranged more inside, it is possible to surely make the base plate small-sized as securing the strength of the base plate keeping the distance between the corner part of an opening and the perimeter of the base plate to the same degree as that of a conventional base plate, and thereby provide a small-sized timepiece being easy to design.

What is claimed is:

1. A timepiece, comprising:
   an electromagnetic transducer for converting one form of energy into another form of energy, the electromagnetic transducer comprising first and second coils having first and second winding cores respectively;
   wherein the second coil is disposed closer to an outer periphery of the timepiece than the first coil, and the first coil has a winding core whose axial length is longer than that of a winding core of the second coil.

2. The timepiece according to claim 1, wherein a diameter of a winding wound around the second winding core is less than a diameter of a winding wound around the first winding core.

3. The timepiece according to claim 2, wherein conductivity of the second winding core winding is greater than conductivity of the first winding core winding.

4. The timepiece according to claim 2, wherein the electromagnetic transducer includes a rotor, and a stator comprised of first and second stator portions, the first stator portion including the first winding core and the winding wound therearound and the second stator portion including the second winding core and the winding wound therearound the first and second stator portions being integrated through their respective winding cores.

5. The timepiece according to claim 1, wherein each of the first and second winding cores has a winding which has a coating, and the coating on the winding wound around the second winding core is thinner than the coating on the winding wound around the first winding core.

6. The timepiece according to claim 1, wherein the electromagnetic transducer includes a rotor, and a stator comprised of first and second stator portions, the first stator portion including the first winding core and its corresponding winding and the second stator portion including the second winding core and its corresponding winding, the first and second stator portions being integrated through their respective winding cores.

7. The timepiece according to claim 1,
   wherein the second coil is disposed closer to an outer periphery of the timepiece than the first coil, and the width and thickness of the second winding core is less than the width and thickness of the first winding core.

8. The timepiece according to claim 7, wherein the second winding core is formed of a material having greater saturation flux density than a material from which the first winding core is formed.

9. The timepiece according to claim 7, further comprising an oscillating weight rotating in a circumferential direction with respect to the outer periphery.

10. The timepiece according to claim 9, wherein the second winding core is offset in a downward direction relative to a location of the first winding core, so that the second winding core is located a greater distance from the oscillating weight than the first winding core.

11. The timepiece according to claim 9, wherein the electromagnetic transducer includes a rotor, and a stator comprised of first and second stator portions, the first stator portion including the first winding core and a corresponding first winding and the second stator portion including the second winding core and a corresponding second winding, the first and second stator portions being integrated through their respective winding cores.

12. The timepiece according to claim 7, wherein the electromagnetic transducer is a power generator for converting mechanical energy into electric energy, and wherein the timepiece further comprises:
   a mechanical energy storage unit for storing mechanical energy;
   a manual input portion for manually inputting mechanical energy into the mechanical energy storage unit; and
   an automatic input portion for automatically inputting mechanical energy into the mechanical energy storage unit;
   wherein the manual input portion and the automatic input portion are disposed on one side of the mechanical energy storage unit and the power generator is disposed on the other side of the mechanical energy storage unit.

13. The timepiece according to claim 12, further comprising:
   a mechanical energy transfer unit, disposed between the power generator and the manual and automatic input portions, for transferring the mechanical energy stored in the mechanical energy storage unit to a rotor of the power generator.

14. The timepiece according to claim 13, further comprising an energy storage display for displaying an amount of mechanical energy stored in the mechanical energy storage unit, the energy storage display being disposed between the mechanical energy storage unit and the power generator.

15. The timepiece according to claim 7, wherein the electromagnetic transducer is a power generator for converting mechanical energy into electric energy, and wherein the timepiece further comprises:
   a mechanical energy storage unit for storing the mechanical energy; and
   a sequential arrangement of a manual input portion for manually inputting mechanical energy into the mechanical energy storage unit, an automatic input portion for automatically inputting mechanical energy into the mechanical energy storage unit;
   wherein the manual input portion includes an external manipulation member, a portion of which extends radially outward from the outer periphery;
   wherein the manual input portion including the external manipulation member and the automatic input portion are disposed on one side of the mechanical energy storage unit and the power generator is disposed on the other side of the mechanical energy storage unit.

16. The timepiece according to claim 7, wherein the electromagnetic transducer includes a rotor, and a stator comprised of first and second stator portions, the first stator portion including the first winding core and a corresponding first winding and the second stator portion including the second winding core and a corresponding second winding, the first and second stator portions being integrated through their respective winding cores.

17. The timepiece according to claim 1,
   wherein the second coil is disposed closer to an outer periphery of the timepiece than the first coil; and
   wherein each of the windings has a coating, and the coating on the winding wound around the second winding core is thinner than the coating on the winding wound around the first winding core.

18. The timepiece according to claim 17, further comprising an oscillating weight rotating in a circumferential direction with respect to the outer periphery.

19. The timepiece according to claim 18, wherein the second winding core is offset in a downward direction relative to a location of the first winding core, so that the second winding core is located a greater distance from the oscillating weight than the first winding core.

20. The timepiece according to claim 18, wherein the electromagnetic transducer includes a rotor, and a stator comprised of first and second stator portions, the first stator portion including the first winding core and the first winding and the second stator portion including the second winding core and the second winding, the first and second stator portions being integrated through their respective winding cores.

21. The timepiece according to claim 17, wherein the electromagnetic transducer is a power generator for converting mechanical energy into electric energy, and wherein the timepiece further comprises:
   a mechanical energy storage unit for storing mechanical energy;
   a manual input portion for manually inputting mechanical energy into the mechanical energy storage unit; and
   an automatic input portion for automatically inputting mechanical energy into the mechanical energy storage unit;
   wherein the manual input portion and the automatic input portion are disposed on one side of the mechanical energy storage unit and the power generator is disposed on the other side of the mechanical energy storage unit.

22. The timepiece according to claim 21, further comprising:
   a mechanical energy transfer unit, disposed between the power generator and the manual and automatic input portions, for transferring the mechanical energy stored in the mechanical energy storage unit to a rotor of the power generator.

23. The timepiece according to claim 22, further comprising an energy storage display for displaying an amount of mechanical energy stored in the mechanical energy storage unit, the energy storage display being disposed between the mechanical energy storage unit and the power generator.

24. The timepiece according to claim 17, wherein the electromagnetic transducer is a power generator for converting mechanical energy into electric energy, and wherein the timepiece further comprises:
   a mechanical energy storage unit for storing the mechanical energy; and
   a sequential arrangement of a manual input portion for manually inputting mechanical energy into the mechanical energy storage unit, an automatic input portion for automatically inputting mechanical energy into the mechanical energy storage unit;
   wherein the manual input portion includes an external manipulation member, a portion of which extends radially outward from the outer periphery;
   wherein the manual input portion including the external manipulation member and the automatic input portion are disposed on one side of the mechanical energy storage unit and the power generator is disposed on the other side of the mechanical energy storage unit.

25. The timepiece according to claim 17, wherein the electromagnetic transducer includes a rotor, and a stator comprised of first and second stator portions, the first stator portion including the first winding core and the first winding and the second stator portion including the second winding core and the second winding, the first and second stator portions being integrated through their respective winding cores.

26. The timepiece according to claim 1,
   wherein the second coil is disposed closer to an outer periphery of the timepiece than the first coil, and a diameter of a winding wound around the second core tapers from thicker to thinner from middle part of winding to at least one end thereof.

27. The timepiece according to claim 26, further comprising an oscillating weight rotating in a circumferential direction with respect to the outer periphery.

28. The timepiece according to claim 27, wherein the second winding core is offset in a downward direction relative to a location of the first winding core, so that the second winding core is located a greater distance from the oscillating weight than the first winding core.

29. The timepiece according to claim 27, wherein the electromagnetic transducer includes a rotor, and a stator comprised of first and second stator portions, the first stator portion including the first winding core and the winding wound therearound and the second stator portion including the second winding core and the winding wound therearound, the first and second stator portions being integrated through their respective winding cores.

30. The timepiece according to claim 26, wherein the electromagnetic transducer is a power generator for converting mechanical energy into electric energy, and wherein the timepiece further comprises:
   a mechanical energy storage unit for storing mechanical energy;
   a manual input portion for manually inputting mechanical energy into the mechanical energy storage unit; and
   an automatic input portion for automatically inputting mechanical energy into the mechanical energy storage unit;
   wherein the manual input portion and the automatic input portion are disposed on one side of the mechanical energy storage unit and the power generator is disposed on the other side of the mechanical energy storage unit.

31. The timepiece according to claim 30, further comprising:
   a mechanical energy transfer unit, disposed between the power generator and the manual and automatic input portions, for transferring the mechanical energy stored in the mechanical energy storage unit to a rotor of the power generator.

32. The timepiece according to claim 31, further comprising an energy storage display for displaying an amount of mechanical energy stored in the mechanical energy storage unit, the energy storage display being disposed between the mechanical energy storage unit and the power generator.

33. The timepiece according to claim 26, wherein the electromagnetic transducer is a power generator for converting mechanical energy into electric energy, and wherein the timepiece further comprises:
   a mechanical energy storage unit for storing the mechanical energy; and
   a sequential arrangement of a manual input portion for manually inputting mechanical energy into the mechanical energy storage unit, an automatic input portion for automatically inputting mechanical energy into the mechanical energy storage unit;
   wherein the manual input portion includes an external manipulation member, a portion of which extends radially outward from the outer periphery;
   wherein the manual input portion including the external manipulation member and the automatic input portion are disposed on one side of the mechanical energy storage unit and the power generator is disposed on the other side of the mechanical energy storage unit.

34. The timepiece according to claim 26, wherein the electromagnetic transducer includes a rotor, and a stator comprised of first and second stator portions, the first stator portion including the first winding core and the winding wound therearound and the second stator portion including the second winding core and the winding wound therearound, the first and second stator portions being integrated through their respective winding cores.

35. The timepiece according to claim 1, wherein the second coil is disposed closer to an outer periphery of the timepiece than the first coil, and at least the second coil is shaped such that its axial dimension is substantially parallel to the outer periphery.

36. The timepiece according to claim 35, further comprising an oscillating weight rotating in a circumferential direction with respect to the outer periphery.

37. The timepiece according to claim 36, wherein the second winding core is offset in a downward direction relative to a location of the first winding core, so that the second winding core is located a greater distance from the oscillating weight than the first winding core.

38. The timepiece according to claim 36, wherein the electromagnetic transducer includes a rotor, and a stator comprised of first and second stator portions, the first stator portion including the first winding core and a corresponding first winding and the second stator portion including the second winding core and a corresponding second winding, the first and second stator portions being integrated through their respective winding cores.

39. The timepiece according to claim 35, wherein the electromagnetic transducer is a power generator for converting mechanical energy into electric energy, and wherein the timepiece further comprises:
   a mechanical energy storage unit for storing mechanical energy;
   a manual input portion for manually inputting mechanical energy into the mechanical energy storage unit; and
   an automatic input portion for automatically inputting mechanical energy into the mechanical energy storage unit;
   wherein the manual input portion and the automatic input portion are disposed on one side of the mechanical energy storage unit and the power generator is disposed on the other side of the mechanical energy storage unit.

40. The timepiece according to claim 39, further comprising:
   a mechanical energy transfer unit, disposed between the power generator and the manual and automatic input portions, for transferring the mechanical energy stored in the mechanical energy storage unit to a rotor of the power generator.

41. The timepiece according to claim 40, further comprising an energy storage display for displaying an amount of mechanical energy stored in the mechanical energy storage unit, the energy storage display being disposed between the mechanical energy storage unit and the power generator.

42. The timepiece according to claim 35, wherein the electromagnetic transducer is a power generator for converting mechanical energy into electric energy, and wherein the timepiece further comprises:
   a mechanical energy storage unit for storing the mechanical energy; and
   a sequential arrangement of a manual input portion for manually inputting mechanical energy into the mechanical energy storage unit, an automatic input portion for automatically inputting mechanical energy into the mechanical energy storage unit;
   wherein the manual input portion includes an external manipulation member, a portion of which extends radially outward from the outer periphery;
   wherein the manual input portion including the external manipulation member and the automatic input portion are disposed on one side of the mechanical energy storage unit and the power generator is disposed on the other side of the mechanical energy storage unit.

43. The timepiece according to claim 35, wherein the electromagnetic transducer includes a rotor, and a stator comprised of first and second stator portions, the first stator portion including the first winding core and a corresponding first winding and the second stator portion including the second winding core and a corresponding second winding, the first and second stator portions being integrated through their respective winding cores.

44. The timepiece according to claim 1, further comprising:
   a back cover;
   wherein the second coil is disposed closer to an outer periphery of the timepiece than the first coil, so that the second winding core is located a greater distance from the back cover than the first winding core.

45. The timepiece according to claim 44, further comprising an oscillating weight rotating in a circumferential direction with respect to the outer periphery.

46. The timepiece according to claim 45, wherein the second winding core is offset in a downward direction relative to a location of the first winding core, so that the second winding core is located a greater distance from the oscillating weight than the first winding core.

47. The timepiece according to claim 45, wherein the electromagnetic transducer includes a rotor, and a stator comprised of first and second stator portions, the first stator portion including the first winding core and a corresponding first winding and the second stator portion including the second winding core and a corresponding second winding, the first and second stator portions being integrated through their respective winding cores.

48. The timepiece according to claim 44, wherein the electromagnetic transducer is a power generator for converting mechanical energy into electric energy, and wherein the timepiece further comprises:
   a mechanical energy storage unit for storing mechanical energy;
   a manual input portion for manually inputting mechanical energy into the mechanical energy storage unit; and
   an automatic input portion for automatically inputting mechanical energy into the mechanical energy storage unit;
   wherein the manual input portion and the automatic input portion are disposed on one side of the mechanical energy storage unit and the power generator is disposed on the other side of the mechanical energy storage unit.

49. The timepiece according to claim 48, further comprising:
   a mechanical energy transfer unit, disposed between the power generator and the manual and automatic input portions, for transferring the mechanical energy stored in the mechanical energy storage unit to a rotor of the power generator.

50. The timepiece according to claim 49, further comprising an energy storage display for displaying an amount of mechanical energy stored in the mechanical energy storage unit, the energy storage display being disposed between the mechanical energy storage unit and the power generator.

51. The timepiece according to claim 44, wherein the electromagnetic transducer is a power generator for converting mechanical energy into electric energy, and wherein the timepiece further comprises:

a mechanical energy storage unit for storing the mechanical energy; and a sequential arrangement of a manual input portion for manually inputting mechanical energy into the mechanical energy storage unit, an automatic input portion for automatically inputting mechanical energy into the mechanical energy storage unit;

wherein the manual input portion includes an external manipulation member, a portion of which extends radially outward from the outer periphery;

wherein the manual input portion including the external manipulation member and the automatic input portion are disposed on one side of the mechanical energy storage unit and the power generator is disposed on the other side of the mechanical energy storage unit.

52. The timepiece according to claim 44, wherein the electromagnetic transducer includes a rotor, and a stator comprised of first and second stator portions, the first stator portion including the first winding core and a corresponding first winding and the second stator portion including the second winding core and a corresponding second winding, the first and second stator portions being integrated through their respective winding cores.

53. The timepiece according to claim 1, further comprising an oscillating weight rotating in a circumferential direction with respect to the outer periphery.

54. The timepiece according to claim 53, wherein the second winding core is offset in a downward direction relative to a location of the first winding core, so that the second winding core is located a greater distance from the oscillating weight than the first winding core.

55. The timepiece according to claim 53, wherein the electromagnetic transducer includes a rotor, and a stator comprised of first and second stator portions, the first stator portion including the first winding core and a corresponding first winding and the second stator portion including the second winding core and a corresponding second winding, the first and second stator portions being integrated through their respective winding cores.

56. The timepiece according to claim 1, further comprising:

an oscillating weight rotating in circumferential direction with respect to an outer periphery of the timepiece;

wherein the second winding core is located a greater distance from the oscillating weight than the first winding core.

57. The timepiece according to 56, wherein the electromagnetic transducer further comprises a magnetic conducting portion, a part of which is spaced apart from, and planarly overlapped by, a skirt portion provided on an outer circumference of the oscillating weight.

58. The timepiece according to claim 56, wherein the electromagnetic transducer is a power generator for converting mechanical energy into electric energy, and wherein the timepiece further comprises:

a mechanical energy storage unit for storing mechanical energy;

a manual input portion for manually inputting mechanical energy into the mechanical energy storage unit; and an automatic input portion for automatically inputting mechanical energy into the mechanical energy storage unit;

wherein the manual input portion and the automatic input portion are disposed on one side of the mechanical energy storage unit and the power generator is disposed on the other side of the mechanical energy storage unit.

59. The timepiece according to claim 58, further comprising:

a mechanical energy transfer unit, disposed between the power generator and the manual and automatic input portions, for transferring the mechanical energy stored in the mechanical energy storage unit to a rotor of the power generator.

60. The timepiece according to claim 59, further comprising an energy storage display for displaying an amount of mechanical energy stored in the mechanical energy storage unit, the energy storage display being disposed between the mechanical energy storage unit and the power generator.

61. The timepiece according to claim 56, wherein the electromagnetic transducer is a power generator for converting mechanical energy into electric energy, and wherein the timepiece further comprises:

a mechanical energy storage unit for storing the mechanical energy; and a sequential arrangement of a manual input portion for manually inputting mechanical energy into the mechanical energy storage unit, an automatic input portion for automatically inputting mechanical energy into the mechanical energy storage unit;

wherein the manual input portion includes an external manipulation member, a portion of which extends radially outward from the outer periphery;

wherein the manual input portion including the external manipulation member and the automatic input portion are disposed on one side of the mechanical energy storage unit and the power generator is disposed on the other side of the mechanical energy storage unit.

62. The timepiece according to claim 56, wherein the electromagnetic transducer includes a rotor, and a stator comprised of first and second stator portions, the first stator portion including the first winding core and a corresponding first winding and the second stator portion including the second winding core and a corresponding second winding, the first and second stator portions being integrated through their respective winding cores.

63. The timepiece according to claim 1, wherein the electromagnetic transducer is a power generator for converting mechanical energy into electric energy, and wherein the timepiece further comprises:

a mechanical energy storage unit for storing mechanical energy;

a manual input portion for manually inputting mechanical energy into the mechanical energy storage unit; and an automatic input portion for automatically inputting mechanical energy into the mechanical energy storage unit;

wherein the manual input portion and the automatic input portion are disposed on one side of the mechanical energy storage unit and the power generator is disposed on the other side of the mechanical energy storage unit.

64. The timepiece according to claim 63, further comprising:

a mechanical energy transfer unit, disposed between the power generator and the manual and automatic input portions, for transferring the mechanical energy stored in the mechanical energy storage unit to a rotor of the power generator.

65. The timepiece according to claim 64, further comprising an energy storage display for displaying an amount of mechanical energy stored in the mechanical energy storage unit, the energy storage display being disposed between the mechanical energy storage unit and the power generator.

66. The timepiece according to claim 1, wherein the electromagnetic transducer is a power generator for converting mechanical energy into electric energy, and wherein the timepiece further comprises:
- a mechanical energy storage unit for storing the mechanical energy; and
- a sequential arrangement of a manual input portion for manually inputting mechanical energy into the mechanical energy storage unit, an automatic input portion for automatically inputting mechanical energy into the mechanical energy storage unit;
- wherein the manual input portion includes an external manipulation member, a portion of which extends radially outward from the outer periphery;
- wherein the manual input portion including the external manipulation member and the automatic input portion are disposed on one side of the mechanical energy storage unit and the power generator is disposed on the other side of the mechanical energy storage unit.

67. The timepiece according to claim 1, wherein the electromagnetic transducer includes a rotor, and a stator comprised of first and second stator portions, the first stator portion including the first winding core and a corresponding first winding and the second stator portion including the second winding core and a corresponding second winding, the first and second stator portions being integrated through their respective winding cores.

68. The timepiece according to claim 1, wherein the volume of the second winding core is smaller than the volume of the first winding core.

* * * * *

UNITED STATES PATENT AND TRADEMARK OFFICE
CERTIFICATE OF CORRECTION

PATENT NO. : 6,973,010 B1
DATED : December 6, 2005
INVENTOR(S) : Nobuhiro Koike et al.

It is certified that error appears in the above-identified patent and that said Letters Patent is hereby corrected as shown below:

<u>Column 33,</u>
Line 33, change "claim 1" to -- claim 5 --.

Signed and Sealed this

Eighteenth Day of April, 2006

JON W. DUDAS
*Director of the United States Patent and Trademark Office*